(12) United States Patent
Yoeli

(10) Patent No.: US 8,622,335 B2
(45) Date of Patent: Jan. 7, 2014

(54) DUCTED FAN VTOL VEHICLES

(75) Inventor: Raphael Yoeli, Tel Aviv (IL)

(73) Assignee: Urban Aeronautics, Ltd., Yavne (IL)

( * ) Notice: Subject to any disclaimer, the term of this patent is extended or adjusted under 35 U.S.C. 154(b) by 0 days.

(21) Appl. No.: 12/938,444

(22) Filed: Nov. 3, 2010

(65) Prior Publication Data

US 2011/0168834 A1    Jul. 14, 2011

Related U.S. Application Data

(63) Continuation of application No. 11/411,243, filed on Apr. 26, 2006, now Pat. No. 7,857,253, which is a continuation-in-part of application No. PCT/IL2004/000984, filed on Oct. 27, 2004.

(60) Provisional application No. 60/514,555, filed on Oct. 27, 2003, provisional application No. 60/603,274, filed on Aug. 23, 2004.

(51) Int. Cl.
*B64C 27/20* (2006.01)

(52) U.S. Cl.
USPC ...... 244/12.3; 244/12.1; 244/23 A; 244/23 C; 244/23 D

(58) Field of Classification Search
USPC ........ 244/12.1–12.5, 23 R, 23 A, 23 B, 23 D, 244/53 B, 54–56
See application file for complete search history.

(56) References Cited

U.S. PATENT DOCUMENTS

| | | |
|---|---|---|
| 1,287,076 A | 12/1918 | Moses |
| 2,077,471 A | 4/1937 | Fink |
| 2,138,999 A | 12/1938 | Clark |
| 2,242,201 A | 5/1941 | Woods |
| 2,273,724 A | 2/1942 | Nelson et al. |
| D155,004 S | 8/1949 | Gluhareff |
| 2,709,947 A | 6/1955 | Woods |
| 2,734,699 A | 2/1956 | Lippisch |
| 2,734,705 A | 2/1956 | Robertson |

(Continued)

FOREIGN PATENT DOCUMENTS

| | | |
|---|---|---|
| EP | 0 236583 | 9/1987 |
| EP | 0 553490 | 8/1993 |

(Continued)

OTHER PUBLICATIONS

U.S. Appl. No. 13/252,278 (Yoeli), filed Oct. 4, 2011.

(Continued)

*Primary Examiner* — Philip J Bonzell

(74) *Attorney, Agent, or Firm* — Nixon & Vanderhye, P.C.

(57) ABSTRACT

A vehicle including a fuselage having a longitudinal axis and a transverse axis, two Ducted Fan lift-producing propellers carried by the fuselage on each side of the transverse axis, a pilot's compartment formed in the fuselage between the lift-producing propellers and substantially aligned with one side of the fuselage, a payload bay formed in the fuselage between the lift-producing propellers and opposite the pilot's compartment, and two pusher fans located at the rear of the vehicle. Many variations are described enabling the vehicle to be used not only as a VTOL vehicle, but also as a multi-function utility vehicle for performing many diverse functions including hovercraft and ATV functions. Also described is an Unmanned version of the vehicle. Also described are unique features applicable in any single or multiple ducted fans and VTOL vehicles.

8 Claims, 53 Drawing Sheets

(56) References Cited

U.S. PATENT DOCUMENTS

| | | | |
|---|---|---|---|
| 2,777,649 A | 1/1957 | Williams | |
| 2,812,636 A | 11/1957 | Kadosch et al. | |
| 2,899,149 A | 8/1959 | Breguet | |
| 2,930,544 A | 3/1960 | Howell | |
| 2,936,969 A | 5/1960 | Griffith et al. | |
| 2,939,649 A | 6/1960 | Shaw | |
| 2,951,661 A | 9/1960 | Dorman et al. | |
| 2,955,780 A | 10/1960 | Hulbert | |
| 2,968,453 A | 1/1961 | Bright | |
| 2,973,921 A | 3/1961 | Price | |
| 2,975,676 A | 3/1961 | Butler | |
| 2,988,301 A | 6/1961 | Fletcher | |
| 3,033,493 A | 5/1962 | Wilde et al. | |
| 3,039,537 A | 6/1962 | Heidelberg | |
| 3,058,693 A | 10/1962 | Doak | |
| 3,082,977 A | 3/1963 | Arlin | |
| 3,088,695 A | 5/1963 | Clark | |
| 3,090,581 A | 5/1963 | Einarsson | |
| 3,116,898 A | 1/1964 | Clark et al. | |
| 3,136,500 A | 6/1964 | Kerry | |
| 3,139,244 A | 6/1964 | Bright | |
| 3,161,374 A | 12/1964 | Allred et al. | |
| 3,167,273 A | 1/1965 | Calderon | |
| 3,174,573 A | 3/1965 | Chaplin | |
| 3,179,353 A | 4/1965 | Peterson | |
| 3,179,354 A | 4/1965 | Alvarez-Calderon | |
| 3,181,810 A | 5/1965 | Olson | |
| 3,184,183 A | 5/1965 | Piasecki | |
| 3,187,817 A | 6/1965 | Colley | |
| 3,198,082 A | 8/1965 | Kerris | |
| 3,201,067 A | 8/1965 | Meyerhoff | |
| 3,203,645 A | 8/1965 | Shaw | |
| 3,223,354 A | 12/1965 | Seibold et al. | |
| 3,224,712 A | 12/1965 | Taylor et al. | |
| 3,231,221 A | 1/1966 | Platt | |
| 3,244,246 A | 4/1966 | Weiland | |
| 3,259,343 A | 7/1966 | Roppel | |
| 3,262,511 A | 7/1966 | Carr | |
| 3,262,657 A | 7/1966 | Anker-Holth | |
| 3,265,329 A | 8/1966 | Postelson-Apostolescu | |
| 3,276,528 A | 10/1966 | Tucknott et al. | |
| 3,289,977 A | 12/1966 | Staats | |
| 3,350,035 A | 10/1967 | Schlieben | |
| 3,360,217 A | 12/1967 | Trotter | |
| 3,383,074 A | 5/1968 | Coplin | |
| 3,384,327 A | 5/1968 | Postelson-Apostolescu | |
| 3,397,852 A | 8/1968 | Katzen | |
| 3,397,854 A | 8/1968 | Reyle | |
| 3,454,238 A | 7/1969 | Goodson | |
| 3,463,420 A | 8/1969 | Butler et al. | |
| 3,481,559 A | 12/1969 | Postelson-Apostolescu | |
| 3,519,224 A | 7/1970 | Boyd et al. | |
| 3,559,921 A | 2/1971 | Timperman | |
| 3,580,530 A | 5/1971 | Wada | |
| 3,584,810 A | 6/1971 | Velton | |
| 3,606,208 A | 9/1971 | Postelson-Apostolescu | |
| 3,614,030 A | 10/1971 | Moller | |
| 3,627,235 A | 12/1971 | Lippisch | |
| 3,633,849 A | 1/1972 | Kling | |
| 3,665,809 A | 5/1972 | Darlington et al. | |
| 3,713,748 A | 1/1973 | Langley | |
| 3,752,417 A * | 8/1973 | Lagace | 244/12.2 |
| 3,827,527 A | 8/1974 | Bertelsen | |
| 3,873,049 A | 3/1975 | Horsdal | |
| 3,904,155 A | 9/1975 | Chavis | |
| 3,912,201 A | 10/1975 | Bradbury | |
| 3,955,780 A | 5/1976 | Postelson | |
| 3,972,490 A | 8/1976 | Zimmermann et al. | |
| 4,022,405 A | 5/1977 | Peterson | |
| 4,043,421 A | 8/1977 | Smith | |
| 4,071,207 A | 1/1978 | Piasecki et al. | |
| 4,149,688 A | 4/1979 | Miller, Jr. | |
| 4,171,784 A | 10/1979 | Eickmann | |
| 4,194,707 A | 3/1980 | Sharpe | |
| 4,469,294 A | 9/1984 | Clifton | |
| 4,505,442 A | 3/1985 | Kirsch et al. | |
| 4,505,443 A | 3/1985 | Bradfield et al. | |
| 4,537,372 A | 8/1985 | Forizs | |
| 4,598,890 A | 7/1986 | Herzog et al. | |
| 4,701,602 A | 10/1987 | Schaefer et al. | |
| 4,754,940 A | 7/1988 | Deter | |
| 4,757,962 A | 7/1988 | Grant | |
| 4,765,568 A | 8/1988 | Carl et al. | |
| 4,795,111 A | 1/1989 | Moller | |
| 4,796,836 A | 1/1989 | Buchelt | |
| 4,824,048 A | 4/1989 | Kim | |
| 4,828,203 A | 5/1989 | Clifton et al. | |
| 4,834,319 A | 5/1989 | Ewy et al. | |
| 4,856,732 A | 8/1989 | Eickmann | |
| 4,880,071 A | 11/1989 | Tracy | |
| 4,892,274 A | 1/1990 | Pohl et al. | |
| 4,917,332 A | 4/1990 | Patterson, Jr. | |
| 4,934,629 A | 6/1990 | Brant | |
| 4,982,914 A | 1/1991 | Eickmann | |
| 5,064,143 A | 11/1991 | Bucher | |
| 5,101,927 A | 4/1992 | Murtuza | |
| 5,141,173 A | 8/1992 | Lay | |
| 5,209,428 A | 5/1993 | Bevilaqua et al. | |
| 5,297,761 A | 3/1994 | Kendall, Jr. et al. | |
| 5,303,879 A | 4/1994 | Bucher | |
| 5,395,073 A | 3/1995 | Rutan et al. | |
| 5,407,150 A | 4/1995 | Sadleir | |
| 5,419,514 A | 5/1995 | Ducan | |
| 5,454,531 A | 10/1995 | Melkuti | |
| 5,505,407 A | 4/1996 | Chiappetta | |
| 5,666,483 A | 9/1997 | McClary | |
| 5,738,302 A | 4/1998 | Freeland | |
| 5,746,390 A | 5/1998 | Chiappetta et al. | |
| 5,806,805 A | 9/1998 | Elbert et al. | |
| 5,890,441 A | 4/1999 | Swinson et al. | |
| 6,050,520 A | 4/2000 | Kirla | |
| 6,089,501 A | 7/2000 | Frost | |
| 6,105,901 A | 8/2000 | Ulanoski et al. | |
| 6,119,985 A | 9/2000 | Clapp et al. | |
| 6,170,778 B1 | 1/2001 | Cycon et al. | |
| 6,254,032 B1 | 7/2001 | Bucher | |
| 6,270,038 B1 | 8/2001 | Cycon et al. | |
| 6,318,668 B1 | 11/2001 | Ulanoski et al. | |
| 6,371,406 B1 | 4/2002 | Corcoran | |
| 6,382,559 B1 | 5/2002 | Sutterfield et al. | |
| 6,402,088 B1 | 6/2002 | Syrovy et al. | |
| 6,431,494 B1 | 8/2002 | Kinkead et al. | |
| 6,446,911 B1 | 9/2002 | Yount et al. | |
| 6,457,670 B1 | 10/2002 | Geranio | |
| 6,464,166 B1 | 10/2002 | Yoeli | |
| 6,474,598 B2 | 11/2002 | Carter, Jr. | |
| 6,520,449 B2 | 2/2003 | Illingworth | |
| 6,561,456 B1 | 5/2003 | Devine | |
| 6,568,630 B2 | 5/2003 | Yoeli | |
| 6,616,094 B2 | 9/2003 | Illingworth | |
| 6,644,598 B2 | 11/2003 | Glezer et al. | |
| 6,648,270 B1 | 11/2003 | Burnett et al. | |
| 6,704,624 B2 | 3/2004 | Ortega et al. | |
| 6,708,920 B2 | 3/2004 | Fukuyama | |
| 6,745,977 B1 | 6/2004 | Long et al. | |
| 6,751,530 B2 | 6/2004 | Seifert et al. | |
| D496,606 S | 9/2004 | Sanders, Jr. | |
| 6,808,140 B2 | 10/2004 | Moller | |
| 6,817,570 B2 | 11/2004 | Yoeli | |
| 6,824,095 B2 | 11/2004 | Mao | |
| 6,834,832 B2 | 12/2004 | Jamgarov | |
| 6,843,447 B2 | 1/2005 | Morgan | |
| 6,883,748 B2 | 4/2005 | Yoeli | |
| 6,886,776 B2 | 5/2005 | Wagner et al. | |
| 6,892,979 B2 | 5/2005 | Milde | |
| 6,892,980 B2 | 5/2005 | Kawai | |
| 6,913,226 B2 | 7/2005 | Huynh | |
| 6,926,322 B2 | 8/2005 | Browne et al. | |
| 6,969,027 B2 | 11/2005 | Ishiba | |
| 6,974,105 B2 | 12/2005 | Pham | |
| 7,246,769 B2 | 7/2007 | Yoeli | |
| 7,249,732 B2 | 7/2007 | Sanders, Jr. et al. | |
| 7,267,300 B2 | 9/2007 | Heath et al. | |
| 7,275,712 B2 | 10/2007 | Yoeli | |

(56) References Cited

U.S. PATENT DOCUMENTS

| | | |
|---|---|---|
| 7,364,115 B2 | 4/2008 | Parks et al. |
| 7,717,368 B2 | 5/2010 | Yoeli |
| 7,789,342 B2 | 9/2010 | Yoeli |
| 7,806,362 B2 | 10/2010 | Yoeli |
| 7,857,253 B2 | 12/2010 | Yoeli |
| 7,918,416 B2 | 4/2011 | Yoeli |
| 7,946,528 B2 | 5/2011 | Yoeli |
| 8,020,804 B2 | 9/2011 | Yoeli |
| 8,066,220 B2 | 11/2011 | Kirstein |
| 8,342,441 B2 | 1/2013 | Yoeli |
| 2002/0060267 A1 | 5/2002 | Yavnai |
| 2002/0161488 A1 | 10/2002 | Guillemin et al. |
| 2003/0062442 A1 | 4/2003 | Milde, Jr. |
| 2003/0062443 A1 | 4/2003 | Wagner et al. |
| 2003/0080242 A1 | 5/2003 | Kawai |
| 2003/0085319 A1 | 5/2003 | Wagner et al. |
| 2003/0127559 A1 | 7/2003 | Walmsley |
| 2003/0195673 A1 | 10/2003 | Foch et al. |
| 2004/0026563 A1 | 2/2004 | Moller |
| 2004/0104303 A1 | 6/2004 | Mao |
| 2005/0029407 A1 | 2/2005 | Pohl et al. |
| 2005/0040283 A1 | 2/2005 | Frazer |
| 2005/0065669 A1 | 3/2005 | Roux et al. |
| 2005/0109875 A1 | 5/2005 | Ouellette et al. |
| 2006/0097107 A1 | 5/2006 | Parks et al. |
| 2006/0113426 A1 | 6/2006 | Yoeli |
| 2006/0226281 A1 | 10/2006 | Walton |
| 2006/0231675 A1 | 10/2006 | Bostan |
| 2007/0018034 A1 | 1/2007 | Dickau |
| 2007/0034734 A1 | 2/2007 | Yoeli |
| 2007/0034738 A1 | 2/2007 | Sanders, Jr. et al. |
| 2007/0158494 A1 | 7/2007 | Burrage |
| 2008/0054121 A1 | 3/2008 | Yoeli |
| 2009/0084907 A1 | 4/2009 | Yoeli |
| 2009/0140102 A1 | 6/2009 | Yoeli |
| 2009/0159757 A1 | 6/2009 | Yoeli |
| 2010/0051740 A1 | 3/2010 | Yoeli |
| 2010/0051753 A1 | 3/2010 | Yoeli |
| 2010/0076625 A1 | 3/2010 | Yoeli |
| 2010/0270419 A1 | 10/2010 | Yoeli |
| 2011/0042509 A1 | 2/2011 | Bevirt et al. |
| 2011/0042510 A1 | 2/2011 | Bevirt et al. |
| 2011/0049306 A1 | 3/2011 | Yoeli |
| 2011/0049307 A1 | 3/2011 | Yoeli |
| 2011/0174920 A1 | 7/2011 | Yoeli |
| 2012/0080564 A1 | 4/2012 | Yoeli |

FOREIGN PATENT DOCUMENTS

| | | |
|---|---|---|
| EP | 0 922925 | 6/1999 |
| FR | 1347733 | 1/1964 |
| GB | 935884 | 9/1963 |
| GB | 951186 | 3/1964 |
| IT | 666076 A | 8/1964 |
| SE | 184314 | 6/1963 |
| WO | 01/93039 A1 | 12/2001 |
| WO | 02/096750 A2 | 12/2002 |
| WO | 02/098732 A2 | 12/2002 |
| WO | 03/016134 A1 | 2/2003 |
| WO | 2004/012993 A1 | 2/2004 |
| WO | 2004/031876 A1 | 4/2004 |
| WO | 2004/065208 A2 | 8/2004 |
| WO | 2005/039972 A2 | 5/2005 |
| WO | 2006/072960 A2 | 7/2006 |
| WO | 2006/131920 | 12/2006 |
| WO | 2007/052271 A2 | 5/2007 |
| WO | 2007/099543 A2 | 9/2007 |
| WO | 2007/129313 A2 | 11/2007 |
| WO | 2008/065654 A2 | 6/2008 |
| WO | 2008/065664 A2 | 6/2008 |
| WO | 2008/135973 A2 | 11/2008 |
| WO | 2009/077968 A2 | 6/2009 |
| WO | 2009/147630 A1 | 12/2009 |
| WO | 2010/026517 A2 | 3/2010 |
| WO | 2010/067325 A2 | 6/2010 |

OTHER PUBLICATIONS

Edward D. Flinn, "Revolutionary X-Hawk Hovers Near Success," Aerospace America, Jul. 2003, pp. 26-28.
Raymond L. Robb, "Driving on Air: $20^{th}$ Century Flying Carpets," Vertiflite, vol. 51, No. 1, Spring 2005, pp. 2-11.
Urban Aeronautics Ltd., "The X-Hawk VTOL Utility Vehicle" —product description and specifications, 2004.
Piasecki Aircraft Corporation Product Description and History for Piasecki VZ-8 VTOL research vehicle (undated).
De Lorean DMC-12, alleged to have first been produced in 1981 (images available from Wikipedia, the free encyclopedia, at http://en.wikipedia.org/wiki/De_Lorean_DMC-12).
International Search Report for International Application No. PCT/IL02/00417 (now WO 02/096750), dated May 23, 2003, published Oct. 2, 2003.
Written Opinion in International Application No. PCT/IL02/00417 (now WO 02/096750), Aug. 19, 2003.
International Preliminary Examination Report for International Application No. PCT/IL02/00417 (now WO 02/096750), Oct. 20, 2003.
Corrected International Preliminary Examination Report for International Application No. PCT/IL02/00417 (now WO 02/096750), Jul. 25, 2004.
International Search Report for International Application No. PCT/IL02/000439 (now WO 2002/098732), dated Apr. 28, 2003, published Mar. 18, 2004.
International Preliminary Examination Report in International Application No. PCT/IL02/000439 (now WO 2002/098732), Jul. 26, 2004.
International Search Report for International Application No. PCT/IL02/00682 (now WO 03/016134 (Yoeli)), dated Dec. 6, 2002.
International Search Report for International Application No. PCT/IL03/00640 (now WO 2004/012993 (Yoeli)), dated Jan. 2, 2004.
International Search Report for International Application No. PCT/IL03/00786 (now WO 2004/031876), Feb. 9, 2004.
International Search Report for International Application No. PCT/IL04/00984 (now WO 2005/039972 (Yoeli)), dated Dec. 6, 2005, published Jan. 26, 2006.
Written Opinion of the International Searching Authority in International Application No. PCT/IL04/00984 (now WO 2005/039972 (Yoeli)), dated Dec. 6, 2005.
International Preliminary Report on Patentability in International Application No. PCT/IL04/00984 (now WO 2005/039972 (Yoeli)), dated May 1, 2006.
Written Opinion/Search Report of the International Searching Authority in International Application No. PCT/IL06/00032 (now WO 2006/072960 (Yoeli)), dated Sep. 11, 2006.
International Preliminary Report on Patentability in International Application No. PCT/IL06/00032 (now WO 2006/072960 (Yoeli)), dated Sep. 11, 2006.
International Search Report for International Application No. PCT/IL06/00663 (now WO 2006/131920) (Yoeli) dated Dec. 19, 2006.
Written Opinion of the International Searching Authority in International Application No. PCT/IL06/00663 (now WO 2006/131920) (Yoeli) dated Dec. 19, 2006.
International Search Report for International Application No. PCT/IL06/01264 (now Wo 2007/052271 A2) (Yoeli) dated Aug. 5, 2008.
Written Opinion of the International Searching Authority in International Application No. PCT/IL06/01264 (now WO 2007/052271 A2) (Yoeli) dated Aug. 5, 2008.
Written Opinion and Search Report of the International Searching Authority in International Application No. PCT/IL07/00271 (now WO 2007/099543 A2) (Yoeli) dated Oct. 28, 2008.
International Search Report for International Application No. PCT/IL07/00544 (now WO 2007/129313) (Yoeli) dated Jul. 7, 2008.
Written Opinion of the International Searching Authority in International Application No. PCT/IL07/00544 (now WO 2007/129313) (Yoeli) dated Jul. 7, 2008.

(56) References Cited

OTHER PUBLICATIONS

International Search Report for International Application No. PCT/IL0701465 (now WO 2008/065654) (Yoeli) dated Sep. 30, 2008.
Written Opinion of the International Searching Authority in International Application No. PCT/IL0701465 (now WO 2008/065654) (Yoeli) dated Sep. 30, 2008.
Written Opinion and Search Report of the International Searching Authority in International Application No. PCT/IL07/01475 (now WO 2008/065664 A2) (Yoeli) dated Sep. 2, 2008.
Corrected Written Opinion and Search Report of the International Searching Authority in International Application No. PCT/IL07/01475 (now WO 2008/065664 A2) (Yoeli) dated Jul. 27, 2009.
International Search Report for International Application No. PCT/IL08/00575 (now WO 2008/135973) (Yoeli) dated Oct. 28, 2008.
Written Opinion of the International Searching Authority in International Application No. PCT/IL08/00575 (now WO 2008/135973) (Yoeli) dated Oct. 28, 2008.
Written Opinion and International Search Report of the International Searching Authority in International Application No. PCT/IB08/055301 (now WO 2009/077968) (Yoeli) dated Aug. 14, 2009.
Written Opinion and International Search Report of the International Searching Authority in International Application No. PCT/IB09/052346 (Yoeli) (now WO2009-147630 A1) dated Oct. 20, 2009.
Written Opinion and International Search Report of the International Searching Authority in International Application No. PCT/IB09/053768 (Yoeli) (now WO2010-026517 A2) dated Mar. 3, 2010.
Written Opinion and International Search Report of the International Searching Authority in International Application No. PCT/IB09/55656 (now WO 2010-067325 A2) dated Sep. 30, 2010.
U.S. Appl. No. 13/071,858, (Yoeli) filed Mar. 25, 2011.

* cited by examiner

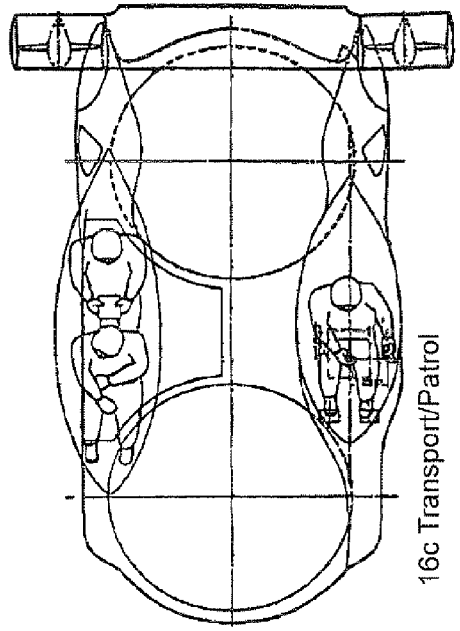
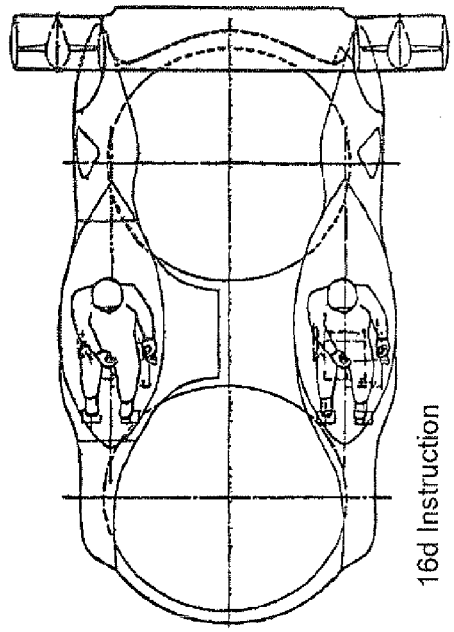
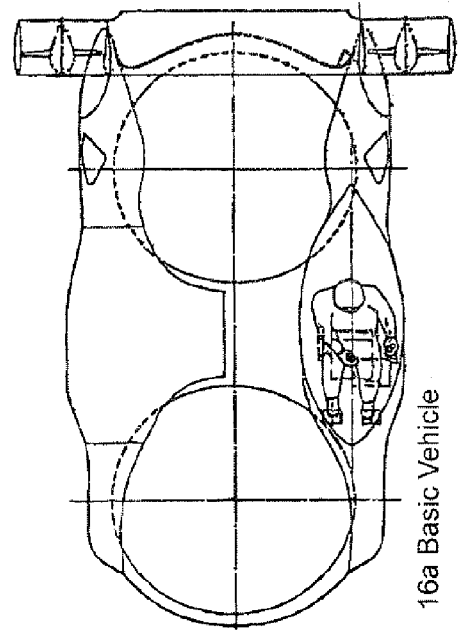
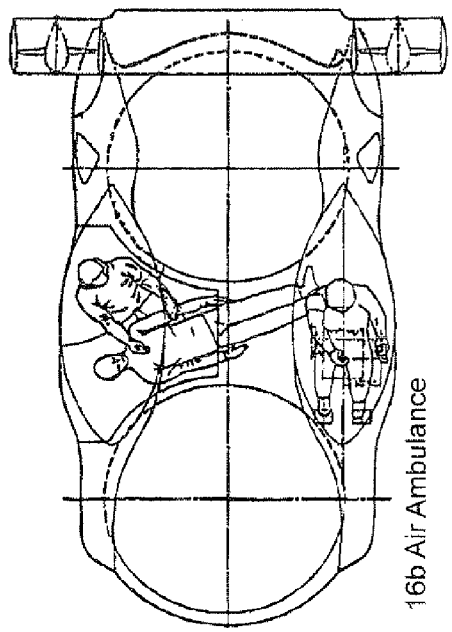
FIG. 16

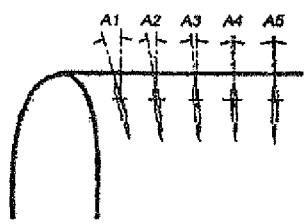
Detail A
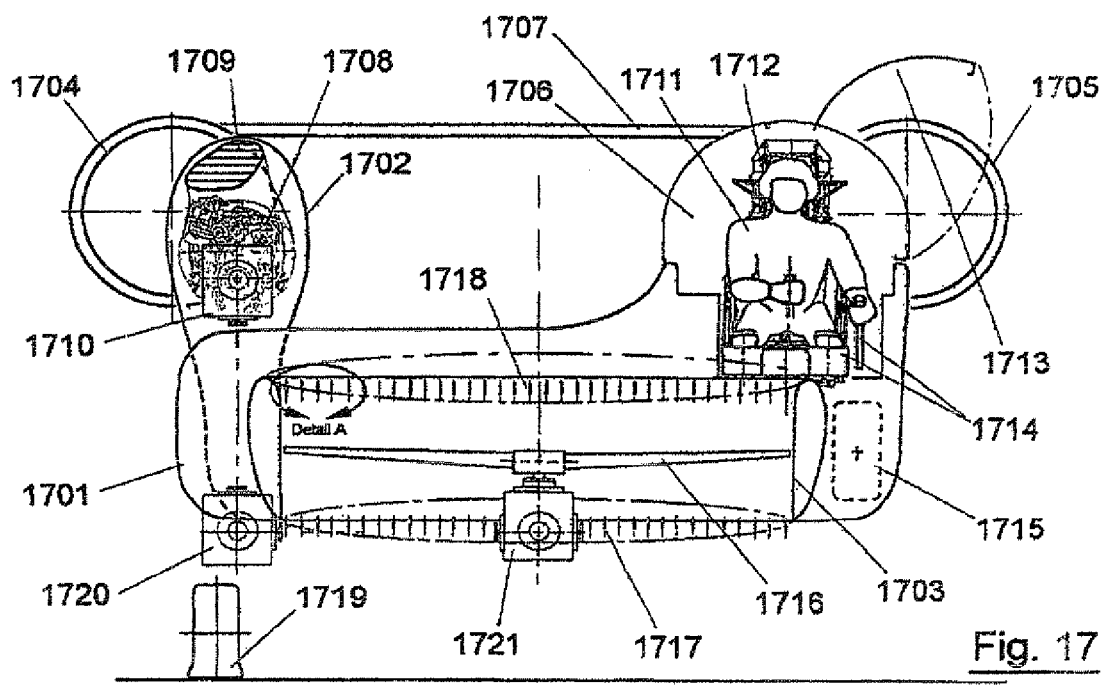
Fig. 17

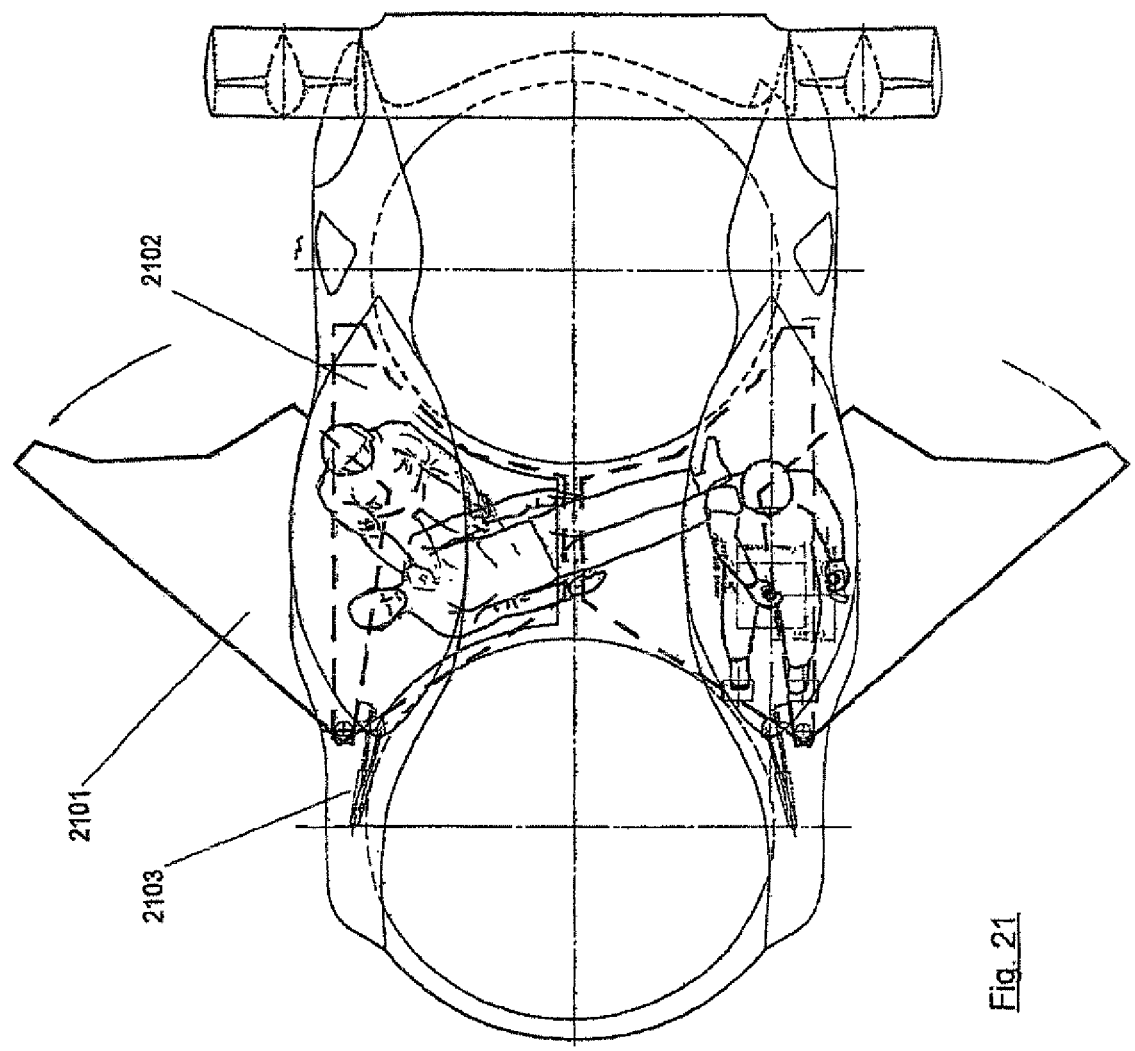

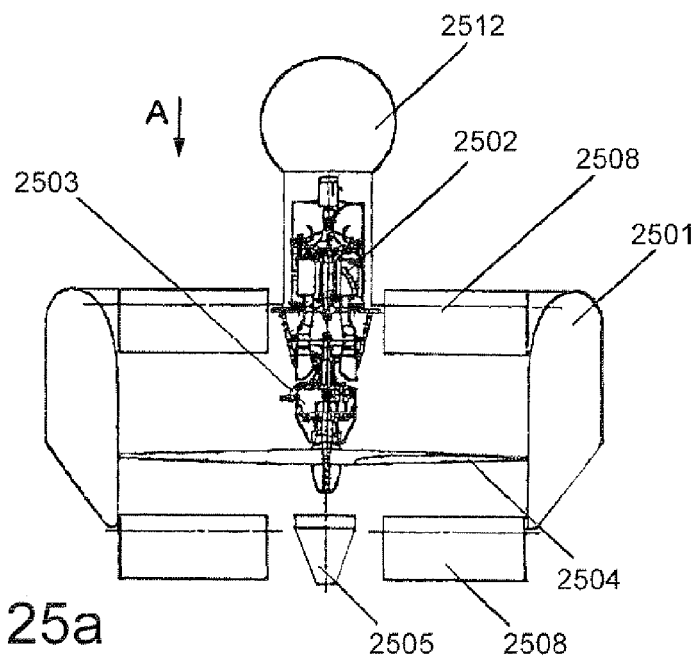
FIG. 25a
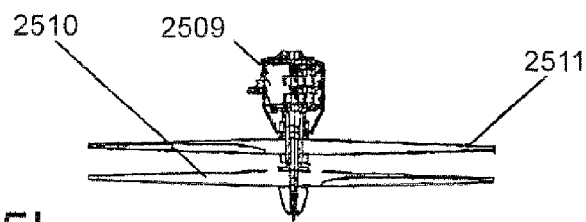
FIG. 25b
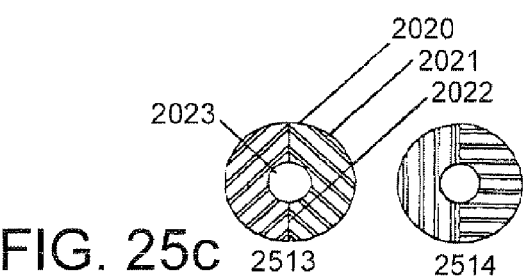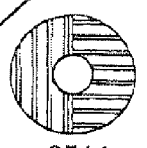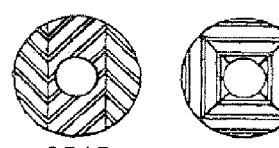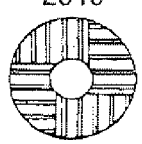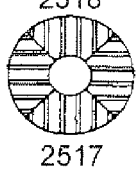
FIG. 25c

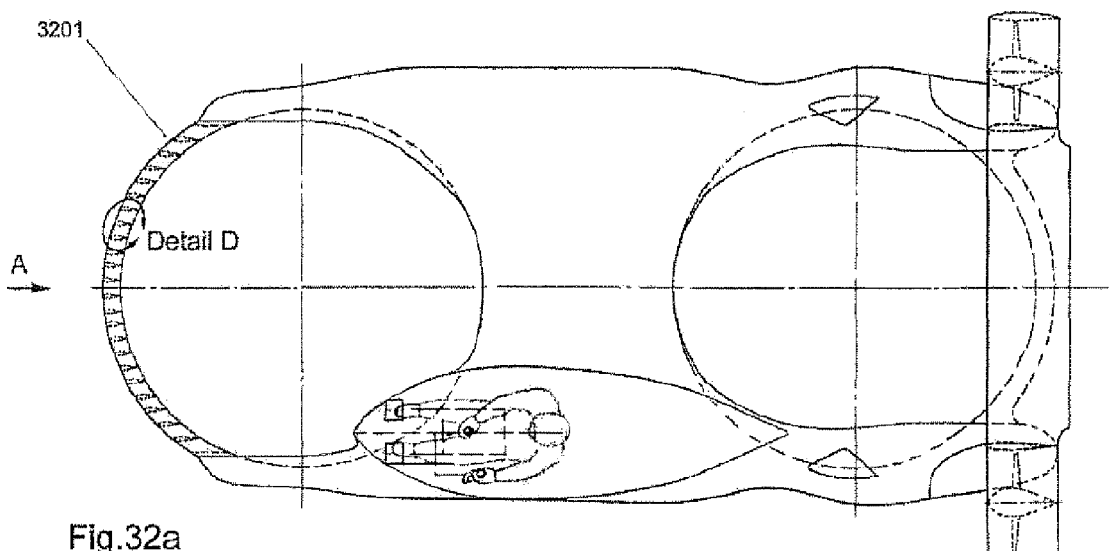
Fig. 32a
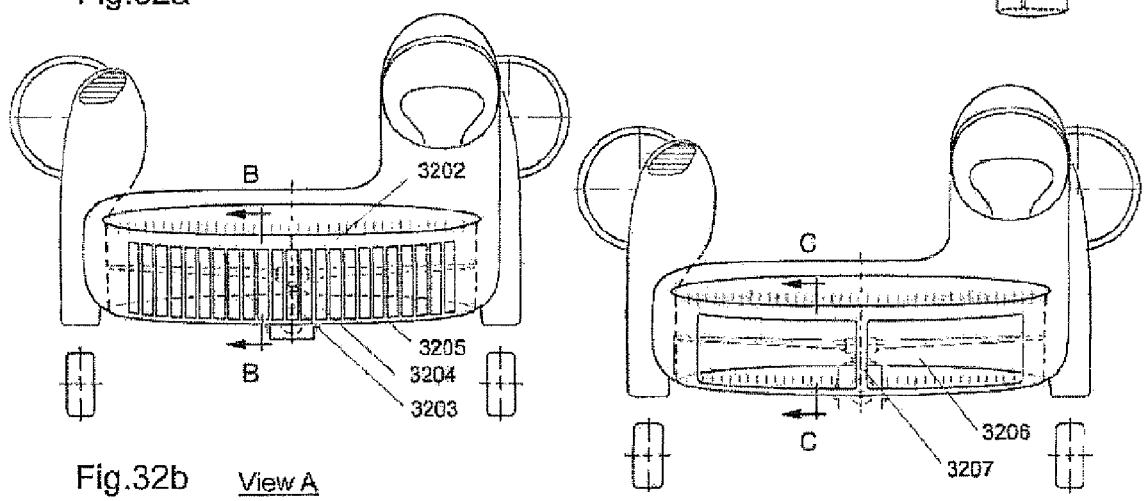
Fig. 32b  View A
Fig. 32c  View A (optional)
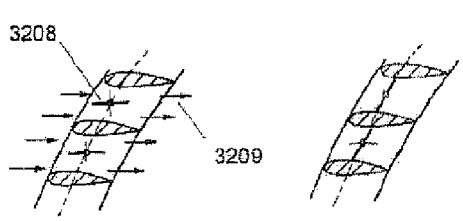
Fig. 32d    Fig. 32e
Detail D
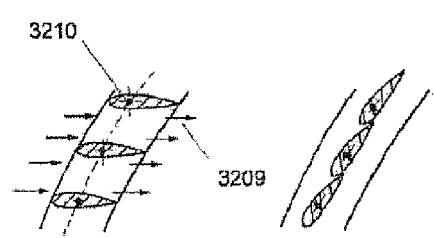
Fig. 32f    Fig. 32g
B-B
C-C

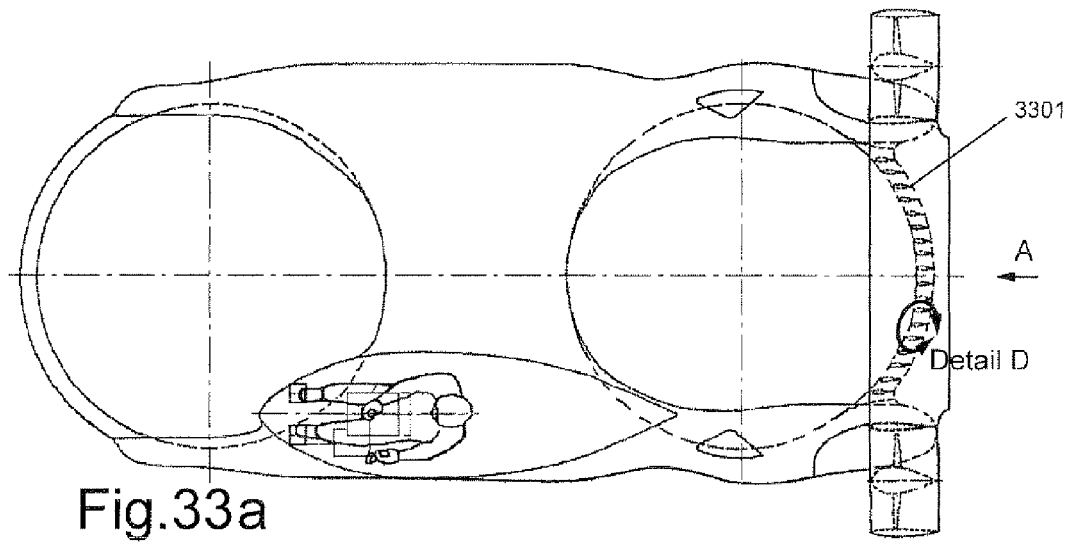
Fig.33a
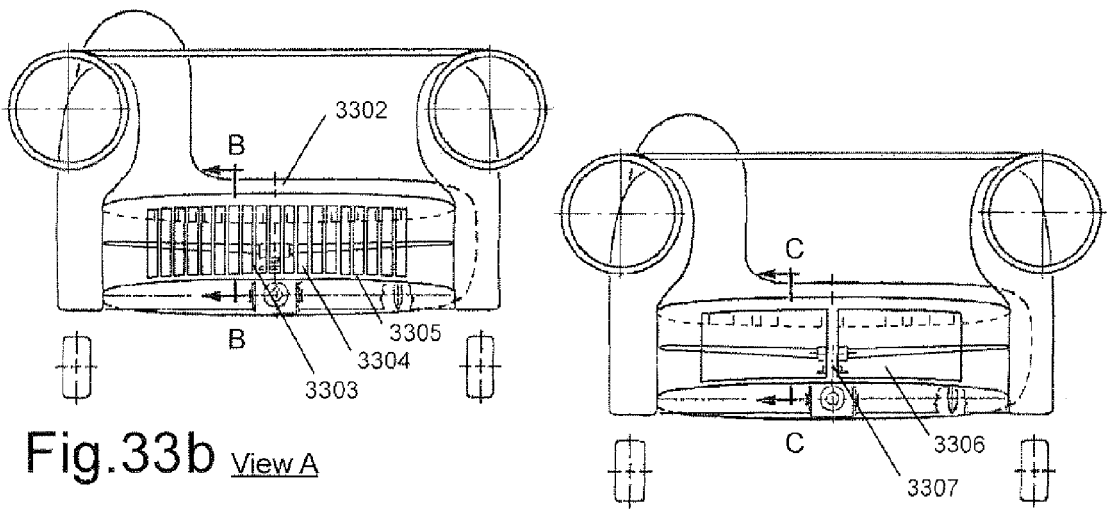
Fig.33b View A
Fig.33c View A (optional)
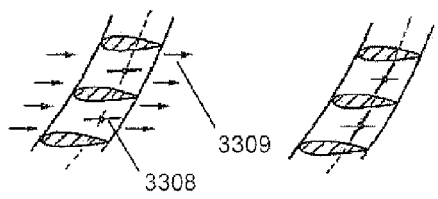
Fig.33d  Fig.33e
Detail D
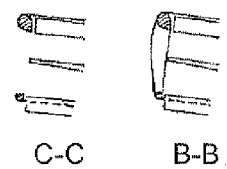
C-C  B-B
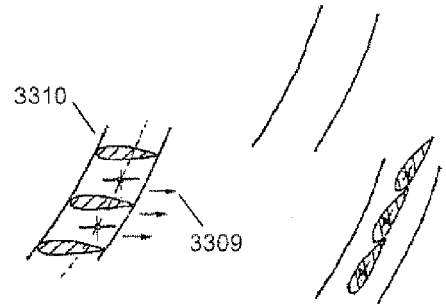
Fig.33f  Fig.33g

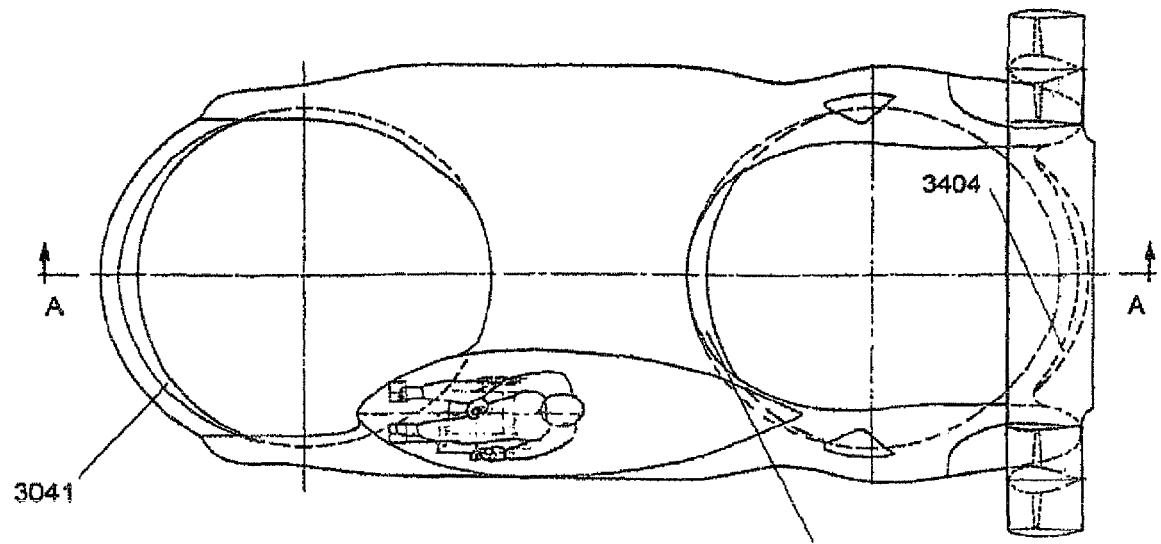
Fig.34a
Section A-A
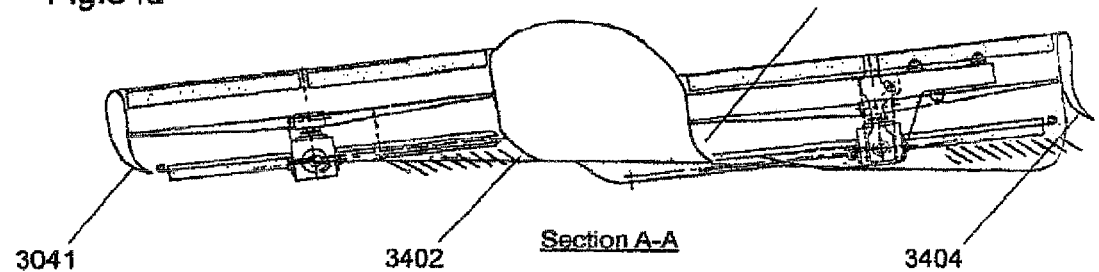
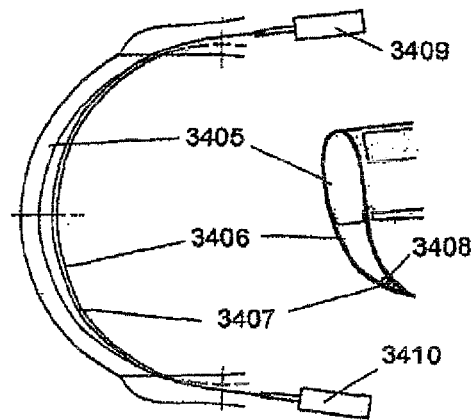
Fig.34b

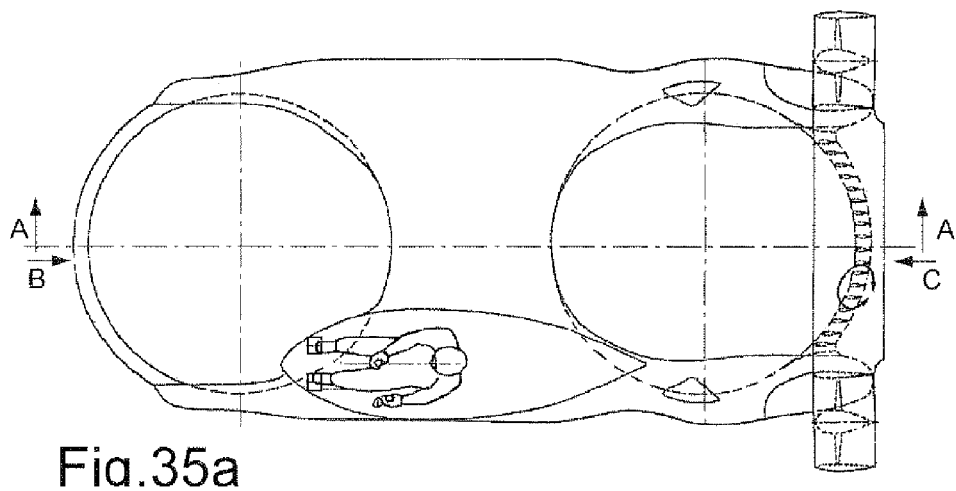
Fig.35a
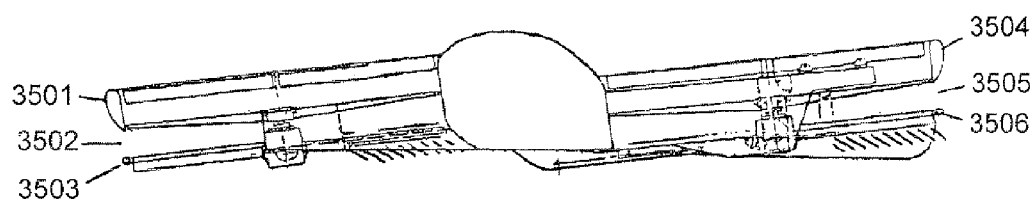
Section A-A
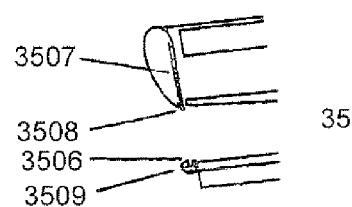
Fig.35b
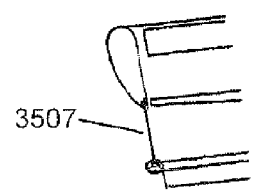
Fig.35c
View B
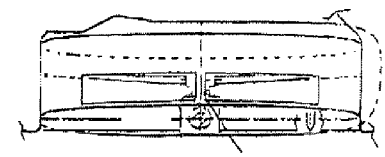
View C

DUCTED FAN VTOL VEHICLES

CROSS-REFERENCE TO RELATED APPLICATIONS

The application is a continuation of U.S. patent application Ser. No. 11/411,243 filed Apr. 26, 2006, which is a continuation-in-part of PCT Application PCT/IL2004/000984 filed Oct. 27, 2004, claiming priority from U.S. Provisional Patent Application Nos. 60/514,555, filed Oct. 27, 2003 and 60/603,274, filed Aug. 23, 2004. Priority is also claimed from U.S. Provisional Patent Application No. 60/731,924 filed Nov. 1, 2005. The entire subject matter of all of the above is incorporated by reference.

FIELD AND BACKGROUND OF THE INVENTION

The present invention relates to vehicles, and particularly to Vertical Take-Off and Landing (VTOL) vehicles having multi-function capabilities.

VTOL vehicles rely on direct thrust from propellers or rotors, directed downwardly, for obtaining lift necessary to support the vehicle in the air. Many different types of VTOL vehicles have been proposed where the weight of the vehicle in hover is carried directly by rotors or propellers, with the axis of rotation perpendicular to the ground. One well known vehicle of this type is the conventional helicopter which includes a large rotor mounted above the vehicle fuselage. Other types of vehicles rely on a multitude of propellers that are either exposed (e.g., unducted fans), or installed inside circular cavities, shrouds, ducts or other types of nacelle (e.g., ducted fans), where the flow of air takes place inside ducts. Some VTOL vehicles (such as the V-22) use propellers having their axes of rotation fully rotatable (up to 90 degrees or so) with respect to the body of the vehicle; these vehicles normally have the propeller axis perpendicular to the ground for vertical takeoff and landing, and then tilt the propeller axis forward for normal flight. Other vehicles use propellers having nearly horizontal axes, but include aerodynamic deflectors installed behind the propeller which deflect all or part of the flow downwardly to create direct upward lift.

A number of VTOL vehicles have been proposed in the past where two or four propellers, usually mounted inside ducts (i.e., ducted fans), were placed forwardly of, and rearwardly of, the main payload of the vehicle. One typical example is the Piasecki VZ-8 'Flying Jeep' which had two large ducts, with the pilots located to the sides of the vehicle, in the central area between the ducts. A similar configuration was used on the Chrysler VZ-6 and on the CityHawk flying car. Also the Bensen 'Flying Bench' uses a similar arrangement. The Curtiss Wright VZ-7 and the Moller Skycar use four, instead of two, thrusters where two are located on each side (forward and rear) of the pilots and the payload, the latter being of fixed nature at the center of the vehicle, close to the vehicle's center of gravity.

The foregoing existing vehicles are generally designed for specific functions and are therefore not conveniently capable of performing a multiplicity of functions.

SUMMARY OF THE INVENTION

An object of the present invention is to provide a vehicle of a relatively simple inexpensive construction and yet capable of performing a multiplicity of different functions.

According to the present invention, there is provided a vehicle, comprising: a fuselage having a longitudinal axis and a transverse axis; at least one lift-producing propeller carried by the fuselage on each side of the transverse axis; a pilot's compartment formed in the fuselage between the lift-producing propellers and substantially aligned with the longitudinal axis; and a pair of payload bays formed in the fuselage between the lift-producing propellers and on opposite sides of the pilot's compartment.

According to further features in the preferred embodiments of the invention described below, each of the payload bays includes a cover deployable to an open position providing access to the payload bay, and to a closed position covering the payload bay. In some described preferred embodiments, the cover of each of the payload bays is pivotally mounted to the fuselage along an axis parallel to the longitudinal axis of the fuselage at the bottom of the respective payload bay, such that when the cover is pivoted to the open position it also serves as a support for supporting the payload or a part thereof in the respective payload bay.

Various embodiments of the invention are described below, wherein the lift propellers are ducted or unducted fans, and wherein the fuselage carries a pair of the lift producing propellers on each side of the transverse axis, a vertical stabilizer at the rear end of the fuselage, or a horizontal stabilizer at the rear end of the fuselage.

Several preferred embodiments are also described below wherein the fuselage further carries a pair of pusher propellers at the rear end of the fuselage, on opposite sides of the longitudinal axis. In the described embodiments, the fuselage carries two engines, each for driving one of the lift-producing propellers and pusher propellers with the two engines being mechanically coupled together in a common transmission. In one described preferred embodiment, the two engines are located in engine compartments in pylons formed in the fuselage on opposite sides of its longitudinal axis. In another described embodiment, the two engines are located in a common engine compartment aligned with the longitudinal axis of the fuselage and underlying the pilot's compartment.

One preferred embodiment is described wherein the vehicle is a vertical take-off and landing (VTOL) vehicle and includes a pair of stub wings each pivotally mounted under one of the payload bays to a retracted, stored position, and to an extended, deployed position for enhancing lift. Another embodiment is described wherein the vehicle includes a flexible skirt extending below the fuselage enabling the vehicle to be used as, or converted to, a hovercraft for movement over ground or water. A further embodiment is described wherein the vehicle includes large wheels attachable to the rear end of the fuselage for converting the vehicle to an all terrain vehicle (ATV).

As will be described more particularly below, a vehicle constructed in accordance with the foregoing features may be of a relatively simple and inexpensive construction capable of conveniently performing a host of different functions besides the normal functions of a VTOL vehicle. Thus, the foregoing features enable the vehicle to be constructed as a utility vehicle for a large array of tasks including serving as a weapons platform; transporting personnel, weapons, and/or cargo; evacuating medically wounded, etc., without requiring major changes in the basic structure of the vehicle when transferring from one task to another.

According to further features in the preferred embodiments of the invention described below an alternative vehicle arrangement is described wherein the vehicle is relatively small in size, having insufficient room for installing a cockpit in the middle of the vehicle and where the pilot's cockpit is therefore installed to one side of the vehicle, thereby creating a large, single payload bay in the remaining area between the two lift-producing propellers.

According to further features in the preferred embodiments of the invention described below an alternative vehicle arrangement is described wherein the vehicle does not feature any form of pilot's enclosure, for use in an unmanned role, piloted by suitable on-board electronic computers or being remotely controlled from the ground.

Additional features in the exemplary embodiments relate to a central portion of the aircraft fuselage that may be aerodynamically shaped to enhance the life characteristics of the vehicle. In one example, the central portion of the fuselage is airfoil-shaped to create an increase in negative pressure above the fuselage and to increase positive pressure below the fuselage, thereby providing additional aerodynamic lift.

Further features and advantages of the invention will be apparent from the description below. Some of those describe unique features applicable in any single or multiple ducted fan and VTOL vehicles.

BRIEF DESCRIPTION OF THE DRAWINGS

The invention is herein described, by way of example only, with reference to the accompanying drawings, wherein:

FIGS. 16a-16d show top views of the vehicle of FIGS. 14a-14e with several payload arrangements;

FIG. 17 is a see-through front view of the vehicle of FIG. 16a showing various additional features and internal arrangement details of the vehicle;

FIG. 21 is a top view showing the vehicle of FIG. 16b as equipped with a extendable wing for high speed flight;

FIGS. 25a-25c show schematic cross sections and design details of an optional single duct Unmanned vehicle;

FIGS. 32a and 32b illustrate one arrangement for enabling external airflow to penetrate a forward side of the forward duct wall;

FIGS. 32c illustrates another configuration for airflow penetration of the forward duct wall;

FIGS. 32d and 32e illustrate a valve actuating arrangement from opening and closing slots in the forward duct wall FIGS. 32f and 32g iilustrate an alternative actuating arrangement;

FIGS 33a and 33b illustrate one arrangement for enabling internal airflow to exit the aft duct wall;

FIG. 33c illustrates an alternative to the configuration in FIGS. 33a and 33b; FIGS. 33d and 33e illustrate valve actuation arrangement for opening an closing slots in the aft duct wall; FIGS. 33f and 33g an alternative actuating arrangement for opening and closing slots in t:he aft duos wall;

FIG. 34 illustrates means for directing the internal airflow to exit with a rearward velocity component for the purpose of minimizing the momentum drag of the vehicle in forward flight;

FIGS. 35a-c illustrate additional optional means for enabling the external airflow to penetrate the walls of the forward duct and the internal airflow to exit through the walls of the aft ducted fan of the vehicles described in FIGS. 1-21 and FIGS. 30-31, while in forward flight, for the purpose of minimizing the momentum drag of the vehicle;

It is to be understood that the foregoing drawings, and the description below, are provided primarily for purposes of facilitating understanding the conceptual aspects of the invention and various possible embodiments thereof, including what is presently considered to be a preferred embodiment. In the interest of clarity and brevity, no attempt is made to provide more details than necessary to enable one skilled in the art, using routine skill and design, to understand and practice the described invention. It is to be further understood that the embodiments described are for purposes of example only, and that the invention is capable of being embodied in other forms and applications than described herein.

DETAILED DESCRIPTION OF PREFERRED EMBODIMENTS

As indicated earlier, the present invention provides a vehicle of a novel construction which permits it to be used for a large variety of tasks and missions with no changes, or minimum changes, required when converting from one mission to another.

Figure 1:
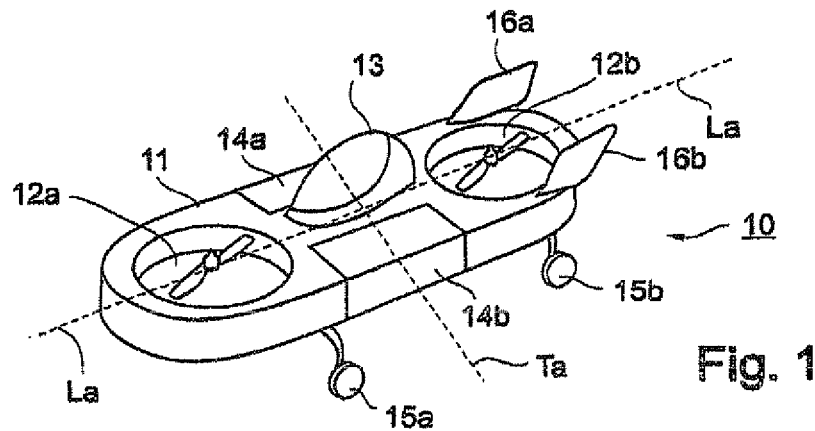
FIG. 1 illustrates one form of VTOL vehicle constructed in accordance with present invention with two ducted fans.

The basic construction of such a vehicle is illustrated in FIG. 1, and is therein generally designated 10. It includes a fuselage 11 having a longitudinal axis LA and a transverse axis TA. Vehicle 10 further includes two lift-producing propellers 12a, 12b carried at the opposite ends of the fuselage 11 along its longitudinal axis LA and on opposite sides of its transverse axis TA. Lift-producing propellers 12a, 12b are ducted fan propulsion units extending vertically through the fuselage and rotatable about vertical axes to propel the air downwardly and thereby to produce an upward lift.

Vehicle 10 further includes a pilot's compartment 13 formed in the fuselage 11 between the lift-producing propellers 12a, 12 and substantially aligned with the longitudinal axis LA and transverse axis TA of the fuselage. The pilot's compartment 13 may be dimensioned so as to accommodate a single pilot or two (or more) pilots, as shown, for example, in FIG. 6a.

Vehicle 10 illustrated in FIG. 1 further includes a pair of payload bays 14a, 14b formed in the fuselage 11 laterally on the opposite sides of the pilot's compartment 13 and between the lift-producing propellers 12a, 12b. The payload bays 14a, 14b shown in FIG. 1 are substantially flush with the fuselage 11, as will be described more particularly below with respect to FIGS. 6a-6c and the pictorial illustration in FIGS. 8a-8d. Also described below, particularly with respect to the pictorial illustrations of FIGS. 8a-8d, are the wide variety of tasks and missions capable of being accomplished by the vehicle when constructed as illustrated in FIG. 1 (and in the later illustrations), and particularly when provided with the payload bays corresponding to 14a, 14b of FIG. 1.

Vehicle 10 illustrated in FIG. 1 further includes a front landing gear 15a and a rear landing gear 15b mounted at the opposite ends of its fuselage 11. In FIG. 1 the landing gears are non-retractable, but could be retractable as in later described embodiments. Aerodynamic stabilizing surfaces may also be provided, if desired, as shown by the vertical stabilizers 16a, 16b carried at the rear end of fuselage 11 on the opposite sides of its longitudinal axis LA.

Figure 2:
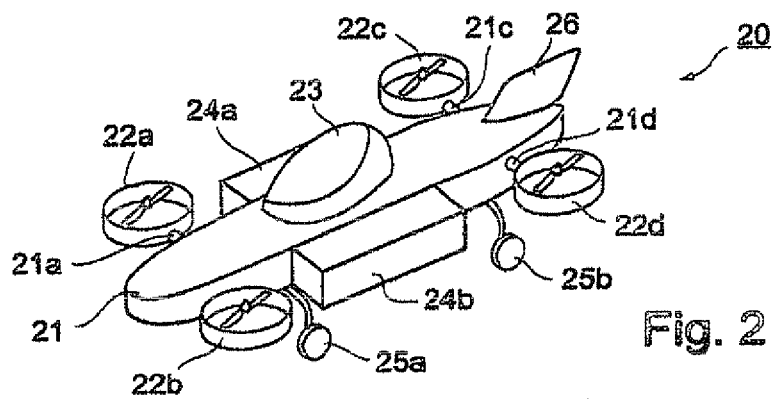
FIG. 2 illustrates an alternative construction with four ducted fans.

FIG. 2 illustrates another vehicle construction in accordance with the present invention. In the vehicle of FIG. 2, therein generally designated 20, the fuselage 21 is provided with a pair of lift-producing propellers on each side of the transverse axis of the fuselage. Thus, as shown in FIG. 2, the vehicle includes a pair of lift-producing propellers 22a, 22b at the front end of the fuselage 21, and another pair of lift-producing propellers 22c, 22d at the rear end of the fuselage. The lift-producing propellers 22a-22d shown in FIG. 2 are also ducted fan propulsion units. However, instead of being formed in the fuselage 21, they are mounted on mounting structures 21a-21d to project laterally of the fuselage.

Vehicle 20 illustrated in FIG. 2 also includes the pilot's compartment 23 formed in the fuselage 21 between the two pairs of lift-producing propellers 22a, 22b and 22c, 22d, respectively. As in the case of the pilot's compartment 13 in FIG. 1, the pilot's compartment 23 in FIG. 2 is also substantially aligned with the longitudinal axis LA and transverse axis TA of the fuselage 21.

Vehicle 20 illustrated in FIG. 2 further includes a pair of payload bays 24a, 24b formed in the fuselage 21 laterally of the pilot's compartment 23 and between the two pairs of lift-producing propellers 22a-22d. In FIG. 2, however, the payload bays are not formed integral with the fuselage, as in FIG. 1, but rather are attached to the fuselage so as to project laterally on opposite sides of the fuselage. Thus, payload bay 24a is substantially aligned with the lift-producing propellers 22a, 22c on that side of the fuselage; and payload bay 24b is substantially aligned with the lift-producing propellers 22b and 22d at that side of the fuselage.

Vehicle 20 illustrated in FIG. 2 also includes a front landing gear 25a and a rear landing gear 25b, but only a single vertical stabilizer 26 at the rear end of the fuselage aligned with its longitudinal axis. It will be appreciated however, that vehicle 20 illustrated in FIG. 2 could also include a pair of vertical stabilizers, as shown at 16a and 16b in FIG. 1, or could be constructed without any such aerodynamic stabilizing surface.

Figure 3:
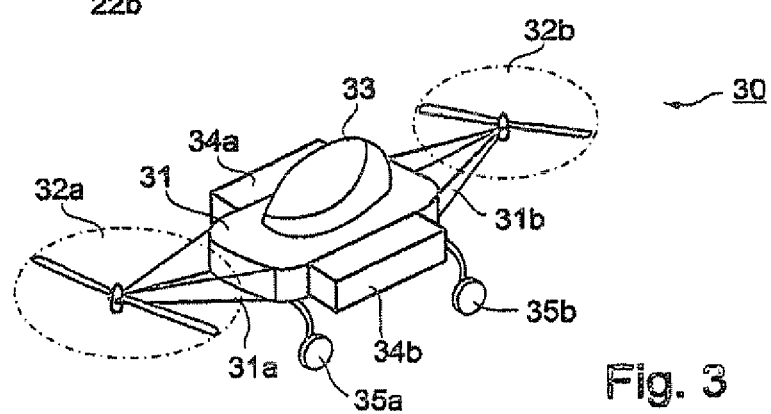
FIG. 3 illustrates a construction similar to FIG. 1 with free propellers, i.e., unducted fans.

FIG. 3 illustrates a vehicle 30 also including a fuselage 31 of a very simple construction having a forward mounting structure 31a for mounting the forward lift-producing propeller 32a, and a rear mounting structure 31b for mounting the rear lift-producing propeller 32b. Both propellers are unducted, i.e., free, propellers. Fuselage 31 is formed centrally thereof with a pilots compartment 33 and carries the two payload bays 34a, 34b on its opposite sides laterally of the pilot's compartment.

Vehicle 30 illustrated in FIG. 3 also includes a front landing gear 35a and a rear landing gear 35b, but for simplification purposes, it does not include an aerodynamic stabilizing surface corresponding to vertical stabilizers 16a, 16b in FIG. 1.

Figure 4:
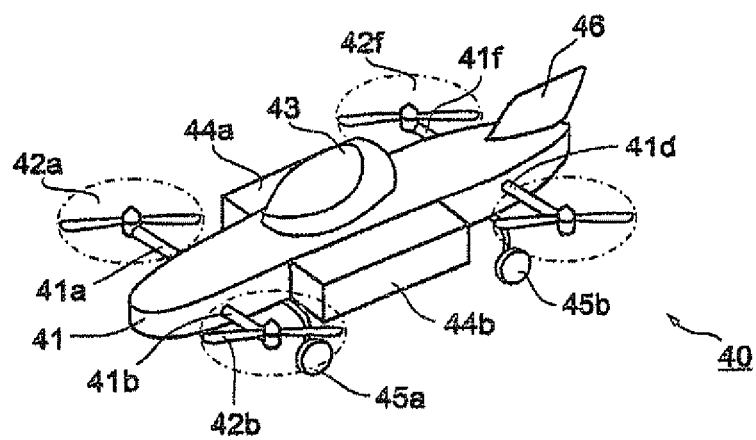
FIG. 4 illustrates a construction similar to FIG. 2 with free propellers.

FIG. 4 illustrates a vehicle, generally designated 40, of a similar construction as in FIG. 2 but including a fuselage 41 mounting a pair of unducted propellers 42a, 42b at its front end, and a pair of unducted propellers 42c, 42d at its rear end by means of mounting structures 41a-41d, respectively. Vehicle 40 further includes a pilot's compartment 43 centrally of the fuselage, a pair of payload bays 44a, 44b laterally of the pilot's compartment, a front landing gear 45a, a rear landing gear 45b, and a vertical stabilizer 46 at the rear end of the fuselage 41 in alignment with its longitudinal axis.

Figure 5:
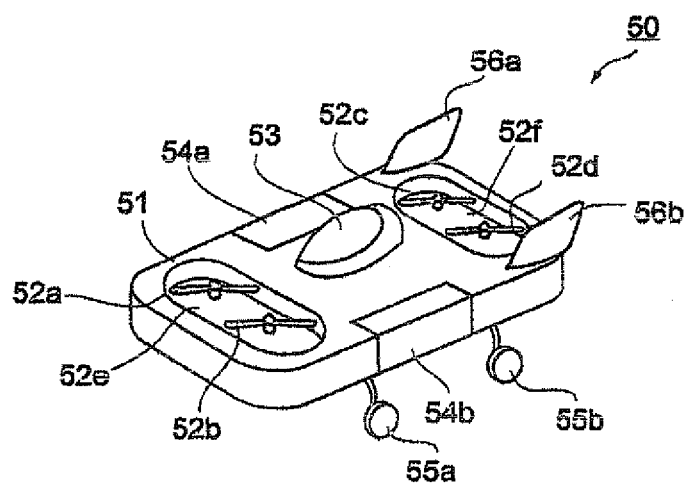
FIG. 5 illustrates a construction similar to that of FIG. 1 but including two propellers, instead of a single propeller, mounted side-by-side in a single, oval shaped duct at each end of the vehicle.

FIG. 5 illustrates a vehicle, generally designated 50, including a fuselage 51 mounting a pair of lift-producing propellers 52a, 52b at its front end, and another pair 52c, 52d at its rear end. Each pair of lift-producing propellers 52a, 52b and 52c, 52d is enclosed within a common oval-shaped duct 52e, 52f at the respective end of the fuselage.

Vehicle 50 illustrated in FIG. 5 further includes a pilot' compartment 53 formed centrally of the fuselage 51, a pair of payload bays 54a, 54b laterally of the pilot's compartment 53, a front landing gear 55a, a rear landing gear 55b, and vertical stabilizers 56a, 56b carried at the rear end of the fuselage 51.

Figure 6A:
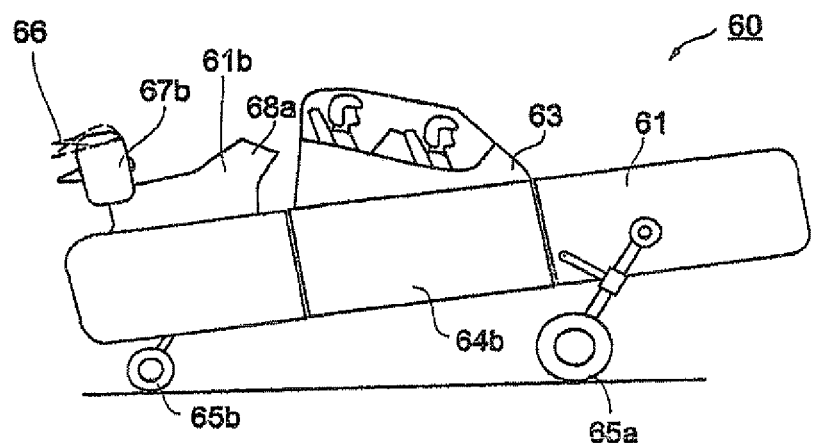
FIGS. 6a, 6b and 6c are side, top and rear views, respectively, illustrating another VTOL vehicle constructed in accordance with the present invention and including pusher propellers in addition to the lift-producing propellers.
Figure 6B:
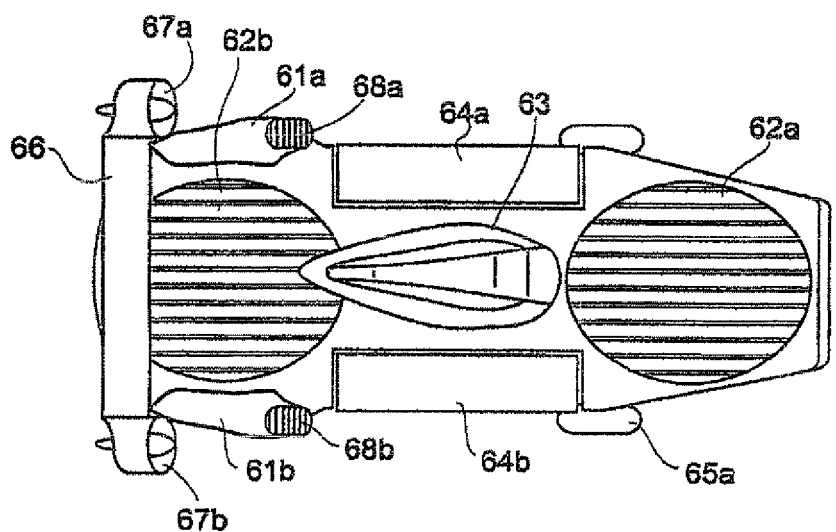
Figure 6C:
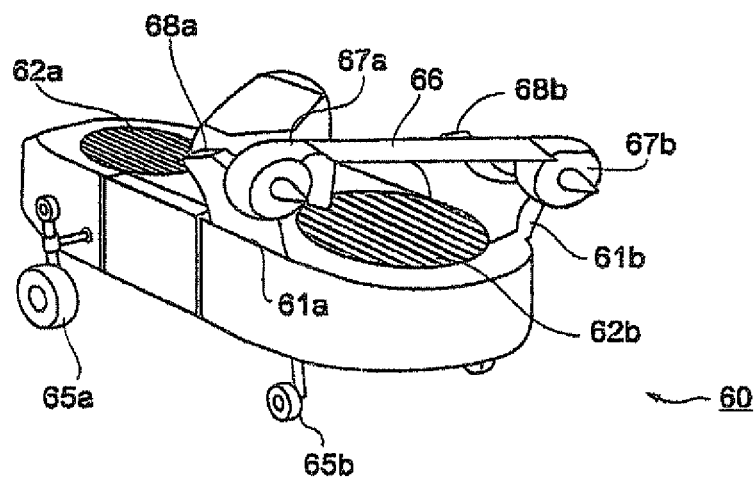

FIGS. 6a, 6b and 6c are side, top and rear views, respectively, of another vehicle constructed in accordance with the present invention. The vehicle illustrated in FIGS. 6a-6c, therein generally designated 60, also includes a fuselage 61 mounting a lift-producing propeller 62a, 62b at its front and rear ends, respectively. The latter propellers are preferably ducted units as in FIG. 1.

Vehicle 60 further includes a pilot's compartment 63 centrally of the fuselage 61, a pair of payload bays 64a, 64b laterally of the fuselage and of the pilot's compartment, a front landing gear 65a, a rear landing gear 65b, and a stabilizer, which, in this case, is a horizontal stabilizer 66 extending across the rear end of the fuselage 61.

Vehicle 60 illustrated in FIGS. 6a-6c further includes a pair of pusher propellers 67a, 67b, mounted at the rear end of the fuselage 61 at the opposite ends of the horizontal stabilizer 66. As shown particularly in FIG. 6c the rear end of the fuselage 61 is formed with a pair of pylons 61a, 61b, for mounting the two pusher propellers 67a, 67b, together with the horizontal stabilizer 66.

The two pusher propellers 67a, 67b are preferably variable-pitch propellers enabling the vehicle to attain higher horizontal speeds. The horizontal stabilizer 66 is used to trim the vehicle's pitching moment caused by the ducted fans 62a, 62b, thereby enabling the vehicle to remain horizontal during high speed flight.

Each of the pusher propellers 67a, 67b is driven by an engine enclosed within the respective pylon 61a, 61b. The two engines are preferably turbo-shaft engines. Each pylon is thus formed with an air inlet 68a, 68b at the forward end of the respective pylon, and with an air outlet (not shown) at the rear end of the respective pylon.

Figure 7:
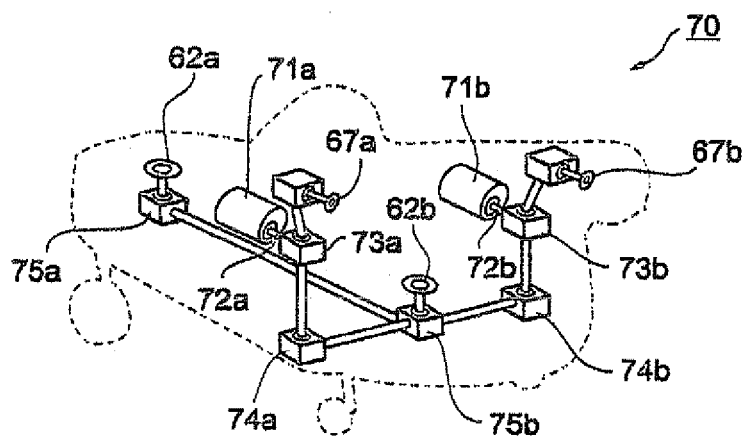
FIG. 7 is a diagram illustrating the drive system in the vehicle of FIGS. 6a-6c.

FIG. 7 schematically illustrates the drive within the vehicle 60 for driving the two ducted fans 62a, 62b as well as the pusher propellers 67a, 67b. The drive system, generally designated 70, includes two engines 71, 71b, each incorporated in an engine compartment within one of the two pylons 61a, 61b. Each engine 71a, 71b, is coupled by an over-running clutch 72a, 72b, to a gear box 73a, 73b coupled on one side to the respective thrust propeller 67a, 67b, and on the opposite side to a transmission for coupling to the two ducted fans 62a, 62b at the opposite ends of the fuselage. Thus, as schematically shown in FIG. 7, the latter transmission includes additional gear boxes 74a, 74b coupled to rear gear box 75b for driving the rear ducted fan 62b, and front gear box 75a for driving the front ducted fan 62b.

Figure 8:
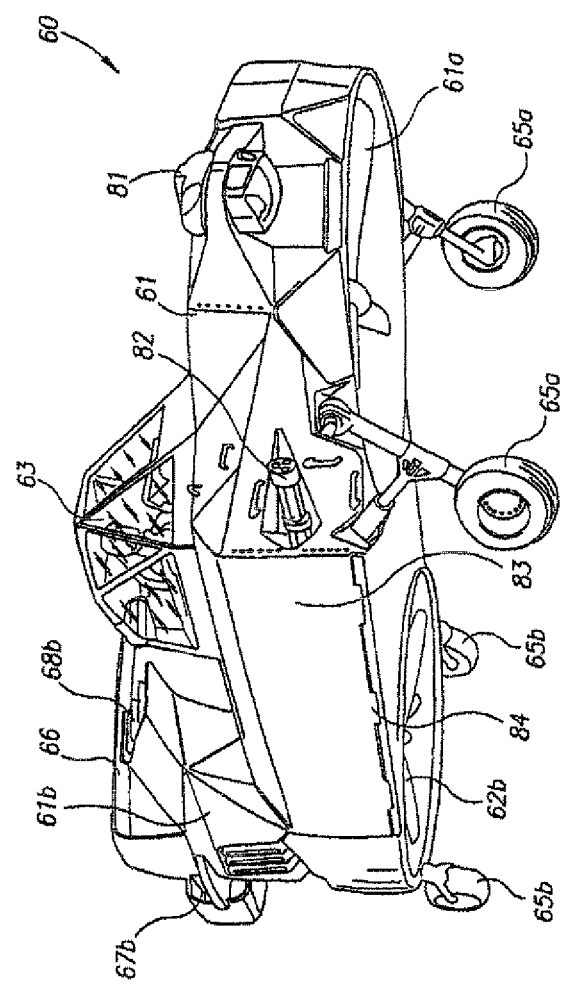
FIG. 8 is a pictorial illustration of a vehicle constructed in accordance with FIGS. 6a-6c and 7.

FIG. 8 pictorially illustrates an example of the outer appearance that vehicle 60 may take.

In the pictorial illustration of FIG. 8, those parts of the vehicle which correspond to the above-described parts in FIGS. 6a-6c are identified by the same reference numerals in order to facilitate understanding. FIG. 8, however, illustrates a number of additional features which may be provided in such a vehicle.

Thus, as shown in FIG. 8, the front end of the fuselage 61 may be provided with a stabilized sight and FLIR (Forward Looking Infra-Red) unit, as shown at 81, and with a gun at the forward end of each payload bay, as shown at 82. In addition, each payload bay may include a cover 83 deployable to an open position providing access to the payload bay, and to a closed position covering the payload bay with respect to the fuselage 61.

In FIG. 8, cover 83 of each payload bay is pivotally mounted to the fuselage 61 along an axis 84 parallel to the longitudinal axis of the fuselage at the bottom of the respective bay. The cover 83, when in its closed condition, conforms to the outer surface of the fuselage 61 and is flush therewith. When the cover 83 is pivoted to its open position, it serves as a support for supporting the payload, or a part thereof, in the respective payload bay.

Figure 8A:
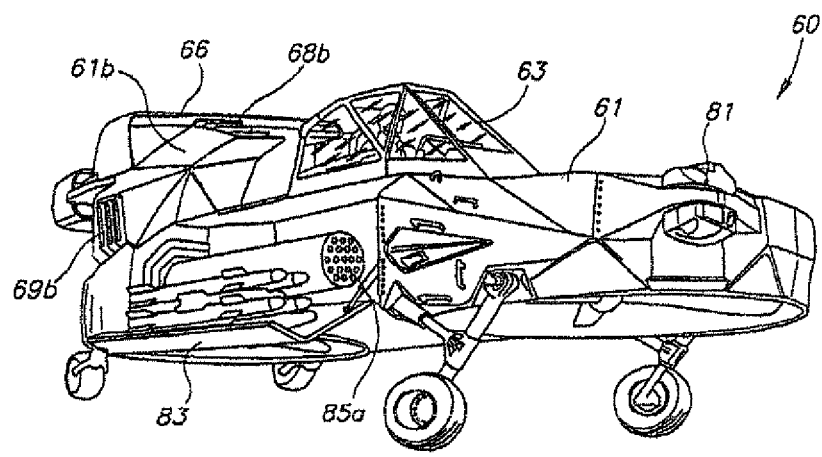
FIGS. 8a-8d illustrate examples of various tasks and missions capable of being accomplished by the vehicle of FIG. 8.
Figure 8B:
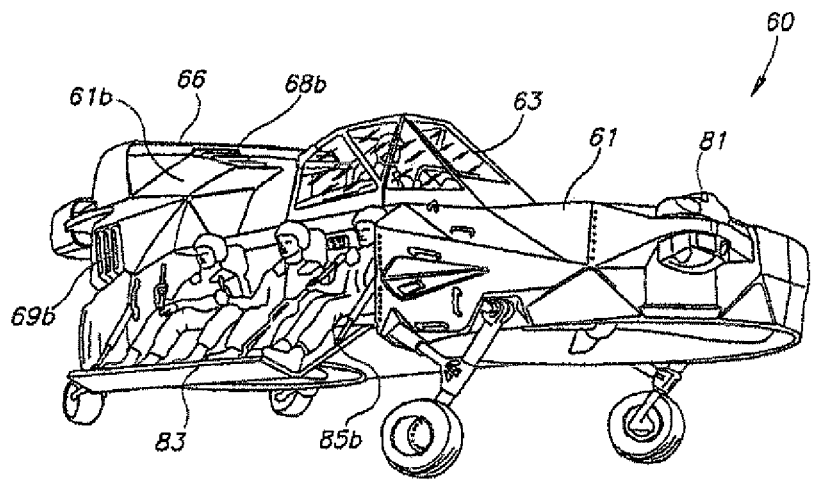
Figure 8C:
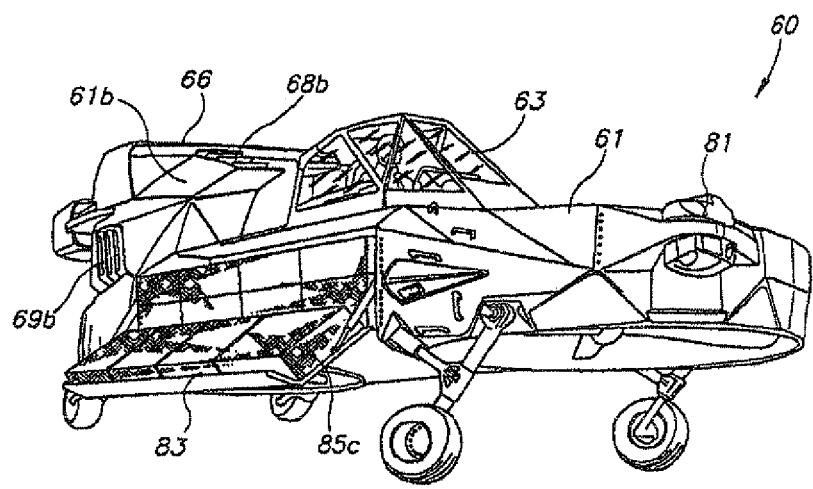
Figure 8D:
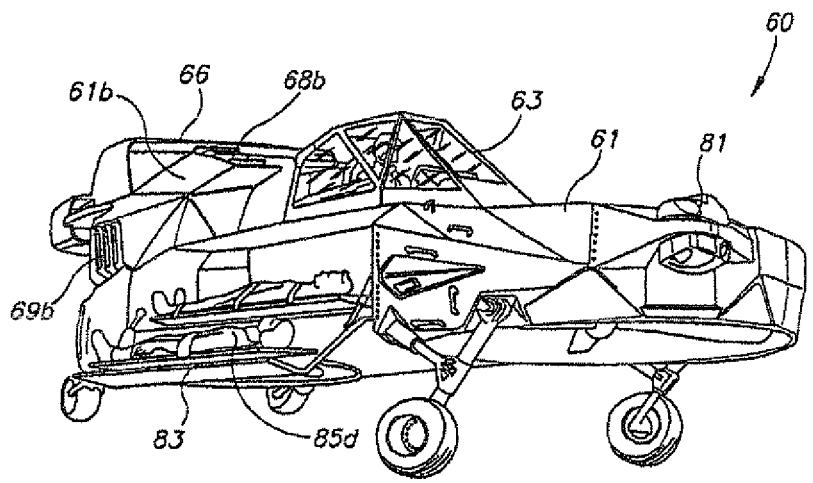

The latter feature is more particularly shown in FIGS. 8a-8d which illustrate various task capabilities of the vehicle as particularly enabled by the pivotal covers 83 for the two payload bays. Thus, FIG. 8a illustrates the payload bays used for mounting or transporting guns or ammunition 85a; FIG. 8b illustrates the use of the payload bays for transporting personnel or troops 85b; FIG. 8c illustrates the use of the payload bays for transporting cargo 85c; and FIG. 6d illustrates the use of the payload bays for evacuating wounded 85d. Many other task or mission capabilities will be apparent.

Figure 9A:
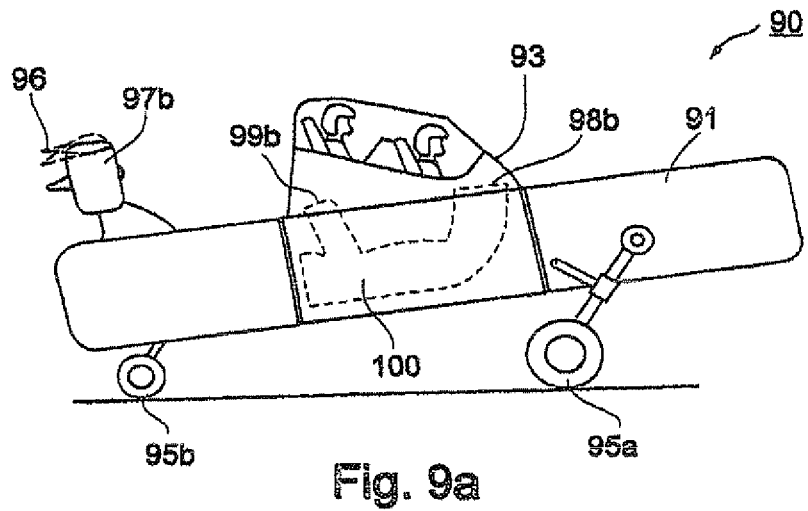
FIGS. 9a and 9b are side and top views, respectively, illustrating another VTOL vehicle constructed in accordance with the present invention.
Figure 9B:
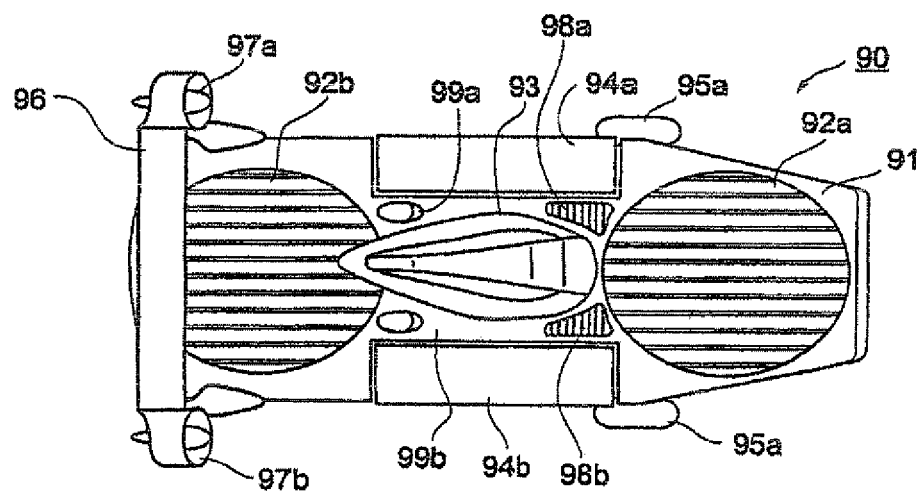

FIGS. 9a and 9b are side and top views, respectively, illustrating another vehicle, generally designated 90, of a slightly modified construction from vehicle 60 described above. Thus, vehicle 90 illustrated in FIGS. 9a and 9b also includes a fuselage 91, a pair of ducted-fan type lift-producing propellers 92a, 92b at the opposite ends of the fuselage, a pilot's compartment 93 centrally of the fuselage, and a pair of payload bays 94a, 94b laterally of the pilot's compartment 93. Vehicle further includes a front landing gear 95a, a rear landing gear 95b, a horizontal stabilizer 96, and a pair of pusher propellers 97a, 97b, at the rear end of fuselage 91.

Figure 10:
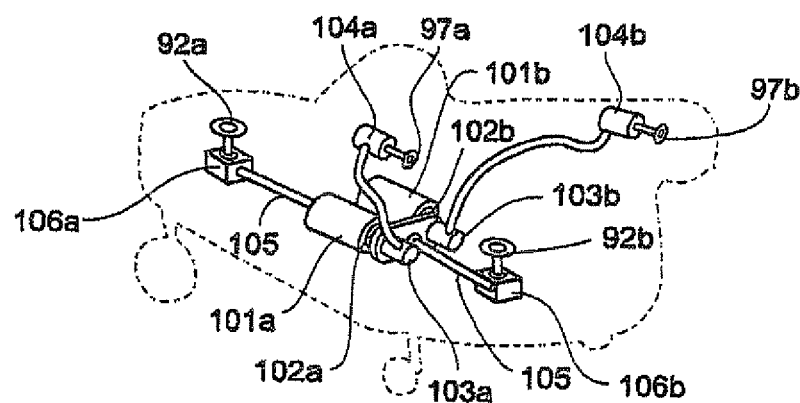
FIG. 10 is a diagram illustrating the drive system in the vehicle of FIGS. 9a and 9b.

FIG. 10 schematically illustrates the drive system in vehicle 90. Thus as shown in FIG. 10, vehicle 90 also includes two engines 101a, 101b for driving the two ducted fans 92a, 92b and the two pusher propellers 97a, 97b, respectively, as in vehicle 60. However, whereas in vehicle 60 the two engines are located in separate engine compartments in the two pylons 61a, 61b, in vehicle 90 illustrated in FIGS. 9a and 9b both engines are incorporated in a common engine compartment, schematically shown at 100 in FIG. 9a, underlying the pilot's compartment 93. The two engines 101a, 101b (FIG. 10), may also be turbo-shaft engines as in FIG. 7. For this purpose, the central portion of the fuselage 91 is formed with a pair of air inlet openings 98a, 98b forward of the pilot's compartment 93, and with a pair of air outlet openings 99a, 99b rearwardly of the pilot's compartment.

As shown in FIG. 10, the two engines 101a, 101b drive, via the over-running clutches 102a, 102b, a pair of hydraulic pumps 103a, 103b which, in turn, drive the drives 104a, 104b of the two pusher propellers 97a, 97b. The two engines 101a, 101b are further coupled to a drive shaft 105 which drives the drives 106a, 106b of the two ducted fans 92a, 92b, respectively.

Figure 11A:
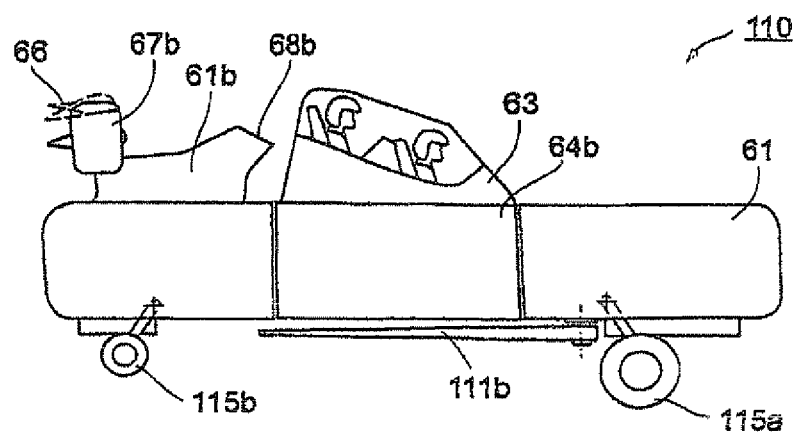
FIGS. 11a and 11b are side and top views, respectively, illustrating a VTOL vehicle constructed in accordance with any one of FIGS. 6a-10 but equipped with deployable stub wings, the wings being shown in these figures in their retracted stowed positions.
Figure 11B:
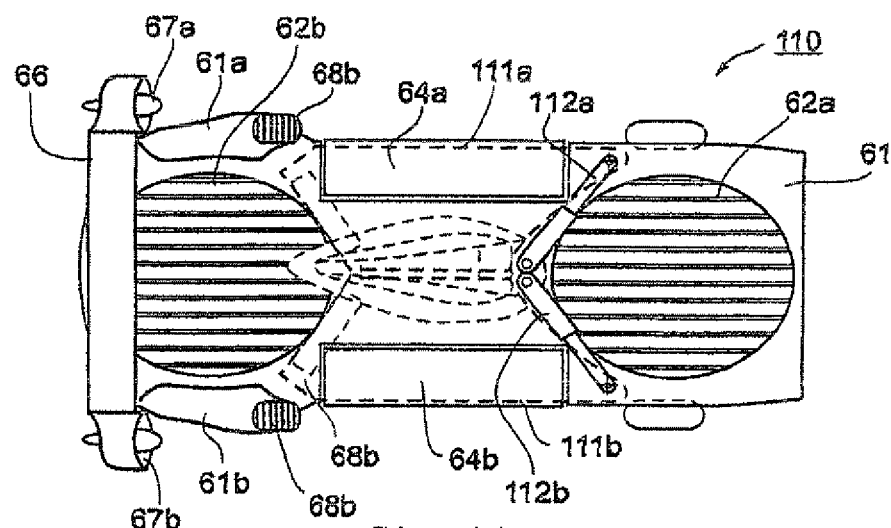
Figure 11C:
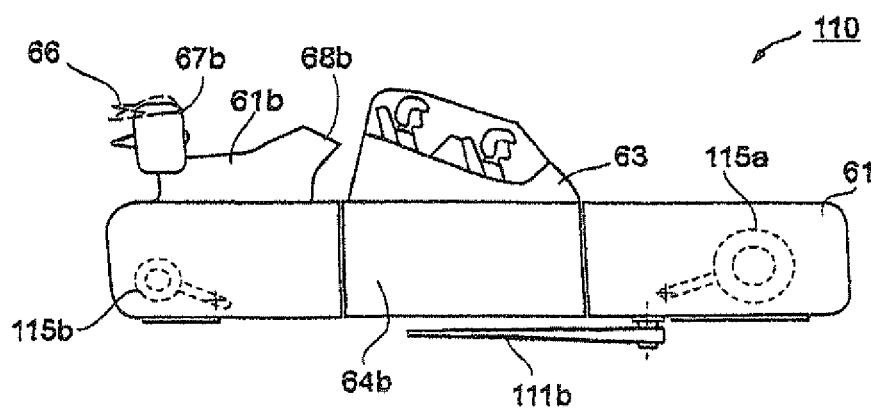
FIGS. 11c and 11d are views corresponding to those of FIGS. 11a and 11b but showing the stub wings in their deployed, extended positions.
Figure 11D:
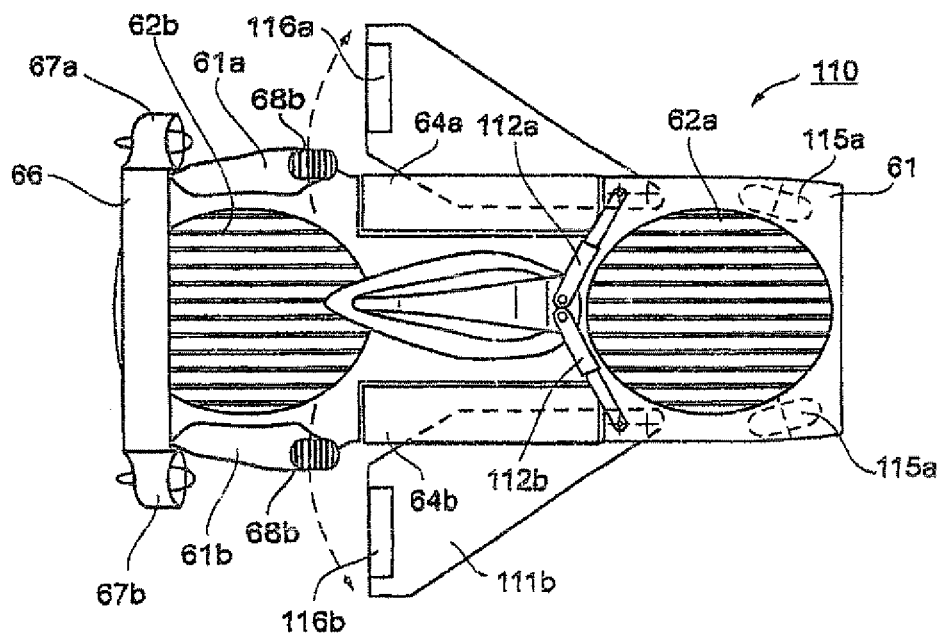

FIGS. 11a-11d illustrate another vehicle, therein generally designated 110, which is basically of the same construction as vehicle 60 described above with respect to FIGS. 6a-6c, 7, 8 and 8a-8d; to facilitate understanding, corresponding elements are therefore identified by the same reference numerals. Vehicle 110 illustrated in FIGS. 11a-11d, however, is equipped with two stub wings, generally designated 111a, 111b, each pivotally mounted to the fuselage 61, under one of the payload bays 64a, 64b, to a retracted position shown in FIGS. 11a and 11b, or to an extended deployed position shown in FIGS. 11c and 11d for enhancing the lift produced by the ducted fans 62a, 62b. Each of the stub wings 111a, 111b is actuated by an actuator 112a, 112b driven by a hydraulic or electrical motor (not shown). Thus, at low speed flight, the stub wings 111a, 111b, would be pivoted to their stowed positions as shown in FIGS. 11a and 11b; but at high speed flight, they could be pivoted to their extended or deployed positions, as shown in FIGS. 11c and 11d, to enhance the lift produced by the ducted fans 61a, 61b. Consequently, the blades in the ducted fans would be at low pitch producing only a part of the total lift force.

The front and rear landing gear, shown at 115a and 115b, could also by pivoted to a stowed position to enable higher speed flight, as shown in FIGS. 11c and 11d. In such case, the front end of the fuselage 61 would preferably be enlarged to accommodate the landing gear when in its retracted condition. Vehicle 110 illustrated in FIGS. 11a-11d may also include ailerons, as shown at 116a, 116b (FIG. 11d) for roll control.

Figure 12:
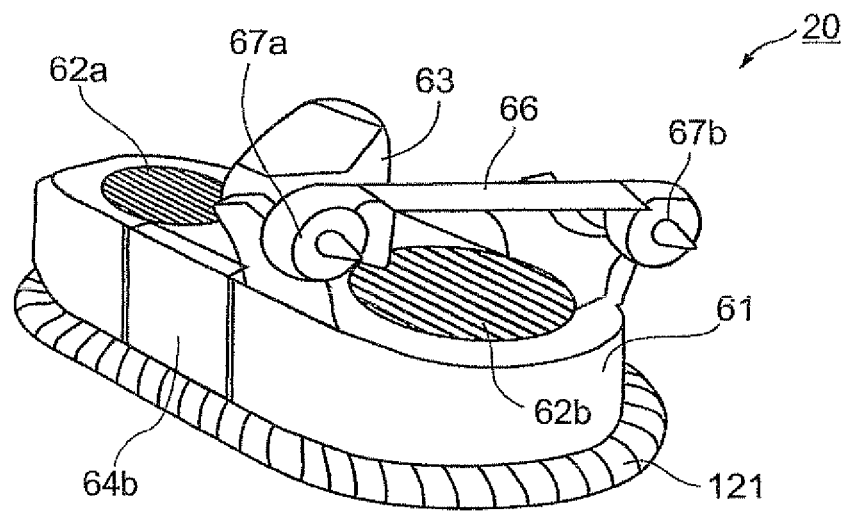
FIG. 12 is a perspective rear view of a vehicle constructed in accordance with any one of FIGS. 6a-10 but equipped with a lower skirt for converting the vehicle to a hovercraft for movement over ground or water.

FIG. 12 illustrates how the vehicle, such as vehicle 60 illustrated in FIGS. 6a-6d, may be converted to a hovercraft for traveling over ground or water. Thus, the vehicle illustrated in FIG. 12, and therein generally designated 120, is basically of the same construction as described above with respect to FIGS. 6a-6d, and therefore corresponding parts have been identified with the same reference numerals. In vehicle 120 illustrated in FIG. 12, however, the landing gear wheels (65a, 65b, FIGS. 6a-6d) have been removed, folded, or otherwise stowed, and instead, a skirt 121 has been applied around the lower end of the fuselage 61. The ducted fans 62a, 62b, may be operated at very low power to create enough pressure to cause the vehicle to hover over the ground or water as in hovercraft vehicles. The variable pitch pusher propellers 67a, 67b would provide forward or rear movement, as well as steering control, by individually varying the pitch, as desired, of each propeller.

Vehicles constructed in accordance with the present invention may also be used for movement on the ground. Thus, the front and rear wheels of the landing gears can be driven by electric or hydraulic motors included within the vehicle.

Figure 13:
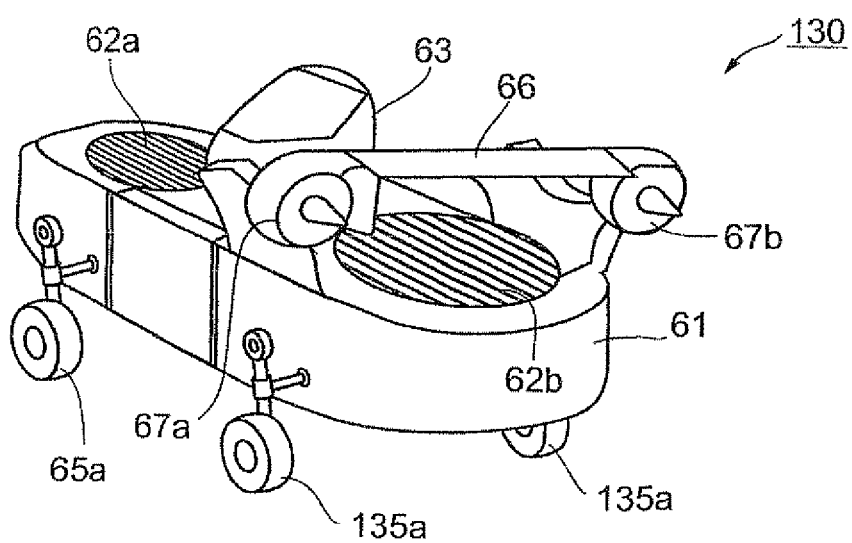
FIG. 13 is a perspective rear view of a vehicle constructed in accordance with any one of FIGS. 6a-10 but equipped with large wheels for converting the vehicle for ATV (all terrain vehicle) operation.

FIG. 13 illustrates how such a vehicle can also be used as an ATV (all terrain vehicle). The vehicle illustrated in FIG. 13, therein generally designated 130, is basically of the same construction as vehicle 60 illustrated in FIGS. 6a-6d, and therefore corresponding parts have been identified by the same reference numerals to facilitate understanding. In vehicle 130 illustrated in. FIG. 13, however, the two rear wheels of the vehicle are replaced by two (or four) larger ones, bringing the total number of wheels per vehicle to four (or six). Thus, as shown in FIG. 13, the front wheels (e.g., 65a, FIG. 6c) of the front landing gear are retained, but the rear wheels are replaced by two larger wheels 135a (or by an additional pair of wheels, not shown), to enable the vehicle to traverse all types of terrain.

When the vehicle is used as an ATV as shown in FIG. 13, the front wheels 65a or rear wheels would provide steering, while the pusher propellers 67a, 67b and main lift fans 62a, 62b would be disconnected but could still be powered-up for take-off if so desired. The same applies also with respect to the hovercraft version illustrated in FIG. 12.

It will thus be seen that the invention thus provides a utility vehicle of a relatively simple structure which is capable of performing a wide variety of VTOL functions, as well as many other tasks and missions, with minimum changes in the vehicle to convert it from one task or mission to another.

FIGS. 14a-14e are pictorial illustrations of alternative vehicle arrangements where the vehicle is relatively small in size, having the pilot's cockpit installed to one side of the vehicle. Various alternative payload possibilities are shown.

Figure 14A:
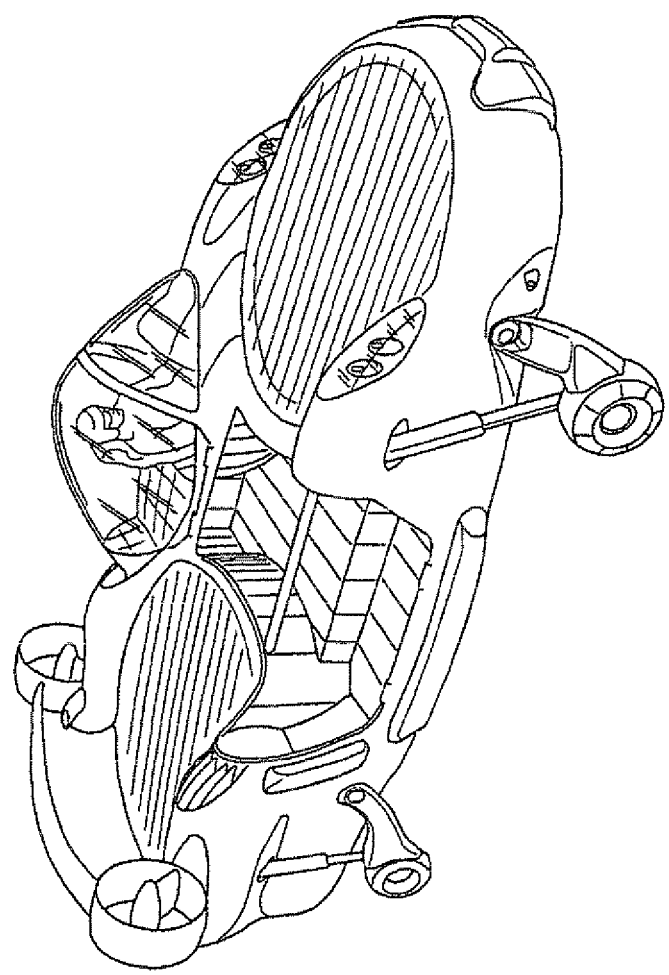
FIGS. 14a-14e are a pictorial illustration of an alternative vehicle arrangement wherein the vehicle is relatively small in size, having the pilot's cockpit installed to one side of the vehicle. Various alternative payload possibilities are shown.

FIG. 14a shows the vehicle in its basic form, with no specific payload installed. The overall design and placement of parts of the vehicle are similar to those of the 'larger' vehicle described in FIG. 8. with the exception of the pilot's cockpit, which in the arrangement of FIG. 14 takes up the space of one of the payload bays created by the configuration shown in FIG. 8. The cockpit arrangement of FIG. 14a frees up the area taken up by the cockpit in the arrangement of FIG. 8 for use as an alternative payload area, increasing the total volume available for payload on the opposite side of the cockpit. It is appreciated that the mechanical arrangement of engines, drive shafts and gearboxes for the vehicle of FIG. 14. may be that described with reference to FIG. 7.

Figure 14B:
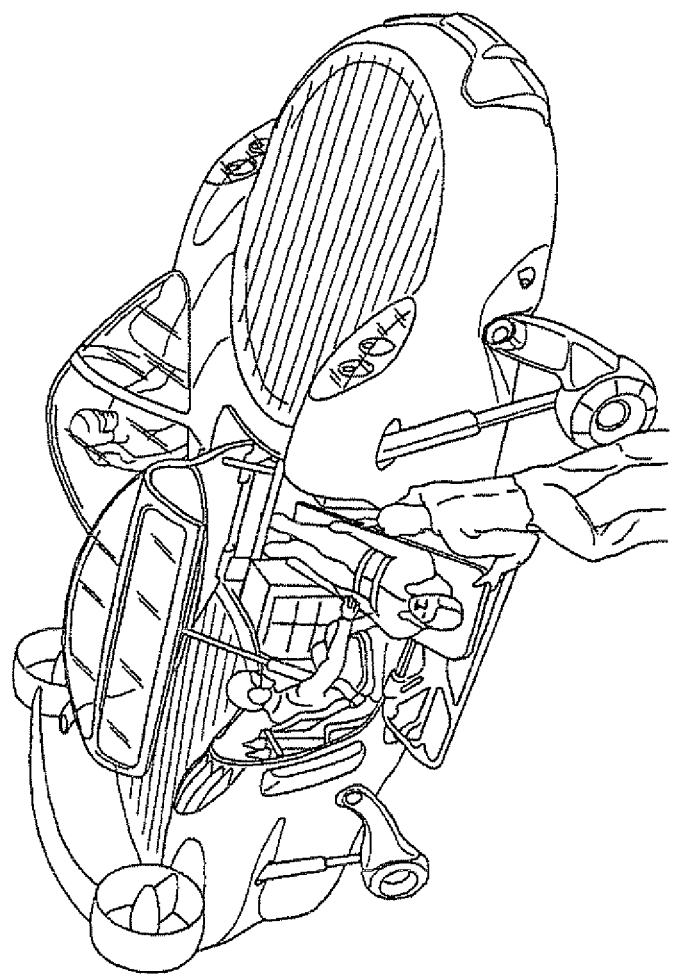

FIG. 14b illustrates how the basic vehicle of FIG. 14a may be used to evacuate a patient. The single payload bay is optionally provided with a cover and side door which protect the occupants, and which may include transparent areas to enable light to enter. The patient lies on a stretcher which is oriented predominantly perpendicular to the longitudinal axis of the vehicle, and optionally at a slight angle to enable the feet of the patient to clear the pilot's seat area and be moved fully into the vehicle despite its small size. Space for a medical attendant is provided, close to the outer side of the vehicle.

Figure 14C:
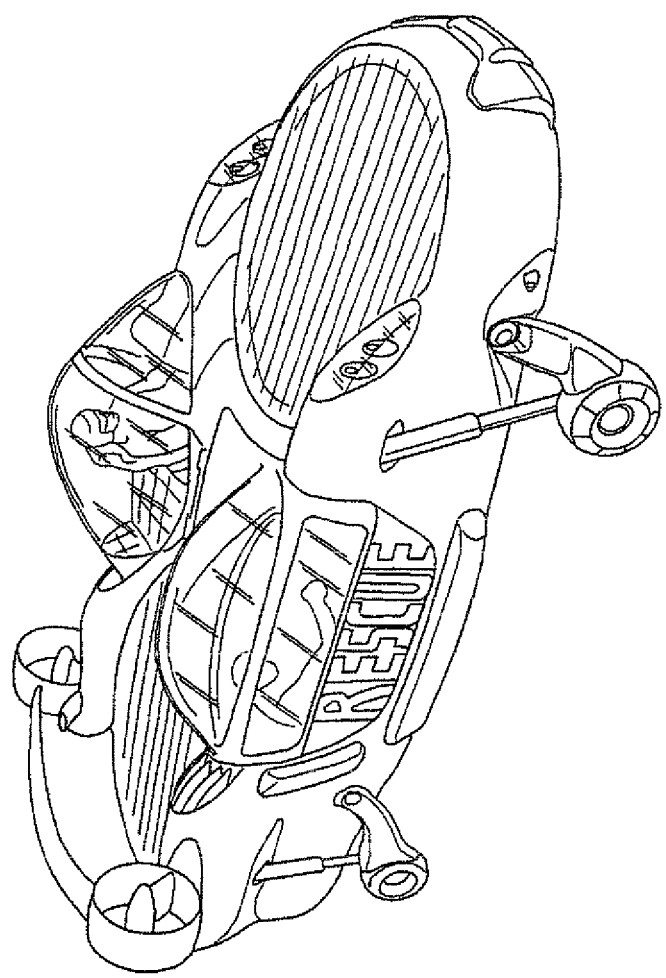

FIG. 14c shows the vehicle of FIG. 14b with the cover and side door closed for flight.

Figure 14D:
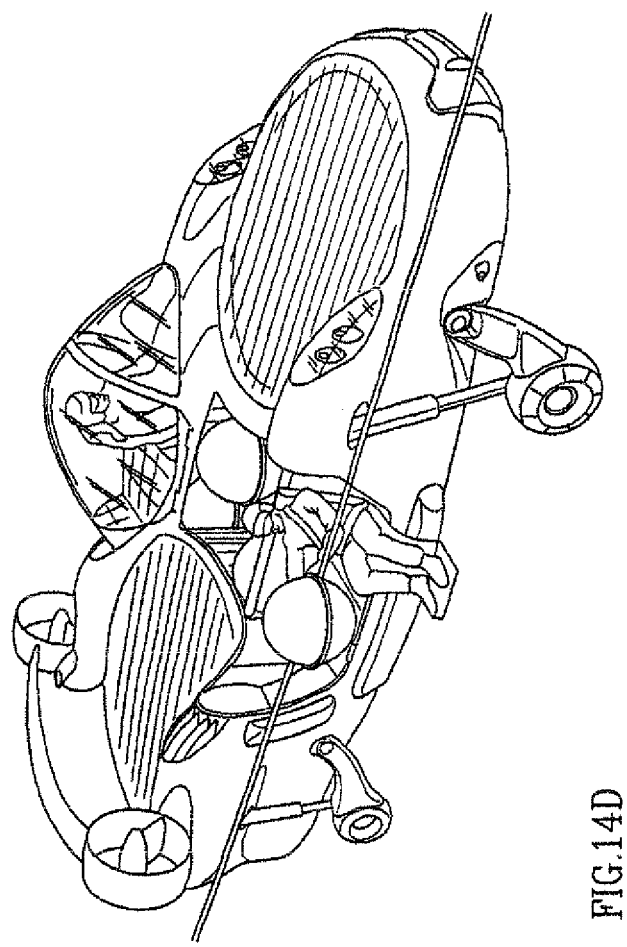

FIG. 14d illustrates how the basic vehicle of FIG. 14a may be used to perform various utility operations such as electric power-line maintenance. In the example shown if FIG. 14d, a seat is provided for an operator, facing outwards towards an electric power-line. For illustration purposes, the operator is shown attaching plastic spheres to the line using tools. Uninstalled sphere halves and additional equipment may be carried in the open space behind the operator. Similar applications may include other utility equipment, such as for bridge inspection and maintenance, antenna repair, window cleaning, and other applications. One very important mission that the utility version of FIG. 14d could perform is the extraction of survivors from hi-rise buildings, with the operator assisting the survivors to climb onto the platform while the vehicle hovers within reach.

Figure 14E:
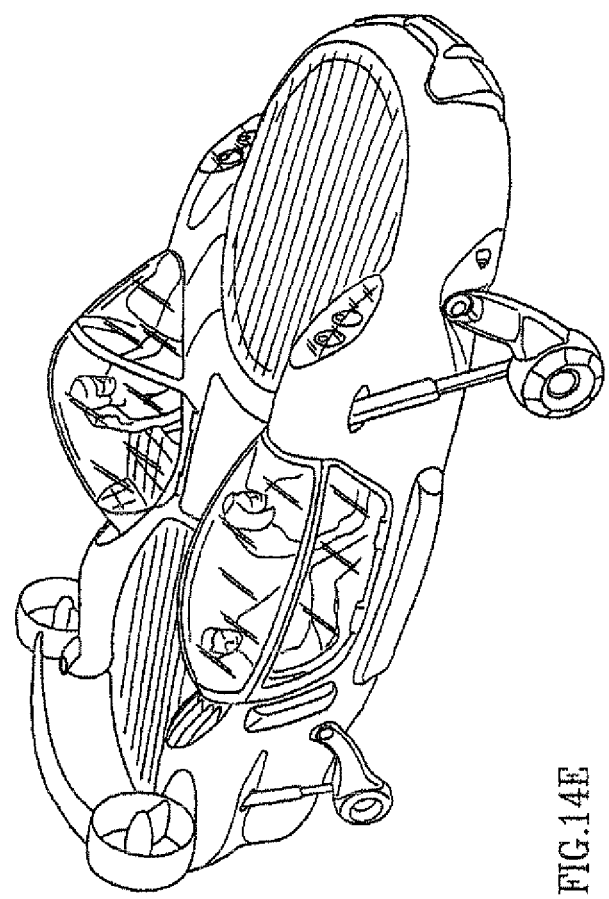

FIG. 14e illustrates how the basic vehicle of FIG. 14a may be used to carry personnel in a comfortable closed cabin, such as for commuting, observation, performing police duties, or any other purpose.

Figure 15:
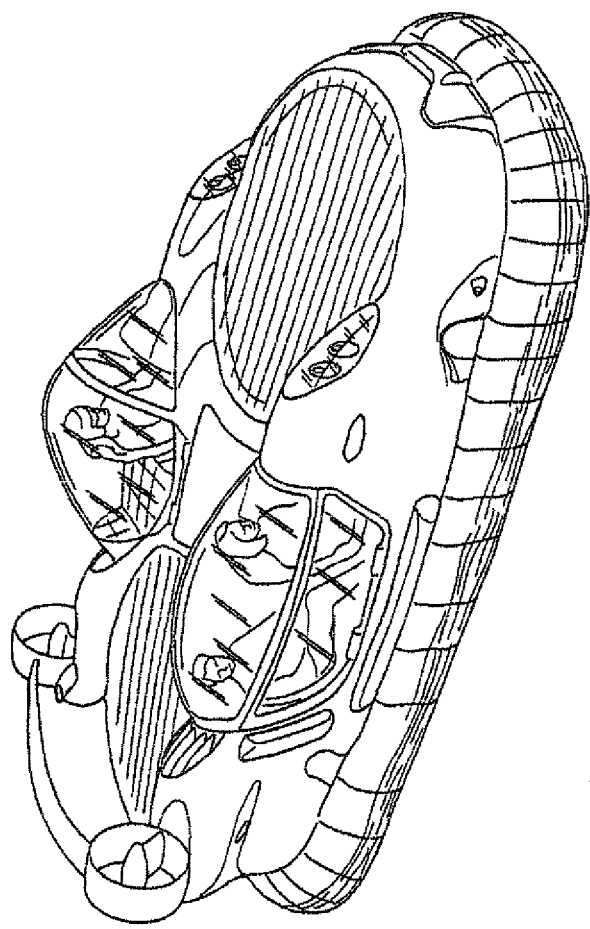
FIG. 15 is a pictorial illustration of a vehicle constructed typically in accordance with the configuration in FIGS. 14a-14e but equipped with a lower skirt for converting the vehicle to a hovercraft for movement over ground or water.

FIG. 15 is a pictorial illustration of a vehicle constructed typically in accordance with the configuration in FIG. 14 but equipped with a lower, flexible skirt for converting the vehicle to a hovercraft for movement over ground or water. While the vehicle shown in FIG. 15 is similar to the application of FIG. 14e, a skirt can be installed on any of the applications shown in FIG. 14.

While FIGS. 14-15 show a vehicle having a cockpit on the left hand side and a payload bay to the right hand side, it is appreciated that alternative arrangements are possible, such as where the cockpit is on the right hand side and the payload bay is on the left hand side. All the descriptions provided in FIGS. 14-15 apply also to such an alternative configuration.

FIG. 16 illustrates four top views of the vehicle of FIGS. 14a-14e with several payload arrangements:

FIG. 16a is the basic vehicle with an empty platform on the right hand side of the vehicle. FIG. 16b shows the arrangement of the right hand side compartment when configured as a rescue module. FIG. 16c shows the conversion of the RHS compartment for carrying up to two observers or passengers. FIG. 16d has two functional cockpits, needed mostly for pilot's instruction purposes. It should be emphasized that similar arrangements can be configured if so desired, with the pilot's compartment on the RHS of the vehicle, and the multi-mission payload bay on the left.

FIG. 17 is a see-through front view of the vehicle of FIG. 16a showing various additional features and internal arrangement details of the vehicle. The outer shell of the vehicle is shown in 1701. The forward ducted fan 1703 has a row of inlet vanes 1718 and a row of outlet vanes 1717 used together to maneuver the vehicle in roll and in horizontal side-to side translation. Detail A shows, as an example, the first five vanes being the closest to the RHS of the vehicle. These vanes are shown mounted at angles A5-A1 that are increasing progressively from nearly vertical mounting for vane 5 to some 15 degrees of tilt shown as the angle A1 in the figure. The progressive deflected mounting of the first rows of vanes align their chord line with the local streamlines of the incoming flow. This does not inhibit these vane's full motion to both directions of deflection around their basic mounting angles. It should also be emphasized, that a similar, anti-symmetric arrangement of the vanes is used on the opposite side of the duct shown (LHS of the vehicle). Similarly, the vanes attached at the inlet to the aft duct, are also tilted as required to orient themselves with the local inflow angle at each transverse position along the duct, where the angle is preferably averaged over the longitudinal span of each vane. This unique configuration of vanes can be varied in angles as a result of aerodynamic behavior of the incoming flow and due to engineering limitations. This configuration can be also used with any row of inlet vanes or outlet vanes installed on any single or multiple ducted fan vehicles.

The RHS engine of the vehicle 1708, is shown mounted inside its enclosure 1702, and below the air inlet 1709. It is connected to a 90 degree gearbox 1710, which is connected through a shaft (not shown) to a lower 90 degree gearbox 1720. From there, through a horizontal shaft, the power is transmitted to the main gearbox 1721 that also supports the lift producing rotor 1716. A similar arrangement for the LHS engine may be used (not shown). The pilot's compartment (cockpit) 1706 has a transparent top (canopy) of which the outer panel 1713 is hinged, to permit the pilot 1711 to enter and exit the cockpit. The pilot's seat 1712 may either be normal, or a rocket deployed ejection seat to facilitate quick egress of the pilot from the cockpit through the canopy, if the need arises. The pilot's controls 1714 are connected to the vehicles flight control system. The vehicle's RHS landing gear wheel 1719 is shown resting on the ground, and the LHS landing gear wheel 1715 is shown optionally retracted into the fuselage for reducing the drag in high speed flight. The vehicles two pusher fans 1704, 1705 are shown mounted on the aft portion, with the wing/stabilizer 1707 generally spanning above and between said fans.

Figure 18:
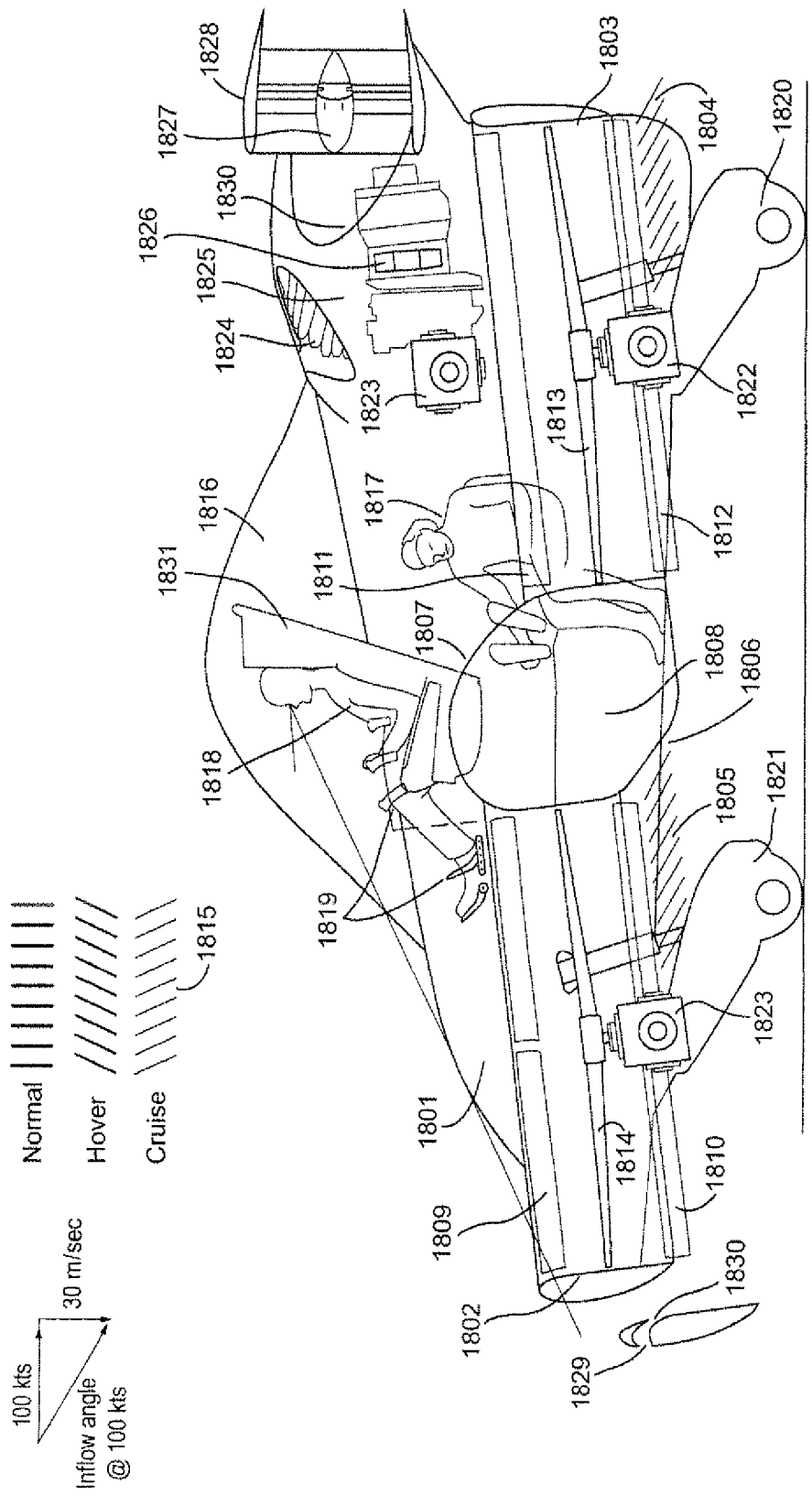
FIG. 18 is a longitudinal cross-section of the vehicle of FIG. 16b showing various additional features and internal arrangement details of the vehicle.

FIG. 18 is a longitudinal cross-section of the vehicle of FIG. 16b showing various additional features and internal arrangement details of the vehicle. The outer shell 1801 covers the whole of the vehicle, and transitions to the engine's enclosure 1825. Inside the shell, a forward duct 1802 and an aft duct 1803 are mounted, inside which a forward main lift propeller 1814 and an aft main lift propeller 1813 are mounted. The ducts and propellers are preferably statically disposed within the vehicle such that they are inclined forward (generally between 5 and 10 degrees although other values may be used) with respect to the vertical and rotated along the transverse axis of the vehicle, to better accommodate the incoming airflow at high speed. The forward duct 1802 has rows of longitudinal vanes 1809 at its inlet, as well as rows of longitudinal vanes 1810 at the exit. These vanes are predominantly used to control the vehicle in roll as well as lateral side-to-side translation. A similar set of longitudinally oriented vanes 1811 & 1812 are mounted at the entrance and exit of the aft duct 1803, respectively. Optionally, additional vanes, mounted in a transverse orientation may be mounted at the exit of the forward and aft duct, shown respectively as 1805 & 1804. These vanes are movable, and used to deflect the air exiting from the ducts, as shown schematically in 1815 for various flight regimes of the vehicle. FIG. 18 is generally a cross section through the center of the vehicle looking right, although it was decided to leave the pilot's compartment, and LHS engine and pusher fan installation visible for reference. The lower area of the center fuselage section of the vehicle 1808 serves as the main fuel tank. The outer shape of this body to its fore-aft sides is molded to serve the geometrical needs of both ducts 1802 & 1803. The lower side of the center fuselage has a cutout 1806 to ease the flow exiting the forward duct 1802 to align itself with the overall air flow around the vehicle at high speed flight. The upper portion 1807 of the center fuselage 1808 is suitably curved for accelerating the air entering the aft duct 1803, and thereby create a low pressure area on the top of the fuselage, relieving some of the lift production burden off the main lifting propellers 1813 & 1814. This upper portion 1807 of the center fuselage can also facilitates the mounting of a parachute/parafoil which will be used in emergency situations either to get to the ground safely or even to continue forward flight with the pusher fans thrust. The pilot 1818 is shown seated on his seat 1831 which may either be normal, or a rocket deployed ejection seat to facilitate quick egress of the pilot from the cockpit through the canopy, if the need arises. The pilot's controls 1819 are connected to the vehicles flight control system. Also shown in FIG. 18 is one of the two the engines used in the vehicle shown as 1826 mounted inside its outer shell 1825 and below the air intake 1824. The 90 degree gearbox 1823 transmits the rotational power from the engine 1826 to the lower gearbox through a shaft. This lower gearbox (gearbox, shaft not shown) then connects to the main aft lifting propeller gearbox 1822, which also supports the propeller 1813. An interconnect shafting mechanism (not shown) further distributes the power to the forward gearbox 1823 that also supports the forward main lifting propeller. Also visible in FIG. 18 is one of the pusher fans 1827, and a cross section through the stabilizer 1828 mounted above and between the pusher fans. It can also be noticed that a curved line 1830 forms a break in the smooth lines of the engine enclosure 1825, and the forward boundary for a deep cutout into enclosure 1825. The cutout is used to direct outside air to the pusher fans. The general shape of the curved line 1830 can also be seen in any one of the top views of FIG. 16. The forward end of the forward duct 1802 may have an optional forward facing circumferential slot 1829 that runs generally across the forward ¼ circle of the duct 1802. The slot faces the incoming flow, in a region of the flow that is high (near stagnation) pressure. The air coming into the slot is accelerated due to the geometric internal shape that is generally contracting, and is channeled through a second, inner slot 1830, at an air velocity that is greater than the flow inside the duct, and generally tangentially with the inside wall of the duct 1802. The resulting low pressure area created by this fast airflow from the slot and into the duct, affects the air above it flowing over the outer (upper) lip of the duct and provides suction to attach the latter flow to the duct's inner surface, and avoid flow separation at high speed. A second role played by the slots 1829 & 1830 is to direct some of the air flowing through duct 1802 through an additional opening, thereby reducing the amount of air flowing in above the duct's lip, and so also reducing the overall pitching moment (having an adverse effect on the vehicle) created by the forward duct at high speed flight. It should be noted that the slot 1829 may also have an optional door or doors to facilitate opening of the bypass airflow only as flight speed is increased. Such door/doors, if used, my be activated externally through an actuator or mechanism, or alternatively rely on the pressure distribution and difference between the inside and outside of the duct, to self-activate a spring loaded door or doors, as required. The landing gear wheels 1821 & 1820 are shown in the landing gear's extended position. An option (not shown) exists for retracting all four landing gears into the fuselage shell 1801 to reduce drag in high speed flight.

Figure 19:
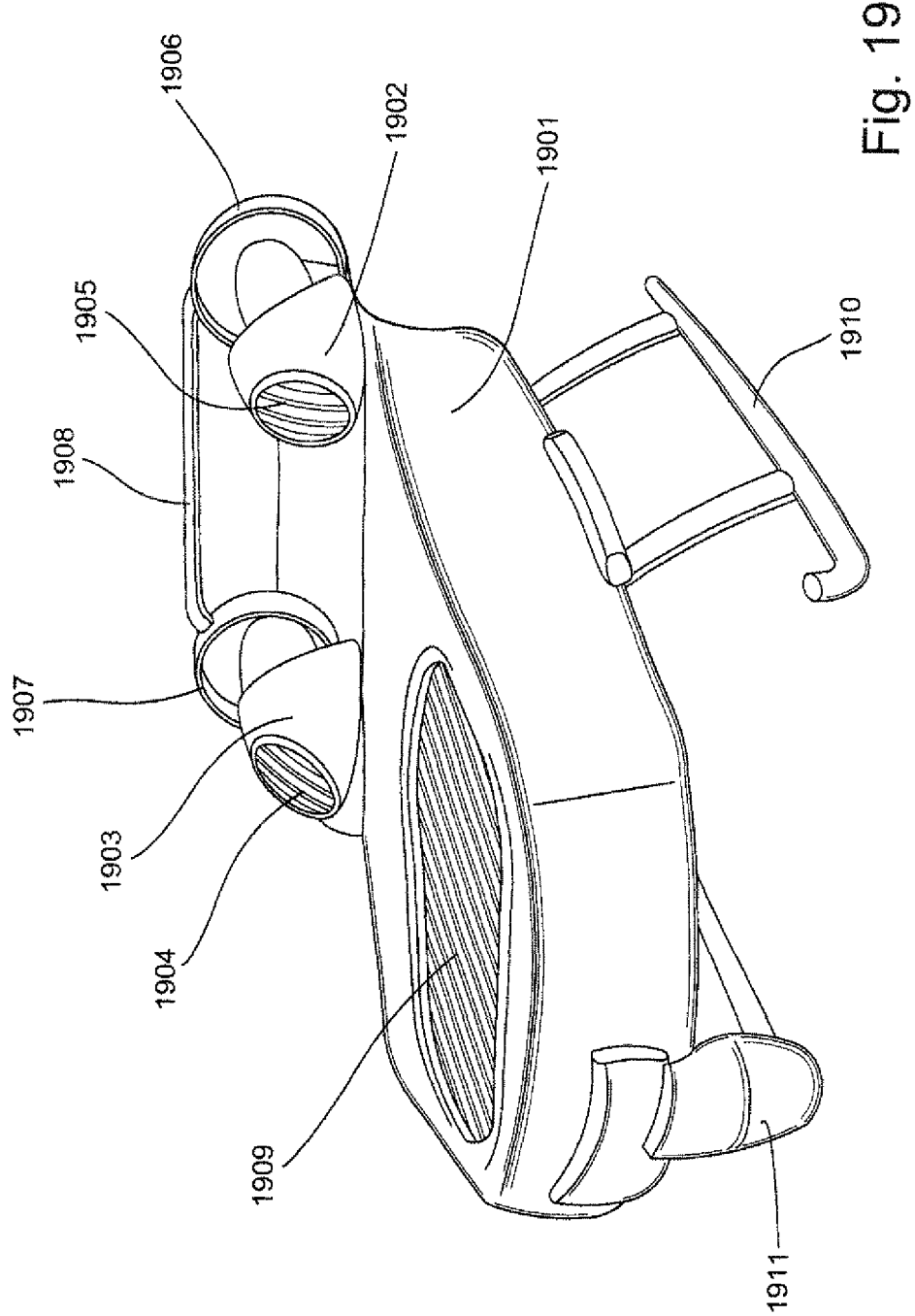
FIG. 19 is a pictorial illustration of an Unmanned application of the vehicle having similar design to the vehicle of FIGS. 16-18, but lacking a pilot's compartment.

FIG. 19 is a pictorial illustration of an Unmanned application of the vehicle. Evident in the picture is the vehicles outer shell 1901 that is lacking any pilot's enclosure. Also visible is the forward duct 1909 with the rows of longitudinally mounted inlet vanes. The RHS engine enclosure 1903 is shown with an intake 1904 generally installed close to the top and to the front of the engine enclosure 1903. A similar arrangement can be seen for the LHS engine enclosure 1902 and the LHS engine intake port 1905. Two pusher fans 1906 & 1907 are shown, with a stabilizer 1908 spanning between them. The vehicle's fixed skid type landing gear is shown in 1910, and a typical pictorial installation of an observation system in 1911.

Figure 20:
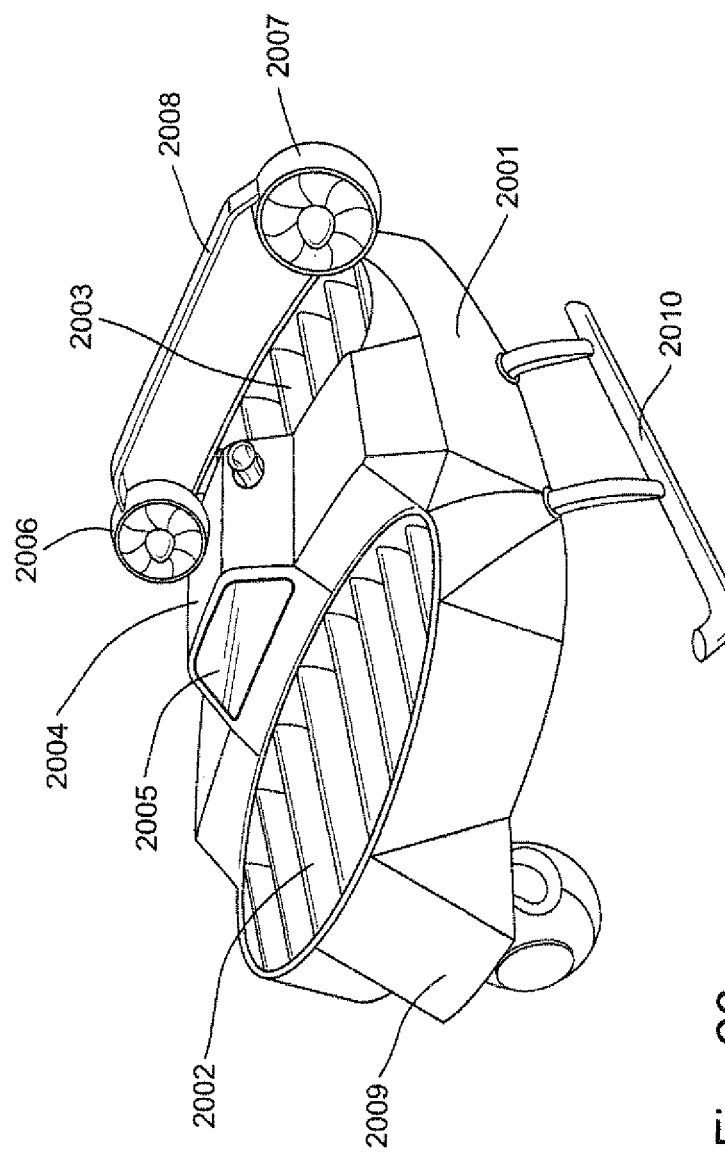
FIG. 20 is a further pictorial illustration of an optional Unmanned vehicle, having a slightly different engine installation than that of FIG. 19.

FIG. 20 is a further pictorial illustration of an optional Unmanned vehicle, having a slightly different engine installation than that of FIG. 19. Here, in a manner similar to that of FIG. 19, the fuselage outer shell 2001 is also lacking a pilot's compartment. However, the vehicle's engine is mounted inside the fuselage in the area schematically shown as 2006. An air intake 2005 supplies air to the engine. Two pusher fans 2006 & 2007 are used, as well as a stabilizer 2008. The forward duct 2002 and aft duct 2003 have longitudinally mounted vanes. A typical pictorial installation of an observation system is shown in 2009. The vehicle's fixed skid type landing gear is shown in 2010.

FIG. 21 is a top view showing the vehicle of FIG. 16b equipped with an extendable wing for high speed flight. The RHS wing is designated 2101 in the extended position and 2102 when folded under the fuselage. An actuator 2103 is used for extending and retracting the wing as desired. The LHS wing is similar, as evident in the drawing.

Figures 22A, 22B:
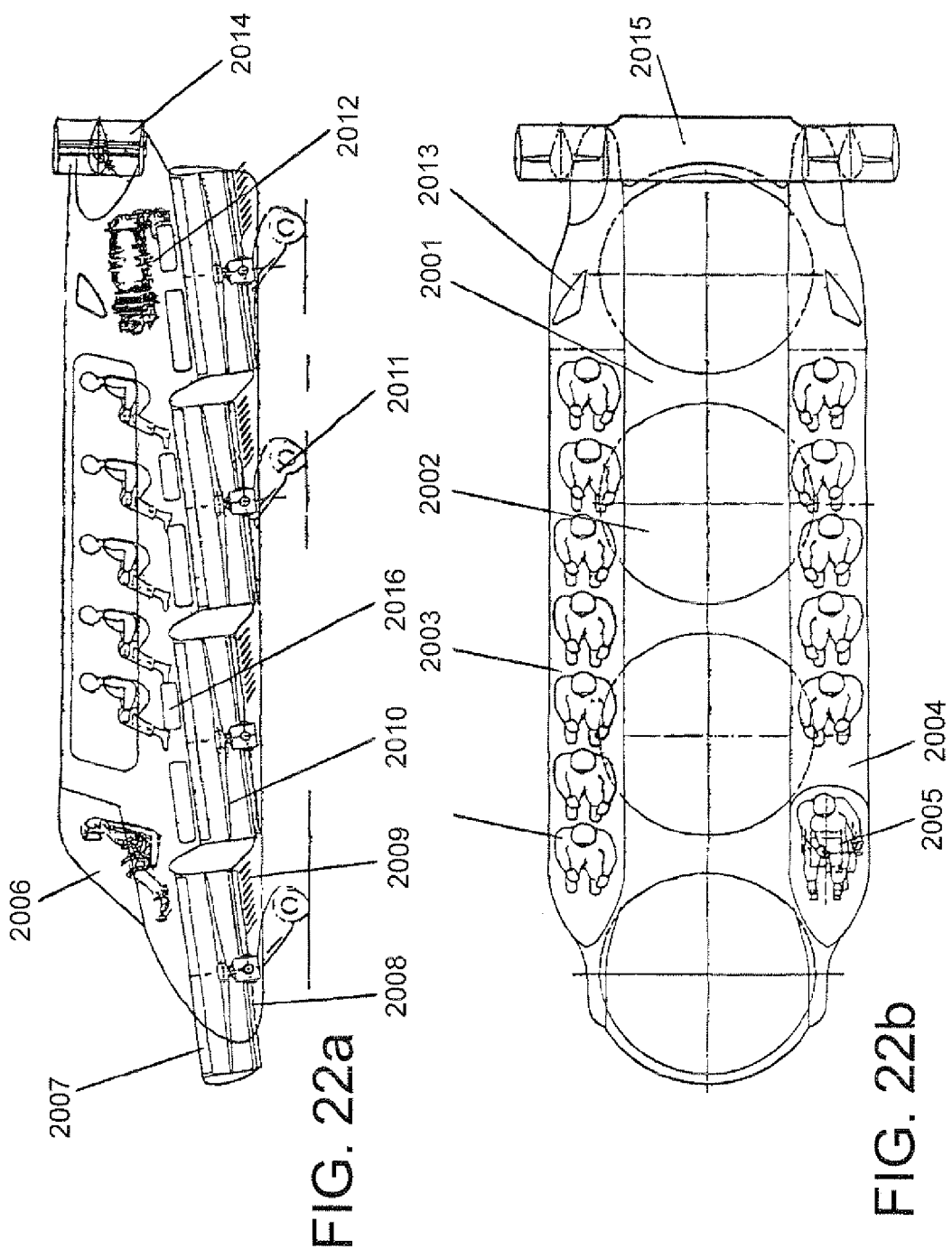
FIGS. 22a and 22b are side and top views, respectively, illustrating a VTOL vehicle having a plurality of lifting fans to facilitate increased payload capability.

FIG. 22a-22b are side and top views, respectively, illustrating a VTOL vehicle that employs a plurality of lift generating fans, arranged one behind the other, all connected to a common chassis, for the purpose of carrying an increased payload over that which is possible with two lifting ducted fans. A chassis designated 2001 houses a number of ducted fans 2002 for generating lift. The fans may be tilted slightly forward as shown in FIG. 22a to achieve higher speed in cruise. Two elongated cabins 2003 and 2004 are preferably located on both sides of the ducted fans to accommodate passengers or other cargo. A pilot 2005 may be seated in a cockpit 2006 at the front end of one of the cabins, such as the left cabin 2004. Two engines 2012 are located to the aft of the cabins and have air intakes 2013. Two variable pitch pusher fans 2014, enclosed in shrouds, are mounted to the rear of the cabins. A stabilizer 2015 is mounted between the pusher fans to facilitate nose-down trimming moments in forward flight. Multiple inlet roll, yaw and side force control vanes 2007 are preferably mounted longitudinally in all ducts, supplemented by similar vanes 2008 at the duct's exits. Transversally mounted guide vanes 2009 may also be mounted to reduce friction losses and flow separations of the flow exiting from the ducts. Side openings 2016 may be optionally installed to enable outside air to be mixed with inflow from above, reducing the impact that the cabins may have on thrust augmentation of the ducted fans as well as the control effectiveness of the vanes installed in the inlets to these ducted fans. A variable pitch fan (rotor) 2010 is mounted in each duct. Preferably, one half of the fans (or as close to half as possible, such as in the case of a vehicle similar to that shown in FIG. 22 but having an odd number of lifting ducted fans) turn in the opposite direction as the other half. A plurality of landing gears 2001 support the vehicle on the ground and serve to attenuate the landing impact. Some of the wheels employed in the landing gear may be powered, or alternatively, forward ground movement can be accomplished through the use of the variable pitch pusher fans.

Figure 23:
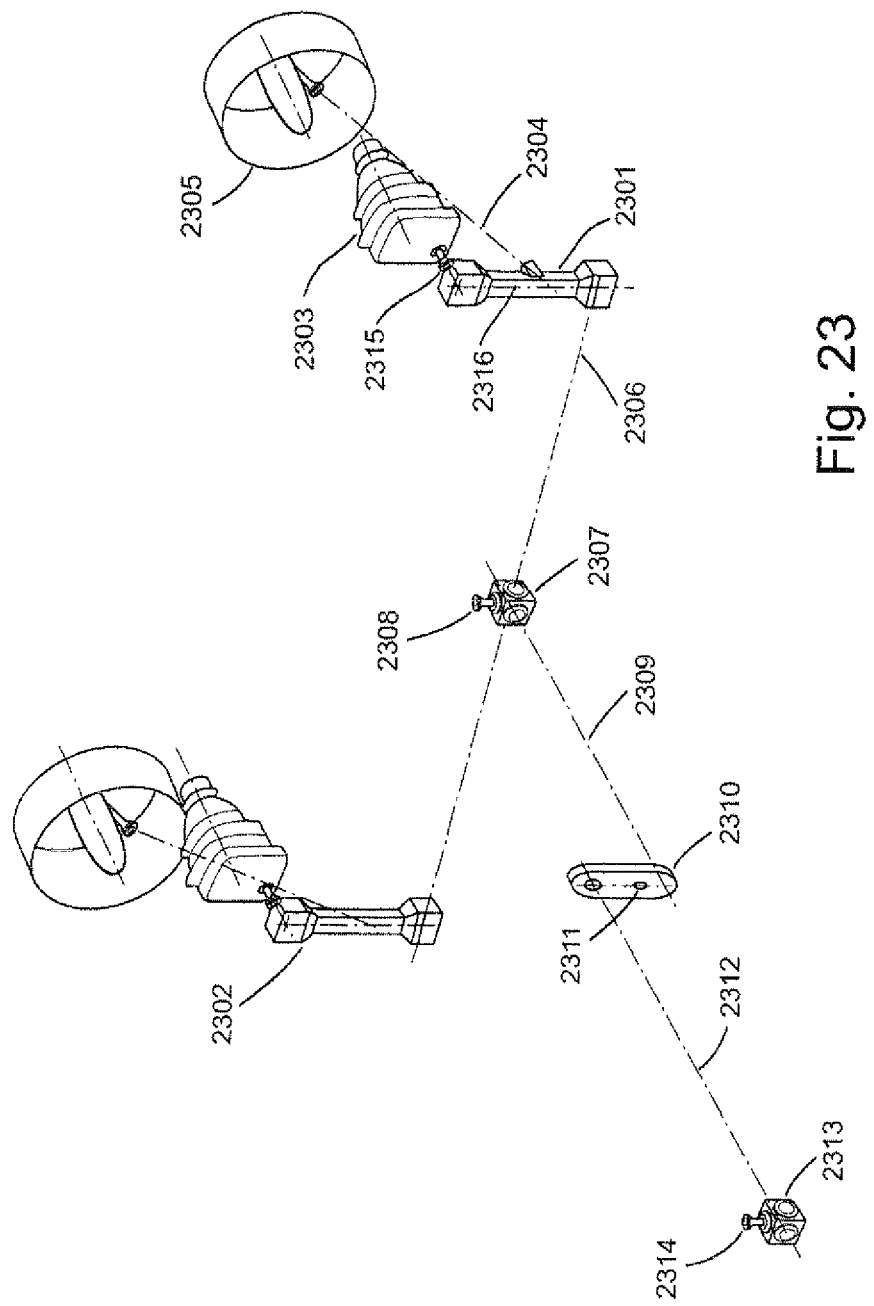
FIG. 23 is a schematic view of the power transmission system used in the vehicles of FIGS. 14-19.

FIG. 23 shows an optional arrangement of a power distribution system for transmitting the power from each of the rear mounted engines to the two lifting fans and two pusher fans such as found in the vehicles shown in FIGS. 14-19. As can be seen, two engines 2303 are preferably used to drive the two main lift rotors and the two pusher fans through a series of shafts and gearboxes. The power takeoff (PTO) of each engine is connected through a short shaft 2315 to the RHS and LHS Aft Transmissions designated 2302 and 2301 respectively. From these transmissions, the power is distributed both to the aft pusher props through diagonally oriented shafts 2304 as well as to the Aft Rotor Gearbox 2307 through two horizontally mounted shafts 2306. The two main lift rotors are connected to their respective gearboxes through prop flanges 2308. The shaft interconnecting both main lift rotors is divided into two segments designated as 2309 and 2312, connected by a Center Gearbox 2310 through flexible joints. This center gearbox serves mainly to move the rotation center in parallel and connect both shafts 2309 and 2312 without affecting the direction of rotation (i.e. employing an uneven number of plane gears mounted along its length). At least one of the intermediate gears in Center Gearbox 2310 has a shaft that is open to the outside designated as 2311, enabling power for accessories on either side of the face of Gearbox 2310, resulting in opposing directions of rotation (rotors not shown). The rotors preferably turn in opposite directions to eliminate torque imbalance on the vehicle.

Figure 24:
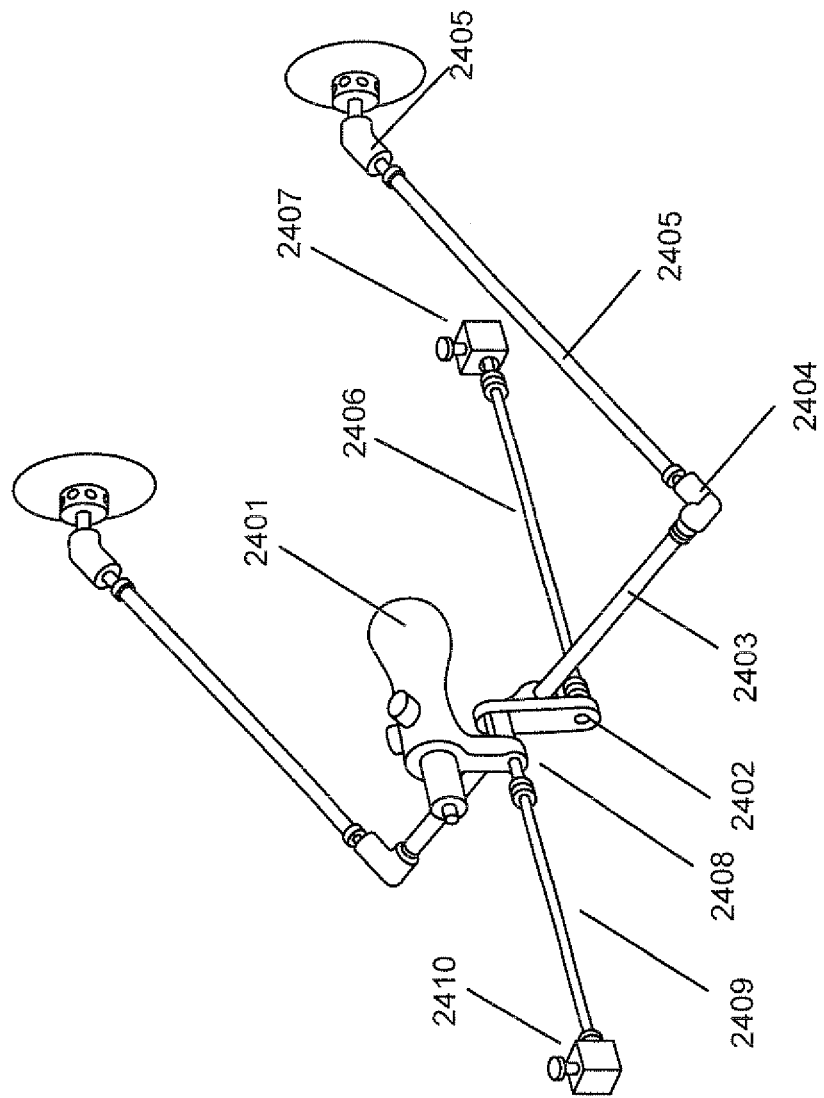
FIG. 24 is a schematic view of the power transmission system used in the vehicle of FIG. 20.

FIG. 24 shows an optional arrangement of a power distribution system for transmitting the power from a centrally mounted engine, or from two engines forming a 'twin-pack', to the two lifting fans and two pusher fans such as found in the vehicles typical of FIG. 9 and FIG. 20. As can be seen, the engine, designated as 2401 is used to drive the two main lift rotors and the two pusher fans through a series of shafts and gearboxes. The power takeoff (PTO) of the engine designated as 2408 is connected through a short shaft to a central Transmission designated 2402. An extension of the same shaft designated as 2409 transmits power directly to the forward lift fan gearbox designated as 2410. From the central transmission 2402, the power is distributed both to the aft lift fan gearbox through a shaft designated as 2406 as well as to two angled gearboxed such as 2404 through two horizontally mounted shafts 2403. From the angled gearboxes, two diagonal shafts 2405 transmit power to the aft pusher prop gearboxes 2405. The central transmission 2402 may also have an additional shaft that is open to the enabling power for accessories (rotors not shown). The rotors preferably turn in opposite directions to eliminate torque imbalance on the vehicle.

FIG. 25*a* shows a schematic cross section and design details of an optional single duct unmanned vehicle. The vehicle includes a powerplant designated as 2502, which may be based on turboshaft technology as shown schematically in FIG. 25*a*, although other means of propulsion are possible. A circumferential duct designated as 2501 surrounds the rotor (lifting fan) designated as 2504. The duct 2501 may also serve to house the flight control and communication equipment as well as the fuel for the duration of the mission. A fuel sump with pump is designated as 2505. A gearbox designated as 2503 is used to reduce the rotational speed of the engine's shaft to match that required by the fan 2504. Two layers of vanes (2506 and 2508) are used to control the vehicle in roll, pitch, yaw and lateral and longitudinal translations. The vanes layers are preferably oriented in multiple planes as will be explained with reference to FIG. 25*c*. A payload typically consisting of a video camera may be housed in the clear spherical compartment designated by 2512.

FIG. 25*b* shows an alternative lifting fan arrangement where two rotors 2510 and 2511 rotate in opposite direction to cancel the torque effect that one fan, such as 2504, would have on the vehicle. A slightly larger gearbox designated as 2509 is used to rotate the two rotors in opposite directions through concentric shafts.

FIG. 25*c* shows different arrangements of vanes in the inlet to the duct, generally designated as view "A" in FIG. 25*a*, but also typical for the bottom (exit) layer of vanes 2508. While the arrangements of FIG. 25*c* show a number of possibilities, many additional arrangements are possible. The common principle in the in-plane vanes arrangements of FIG. 25*b* designated 2513 thru 2519 is that typically one half of the vanes are oriented at an angle (typically 90 degrees but other angles are possible) to the other half, so as to produce any combination of force components that will result in a single equivalent force in any direction and magnitude in the plane of the vanes, be it the inlet vanes designated as 2506 in FIG. 25*a* or the exit vanes designated as 2508 in FIG. 25*a*. Various vane configurations are possible, such as the square pattern in FIG. 2516, the cross pattern in FIG. 2517, and the weave pattern in FIG. 2518.

Figure 26:
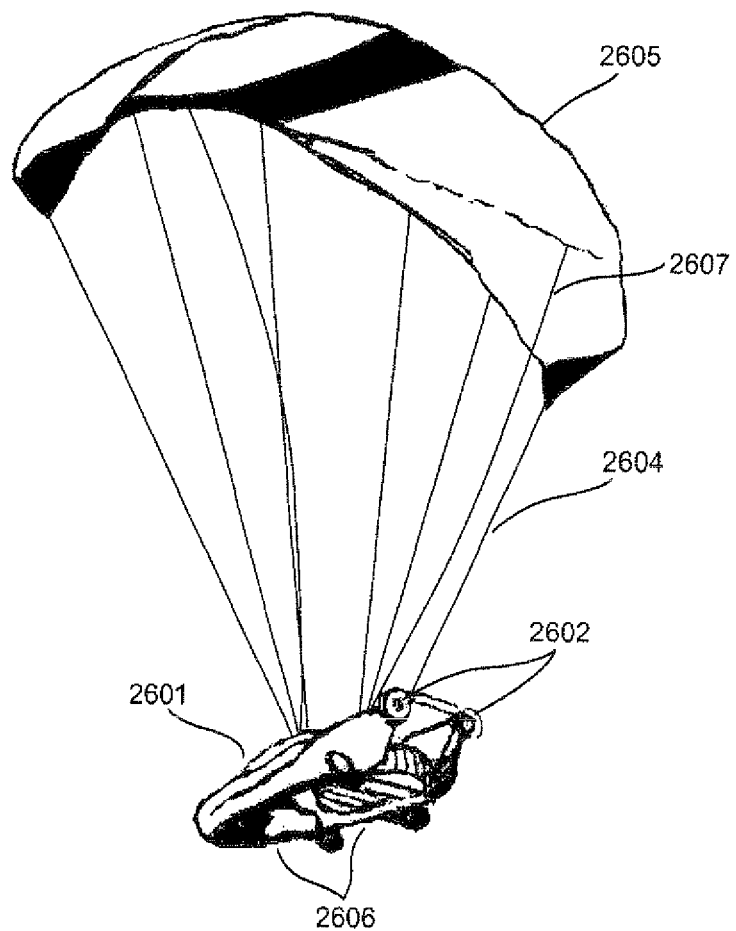
FIG. 26 is a pictorial illustration of a ram-air-'parawing' based emergency rescue system.

FIG. 26 is a pictorial illustration of a ram-air-'parawing' based emergency rescue system. In an emergency, or for other purposes such as extended range, the ducted fan vehicle (manned or unmanned) designated as 2601 need not rely on its lifting fans (2606) to generate lift, but may instead release a lift generating ram-air 'parawing' shown pictorially and designated as 2605. Optionally, the 'parawing' may be steered through the use of steering cables shown schematically and designated as 2607. In the event that the vehicle's pusher fans designated as 2602 are operative, the vehicle can carry on in level flight to its destination. Upon reaching its destination, the vehicle can release the 'parawing' (2605) and continue flying using its lift fans (2606), or may elect to land using the 'parawing (2605) still attached to the vehicle. Alternatively, if the pusher fans (2602) are not producing sufficient thrust, the 'parawing' (2605) will glide the vehicle down to land, preferably extending its glide ratio significantly over a spherical 'standard' parachute.

Figure 27:
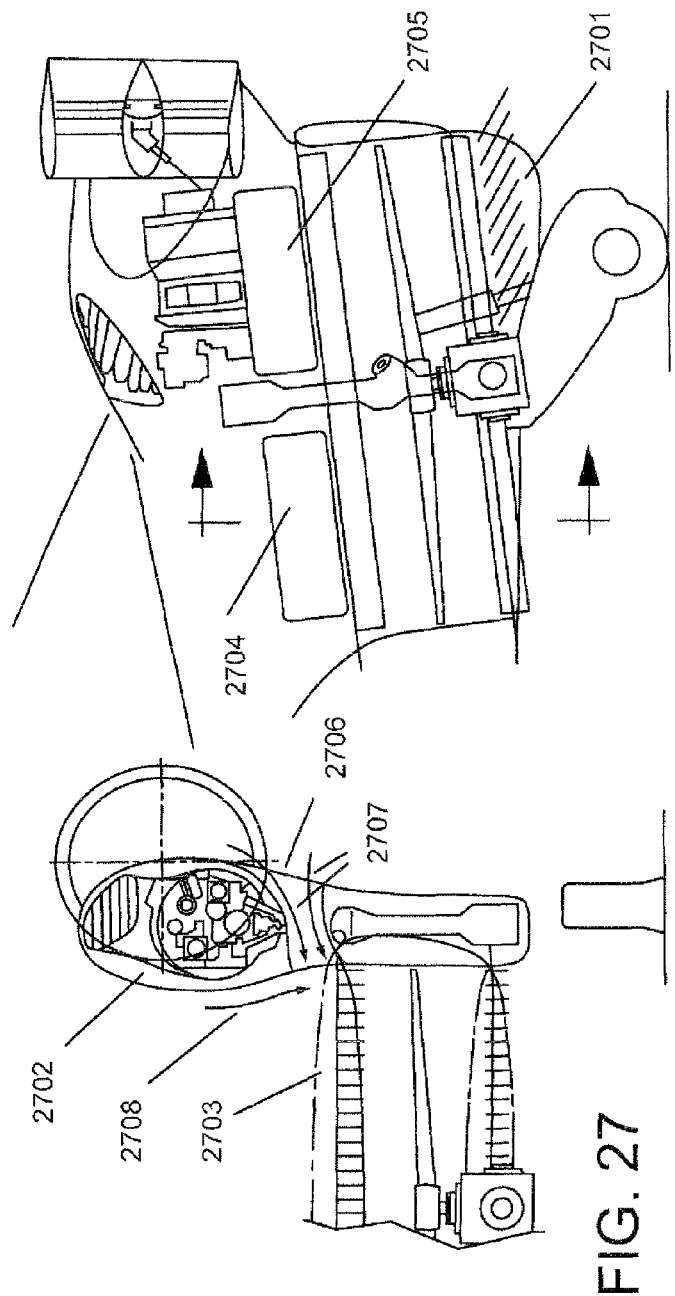
FIG. 27 illustrates optional means of supplying additional air to lift ducts shielded by nacelles from their sides.

FIG. 27 illustrates optional means of supplying additional air to lift ducts shielded by nacelles or aerodynamic surfaces from their sides, typical of the aft lift fans of the vehicles described in FIGS. 1, 5, 6, 8, 9 and 11-22. In FIG. 27, a lift generating ducted fan designated as 2703 is preferably partially shielded from the air around it by a nacelle 2702. Openings for the air, designated as 2704 and 2705, permit outside air to flow (2707) in through a channel (2706) from the sides and combine with the inflow from above (2708) to create relatively undisturbed flow conditions for the ducted fan (2703). With the openings 2704 and 2705 in place, the impact of the nacelle on thrust augmentation of the ducted fan as well as the control effectiveness of the vanes is minimized. Preferably, the exit portions of openings 2704 and 2705 meet and is substantially aligned with an upper lip of the duct of ducted fan 2703.

Figure 28A:
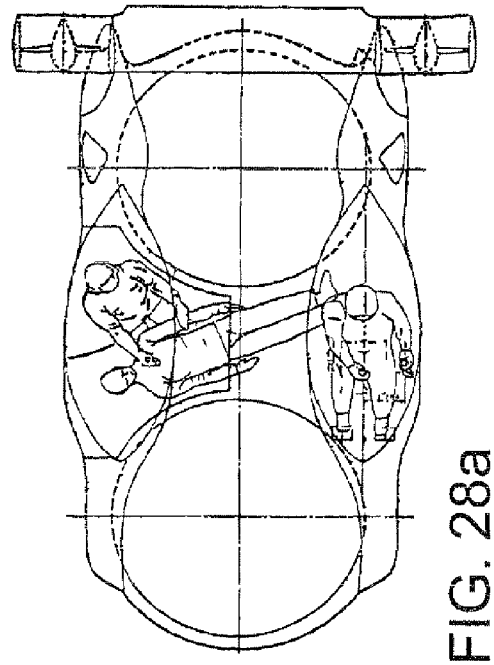
FIGS. 28a-28e are more detailed schematic top views of the medical attendant station in the rescue cabin of the vehicle described in 14b, 14c and 16b.
Figure 28E:
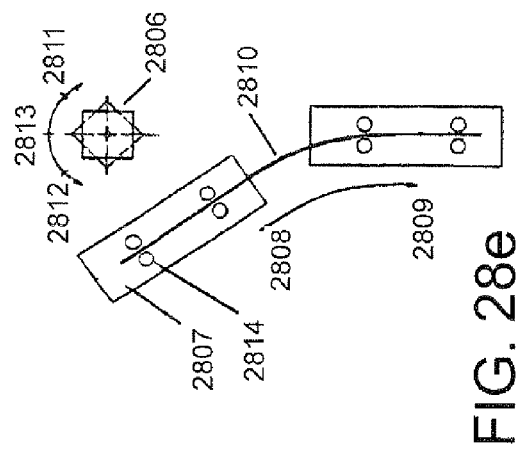
Figure 28D:
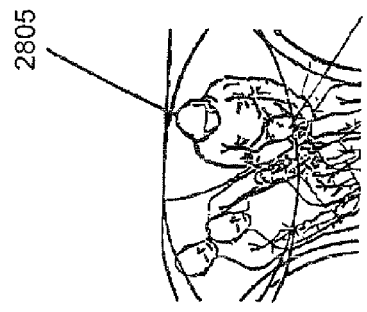
Figure 28C:
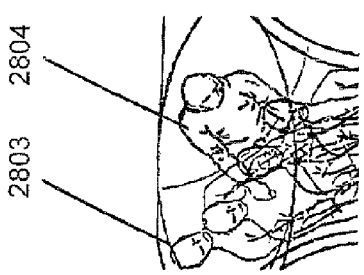
Figure 28B:
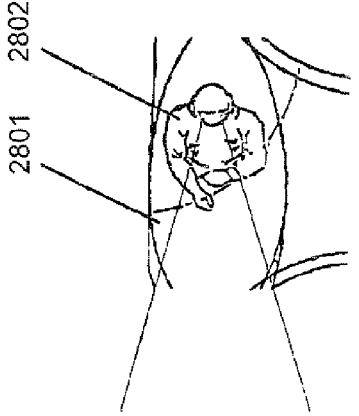

FIGS. 28*a*-28*e* are more detailed schematic top views of the medical attendant station in the rescue cabin of the vehicle described in 14*b*, 14*c* and 16*b*. FIG. 28*a* shows schematically how the cabin is laid out with respect to the vehicle. FIG. 28.*b* illustrates the medical attendant designated as 2802 seated facing forward, resting his/her arms on table 2801, FIG. 28*c* shows the medical attendant in seat's intermediate position, enabling medical attendant to reach comfortable the chest and abdomen area of patient designated as 2803, lying on a litter/stretcher that is free to move along a rail on table 2801, and can be locked in place in any intermediate position. FIG. 28*d* shows the medical attendant in extreme rotated position (2805), and patient litter moved to extreme 'inside cabin' position, to enable medical attendant to reach patient head from behind, necessary for performing procedure of clearing patient's airways. FIG. 28*e* is a schematic depiction of a swiveling seat 2806 that can be used by medical attendant 2802. Also shown schematically in FIG. 28*e* is patient's litter 2807 that is able to move along guiding rail 2810 guided by four wheels or rollers 2814, although a different number of wheels or rollers can be used. When the attendant is facing forward, as 2802 in FIG. 28*b*, and for example when there is no patient on board, the seat 2806 in FIG. 28*e* swivels to its rightmost position as schematically shown in 2811. When the litter is loaded it is normally placed as shown pictorially in FIG. 28*a*, and schematically as 2808 in FIG. 28*e*. In this position, the attendant 2802 swivels on seat 2806 to intermediate position 2813 and has access to patient's chest and abdomen. This seat position corresponds to attendant's position shown pictorially in FIG. 28*c* as 2804. When need arises for attendant to reach the head of patient 2803 from behind, the litter 2807 is moved along track 2810, while attendant now shown in FIG. 28*c* as 2805 swivels seat 2806 to leftmost position, shown schematically in FIG. 28*e* as 2812.

Figure 29:
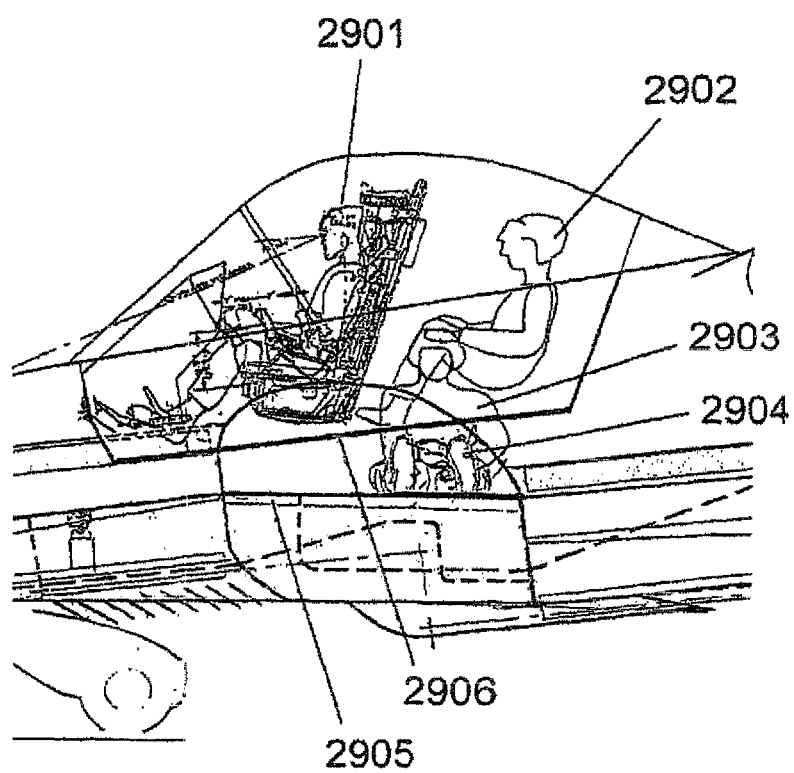
FIG. 29 illustrates in side view some optional additions to the cockpit area of the vehicles described in FIGS. 14-18.

FIG. 29 illustrates in side view various optional additions to the cockpit area of the vehicles described in FIGS. 14-18. The pilot designated as 2901 is shown together with optional room for a crew member or passenger 2902 behind the pilot. Also shown are the medical attendant 2903, and the patient lying in an extreme 'inside cabin' position 2904 on the cabin table 2905. The cockpit floor designated as 2906 may be sealed to separate the pilot's compartment from the cabin.

Figure 30A:
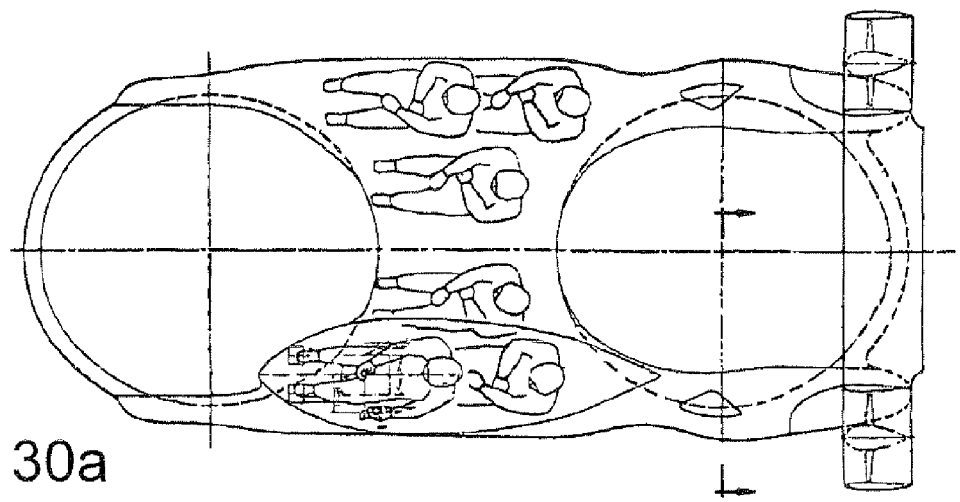
FIGS. 30a-d show a vehicle generally similar to that shown in FIG. 18, however having alternative internal arrangements for various elements including cabin arrangement geometry to enable carriage of 5 passengers or combatants.
Figure 30B:
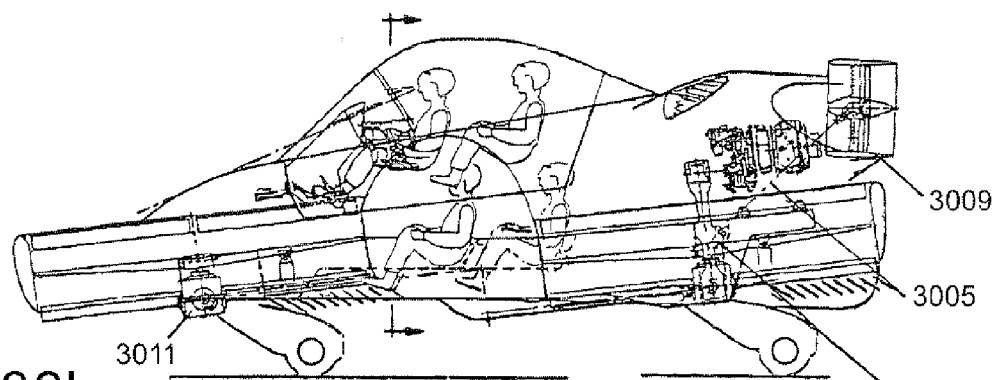
Figures 30C, 30D:
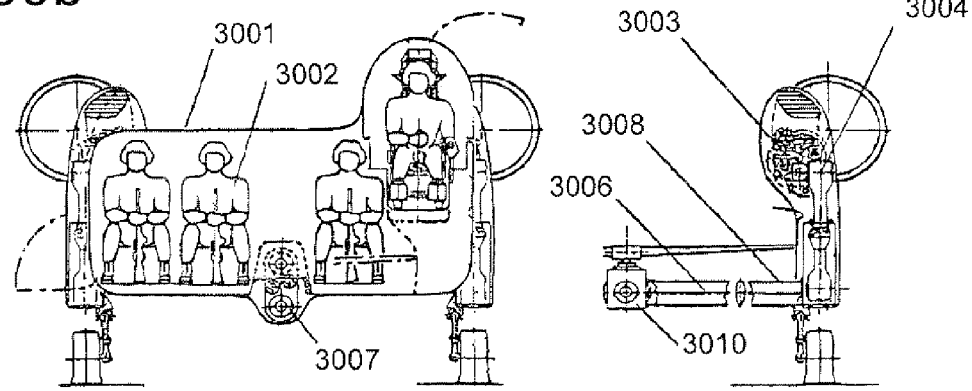

FIGS. 30*a*-*d* show a vehicle that is generally similar to that shown in FIG. 18, but which shows alternative internal arrangements for various elements including cabin arrangement geometry to enable carriage of passengers or combatants. FIG. 30*a* is a top view schematically showing the position of each occupant. FIG. 30*b* is a longitudinal cross section showing placement of equipment and passengers inside the vehicle, and FIGS. 30*c* and 30*d* are local lateral sections of the vehicle. A typical passenger or combatant 3002 is shown in FIG. 30*c*. The top of the cabin 3001 is raised above that of FIG. 18 to accommodate passengers or combatants in center section of vehicle. A single main transmission unit (3004) is shown that is an alternative power transmission scheme to that of FIG. 18. Power is transmitted from engine 3003 to main transmission unit 3004. One angled shaft 3005 transmits power to the aft pusher fan 3009, and a second, generally horizontal shaft 3006 transmits power to the aft lift rotor gearbox 3010. The shaft 3006 is housed inside airfoil shaped housing 3008 that also supports mechanically the aft lift rotor gearbox 3010. A center fuselage secondary transmission 3007 is connected to each of the main lift rotor gearboxes 3010, 3011, and also houses attachment for auxiliary equipment.

Figure 31:
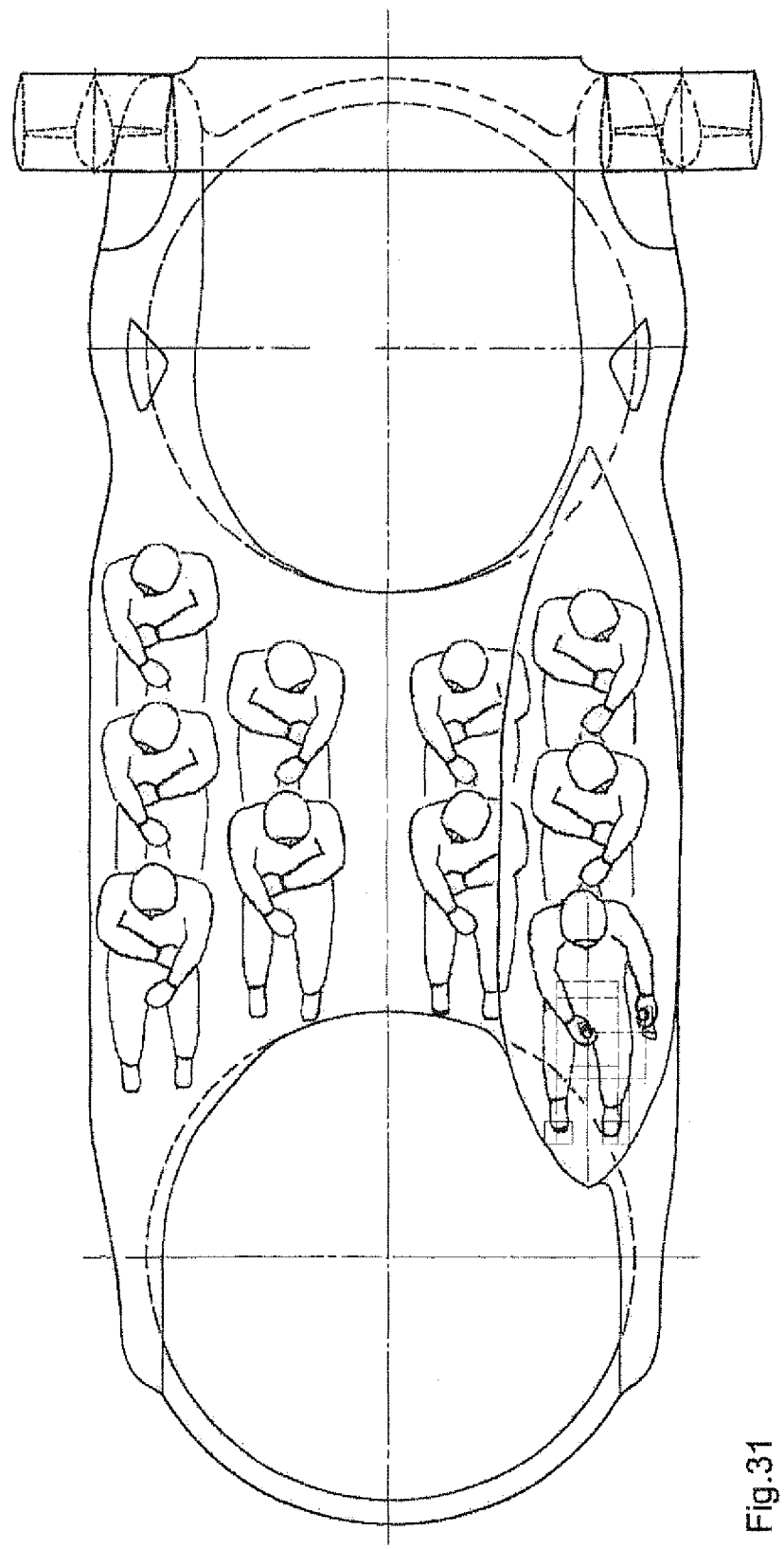
FIG. 31 shows a top view of vehicle generally similar to that shown in FIG. 30a-d, however the fuselage is elongated to provide for 9 passengers or combatants.

FIG. 31 shows a top view of vehicle generally similar to that shown in FIG. 30*a*-*d*, but where the fuselage is elongated to provide for 9 passengers or combatants.

FIGS. 32*a*-*g* illustrate means for enabling the external airflow to penetrate the forward facing side 3201 of the forward ducted fan of the vehicles described in FIGS. 1-21 and FIGS. 30-31 while in forward flight. One configuration that may be used to obtain such airflow penetration is shown in FIG. 32*b* and generally also shown at the forward end of FIG. 32*a*. Rows of generally vertical open slots 3204 for enabling throughflow of air are shown, with remaining duct structure including an upper lip 3202 and a lower ring 3205. Airfoil shaped vertical supports 3203 serve to stabilize the structure and provide protection for the fan inside the duct. The slots 3204 remain open at all times. A second configuration for obtaining such airflow penetration is shown in FIG. 32*c* where the whole forward wall of the forward duct is cut to obtain two generally rectangular openings 3206 with an optional center support 3207. An additional option, which is an expansion of the method of FIG. 32*b*, is shown in FIGS. 32*d* and 32*e* where externally actuated rotating valves 3208 are mounted inside each slot 3204. When the vehicle is hovering, the slots are closed by the valves as shown in FIG. 32*e*. When the vehicle is in forward flight and flow of air into the duct is desired, the externally actuated valves 3208 rotate to the 'open' position shown in FIG. 32*d*, where the airflow 3209 is free to flow through the slots. An alternative to the concept of FIGS. 32*d*-*e*, is shown in FIGS. 32*f*-*g* where each of the vertical supports 3203 is attached to upper lip 3202 and lower ring 2305 by hinges that enable multiple vertical supports to pivot around multiple vertical axes 3210 and assume the position shown in FIG. 32*g*, where the multiple slots 3204 are closed to the external airflow.

FIGS. 33*a*-*e* illustrate alternative means for enabling the internal airflow to exit through the walls of the aft ducted fan of the vehicles described in FIGS. 1-21 and FIGS. 30-31, while in forward flight. One configuration for obtaining such airflow exit is shown in FIG. 33*b* and generally also shown at the aft end of the vehicle shown in FIG. 33*a*. Rows of generally vertical open slots 3304 for enabling exit of air are shown, with remaining duct structure including upper lip 3302 and lower ring 3305. Airfoil shaped vertical supports 3303 serve to stabilize the structure and provide protection for the fan inside the duct. The slots 3304 preferably remain open at all times. A second possible option of obtaining such airflow exit is shown in FIG. 33*c* where the whole rear wall of the aft duct is cut to obtain two generally rectangular openings 3306 with an optional center support 3307. An additional option, which is an expansion of the method of FIG. 33*b*, is shown in FIG. 33*d* and FIG. 33*e* where externally actuated rotating valves 3308 are mounted inside each slot 3304. When the vehicle is hovering, the slots are closed by the valves, as shown in FIG. 33*e*. When the vehicle is in forward flight and exit of air through the duct wall is desired, the externally actuated valves 3308 rotate to the 'open' position, as shown in FIG. 33*d*, where the airflow 3309 is free to flow through the slots. An alternative to the concept of FIGS. 33*d*-*e* is shown in FIGS. 33*f*-*g* where each of the vertical supports 3203 is attached to upper lip 3202 and lower ring 2305 by hinges that enable multiple vertical supports to pivot around multiple vertical axes 3210 and assume the position shown in FIG. 33*g*, where the multiple slots 3204 are closed to the external airflow. As made apparent in FIGS. 32*b*, 32*c*, 33*b* and 33*c*, the openings in the duct wall extend both upstream and downstream of the fan or propeller.

FIGS. 34*a*-*c* illustrate alternative means for directing the internal airflow to exit with a rearward velocity component for the purpose of minimizing the momentum drag of the vehicle in forward flight. As shown, the lower forward portion of the forward duct 3401 is curved back at an angle that increases progressively along the circle-shaped forward duct wall, reaching a maximum angle at the center section. The curvature may vary from vertical all around the duct, such as at hover, to 30-45 degrees from vertical inclined backwards at center and decreasing progressively to the sides of the duct. In a similar manner, the lower forward center fuselage 3402, the lower aft portion of the center fuselage 3403 and the lower aft portion of the aft duct 3404 are curved back to direct the flow exiting from the ducts to better align with the incoming flow when the vehicle is in forward flight. The above geometrical reshaping of the ducts exits may be fixed (i.e. built into the shape of the ducts) as in FIG. 34*a*, or alternatively, may be of variable geometry such as flexible lower portion of ducts as shown in FIG. 34*b*. Various means of obtaining change of geometry to said lower duct portion are available. One option, illustrated in FIG. 34*b* shows the upper, fixed part of the duct 3405, to which is attached a flexible or segmented lower part 3406. The outer sleeve 3408 of a flexible 'push-pull' cable 3407 is connected to bottom of the flexible or segmented lower part 3406, whereby an actuator 3409, or optionally two actuators shown schematically as 3409 and 3410, mounted inside the fuselage would pull the cable 3407, thereby affecting the geometry of the duct as desired. The lower aft portion of the center fuselage 3404 is moved back in a manner similar to the lower forward portion of the forward duct 3401 as explained, but with the difference that moving the aft duct lower part backwards involves pushing a flexible 'push-pull' cable rather then pulling by the actuator/s from inside the fuselage, as was the case in FIG. 34*b*.

FIGS. 35*a*-*c* illustrate additional alternative means for enabling the external airflow to penetrate the walls of the forward duct and the internal airflow to exit through the walls of the aft ducted fan of the vehicles described in FIGS. 1-21 and FIGS. 30-31, while in forward flight, for the purpose of minimizing the momentum drag of the vehicle. As shown in FIG. 35*a*, the forward part of the forward duct has an upper section 3501, an opening for incoming airflow 3502 and a lower ring 3506. Similarly, the aft portion of the aft duct has an upper section 3504, an opening for incoming airflow 3505 and a lower ring 3506. Optional center supports 3509, 3510 are provided at the forward and aft ducts respectively for supporting the lower rings 3503 and 3506. FIGS. 35*b* and 35*c* show an enlarged cross-section through the forward duct with an optional flow blocker 3507. Flow blocker 3507 is preferably a rigid, curved barrier that slides up into the upper lip when in forward flight, and slides back down to block the flow when in hover.

FIG. 35*c* shows how the flow blacker 3507 is mechanically lowered, such as by actuators or other means not shown, to engage ring 3506 or other similar means on lower ring to block the external airflow, and preserve the straight cylindrical shape of the ducts down to the duct exits, while the vehicle is in slow flight or hover. A similar arrangement can be applied to the aft end of the aft duct. It is appreciated that flow blocker 3507 can either be one piece for each duct, or divided into two segments, such as where the option of adding vertical supports 3509 and 3510 is used.

The vehicle illustrated in FIGS. 36-41 is a VTOL aircraft carrying a ducted fan lift producing unit 3601 at the front and a second similar lift producing unit 3602 at the rear. In addition, the vehicle features two ducted-fan thrusters 3603 and 3604 located at the rear, and a horizontal stabilizer 3605 for providing pitch stability to the vehicle, that also features movable flaps 3606 for creating additional lift through flap deflection. The stabilizer 3605 may also be optionally pivoted as a unit around pivots shown at 3707. Alternatively or in addition to the movable flaps and pivotal stabilizer, there may be other aerodynamic means of flow control such as air suction or blowing, piezoelectric, or other actuators or fluidic controls. The vehicle of FIGS. 36-41 also features a compartment, such as a passenger cabin 3608, occupying the central portion of the vehicle, being below and substantially to the side of the pilot's compartment 3609. A longitudinal cross section, designated as A-A is marked on FIG. 36 and is shown in FIG. 42 but with the landing gear omitted).

Figure 36:
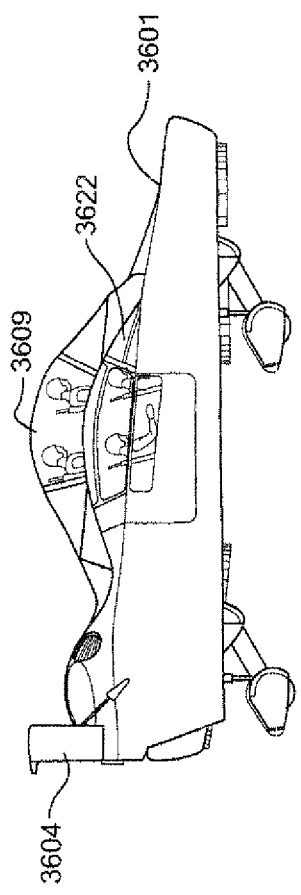
FIG. 36 is a side elevation of one form of two-duct VTOL aircraft vehicle constructed in accordance with the present invention.
Figure 38:
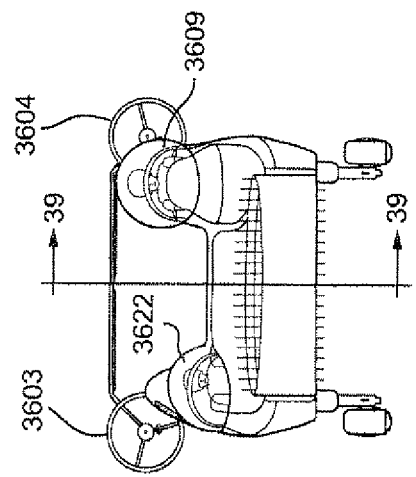
FIG. 38 is a front elevation view of the vehicle shown in FIG. 36.
Figure 37:
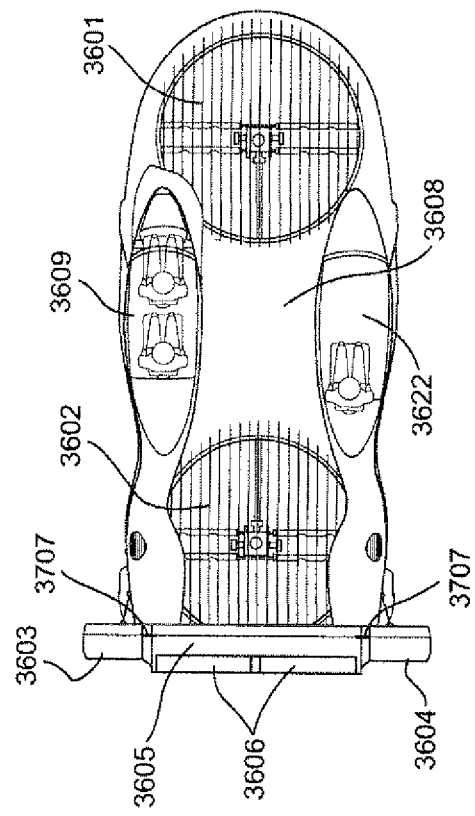
FIG. 37 is a top plan view of the vehicle shown in FIG. 36.
Figure 39:
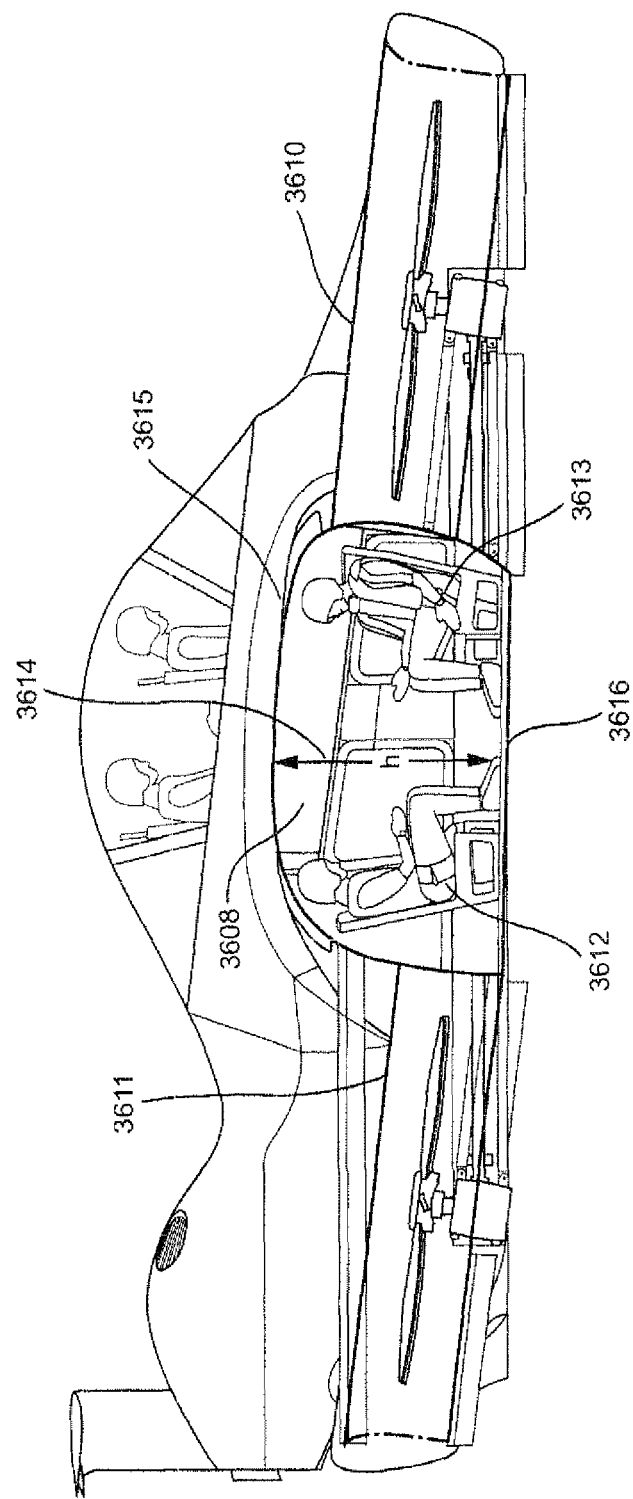
FIG. 39 illustrates a longitudinal cross-section taken along line 39-39 of FIG. 38.

FIG. 39 shows the longitudinal cross section A-A from FIG. 36, illustrating the forward lift fan duct 3610, the rear lift fan duct 3611 and the central cabin 3608 showing by way of example only a forward facing passenger at 3612, a rear facing passenger 3613 and the cabin height h at 3614, providing sufficient room and head clearance for the vehicle's occupants. The outer upper and lower boundaries of the cabin 3608 shown at 3615 and 3616 respectively are functionally configured to provide a substantially constant cabin height thereby featuring a relatively flat surface substantially aligned with the longitudinal axis of the vehicle, and preferably substantially parallel to the air flow lines during the flight in order to reduce drag, on both the roof 3615 and the floor 3616 of said occupant's cabin.

Figure 40:
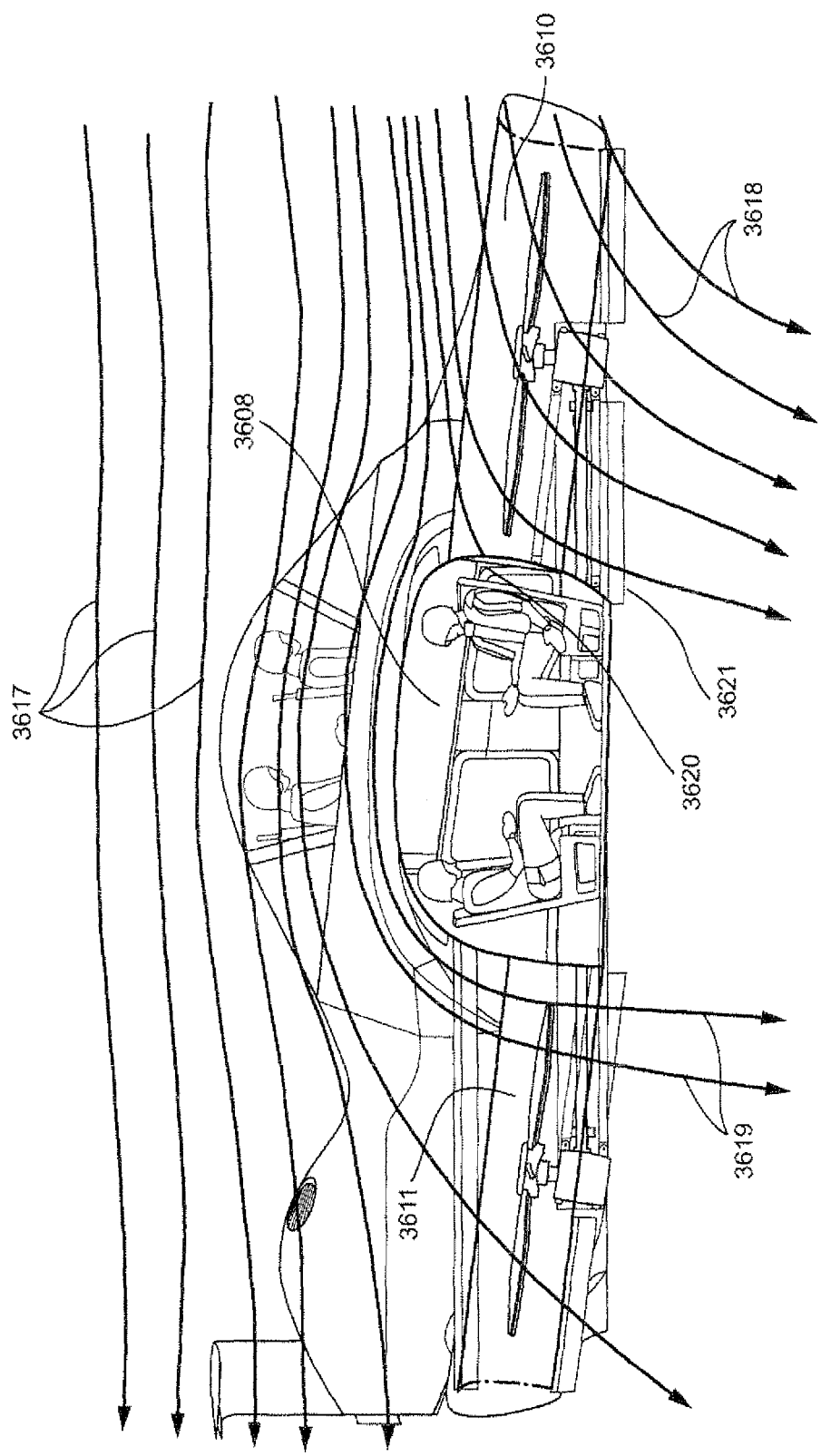
FIG. 40 illustrates the two dimensional airflow pattern around the cross-section outer boundaries of the vehicle of FIG. 36.

FIG. 40 illustrates the air flow around the cabin 3608 at forward cruise. While airflow that is distant from the vehicle shown schematically by the streamlines at 3617 is undisturbed by the vehicle, closer streamlines are affected by the vehicles shape and the action of the forward and rear lift fans. Those include the air entering the forward duct 3610 shown schematically at 3618, air flowing over the cabin 3608 and then entering the rear duct 3611 shown schematically at 3619. A stagnation point shown schematically at 3620 is always present, where all air below the streamline ending at this stagnation point flows over the cabin roof, with some of it continuing aft and some of it flowing into the rear lift duct 3611. It should be noted that due to the abrupt change in the vehicle's contour at the exit of the flow from the forward duct, the flow cannot make the turn and remain attached to the bottom of the cabin. Instead, in the region shown at 3621, the flow continues its downward motion, and only at a distance from the vehicle, turns gradually back to align itself with the incoming free-stream flow. This separation of flow from the bottom of the cabin 3608 causes considerable drag and especially momentum drag increase to the complete vehicle in forward cruise flight. It should further be explained that the flow patterns described in FIG. 40 are not limited to the center section A-A, but are generally prevailing across the width of the vehicle's cabin, creating essentially 2-dimensional flow with no spill-over to the sides of the vehicle. This is caused predominantly by the suction effect of the lift fans, with the rear fan being the major contributor. A secondary contributing factor to the absence of spill-over from the center section is the raised side canopies or cockpits 3609, 3622 shown in FIGS. 36-39. However, it will be emphasized that the 2-dimensional flow with no spill-over to the sides prevails also in vehicles which do not have raised or elevated side canopies or roof shape which resembles the vehicles shown in FIGS. 36-39, and the present invention applies also to such vehicles. Furthermore, the flow in FIG. 40 is shown fully attached to the surface even behind the cabin, with no separation which again would not be possible at high speed cruise without the rear fan acting to create the suction that attaches the flow to the vehicle's surface.

Figure 41:
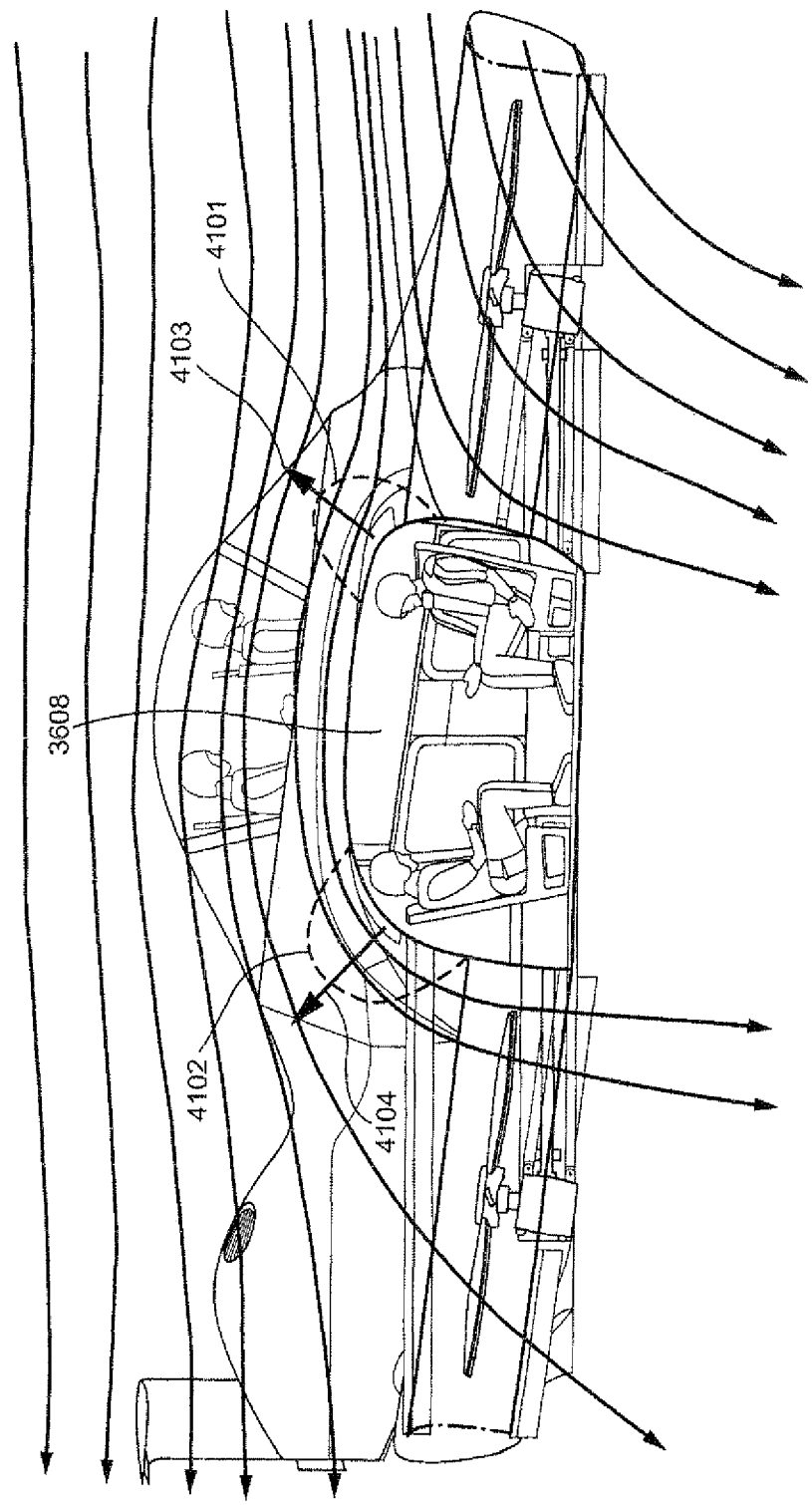
FIG. 41 illustrates how suction is formed on upper surface of the center portion of the vehicle of FIG. 36.
Figure 42:
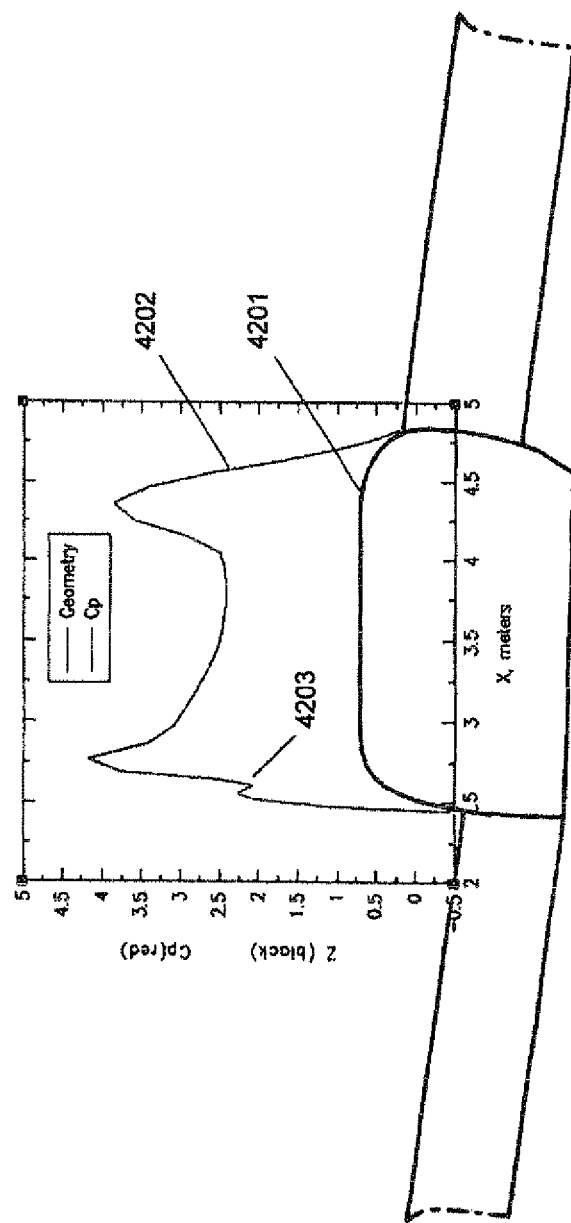
FIG. 42 illustrates the typical pressure coefficient distribution on an upper surface similar to the center portion of the vehicle of FIG. 36.

FIG. 41 illustrates the influence that streamlines flowing over the cabin roof have on the local air pressure adjacent to the vehicle's outer surface. Shown at 4101 and 4102 are two typical low pressure areas, created by the acceleration of the airflow over the forward curved end of the cabin 3608, and once more when the air accelerates as it goes around the curved rear end of the cabin. Because the roof of the cabin is substantially flat, the area directly above the cabin does not experience substantial changes in air pressure. As a result of the low pressure areas 4101 and 4102, two resultant suction forces develop, shown schematically at 4103 and 4104, that act by the air on the vehicles outer surface, with the net effect of some additional aerodynamic lift.

FIG. 42 illustrates the results of Navier-Stokes analysis of the pressure coefficient distribution on a flat upper surface shown at 4201 similar to the top of the center portion of the vehicle of FIG. 36. As can be seen, a low negative pressure peak shown in absolute values at 4202 is formed on the front end of the upper surface, reducing to moderate pressure on the flat surface, and increasing back to high suction Cp as the flow makes the rear curve of the roof, down towards the lift fan. A slight disturbance in the smoothness of the Cp curve is noticeable at 4203, caused by local flow separation, which is however quick to re-attach to the surface of the vehicle before entering the rear lift fan.

Figure 43:
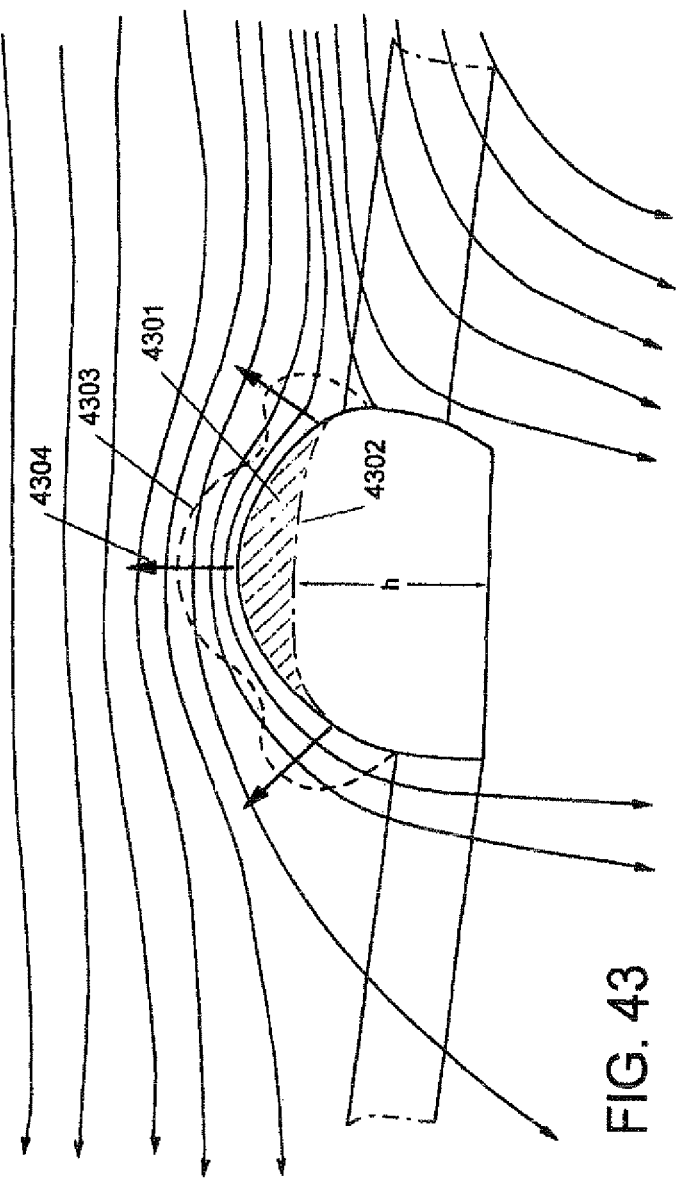
FIG. 43 illustrates how an external aerodynamic blister can provide additional suction and provide extra lift to the vehicle at high speed.
Figure 44:
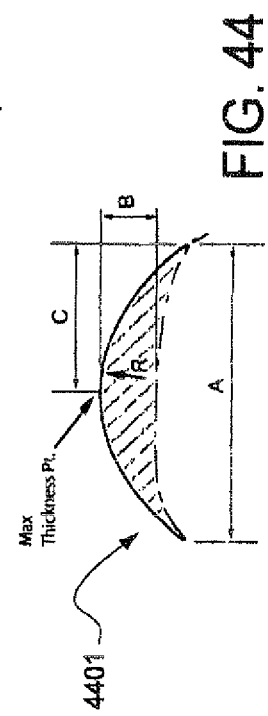
FIG. 44 illustrates exemplary dimensional relationships for the blister shown in FIG. 43.

FIG. 43 illustrates a modification to the outer roof line where a convex surface configuration, or "blister" 4301 is added on top of the substantially flat roof contour 4303. (Roof contour 4302 has the identical or substantially identical shape of roof 3615 of FIG. 39) Due to the presence of the blister and continuous convexness obtained on the outer surface, a new low pressure region is now created shown schematically as 4303, with an additional suction force 4304 providing additional lift to the vehicle. It should be noted that the low pressure area 4303 and all resultant forces are shown schematically merely to illustrate the mechanism by which additional lift is obtained through the addition of blister 4301 on the cabin roof. Shown at 4401 in FIG. 44 are some characteristics relating to the geometry of the blister 4301. Shown is substantially constant upper circular arc with radius R, with maximum thickness occurring substantially at midpoint so that $C \sim = \frac{1}{2}A$, and value of R to obtain a ratio between maximum thickness B and longitudinal measure A substantially in the range of $B/A \sim = 0.20 \text{-} 0.40$.

Figure 45:
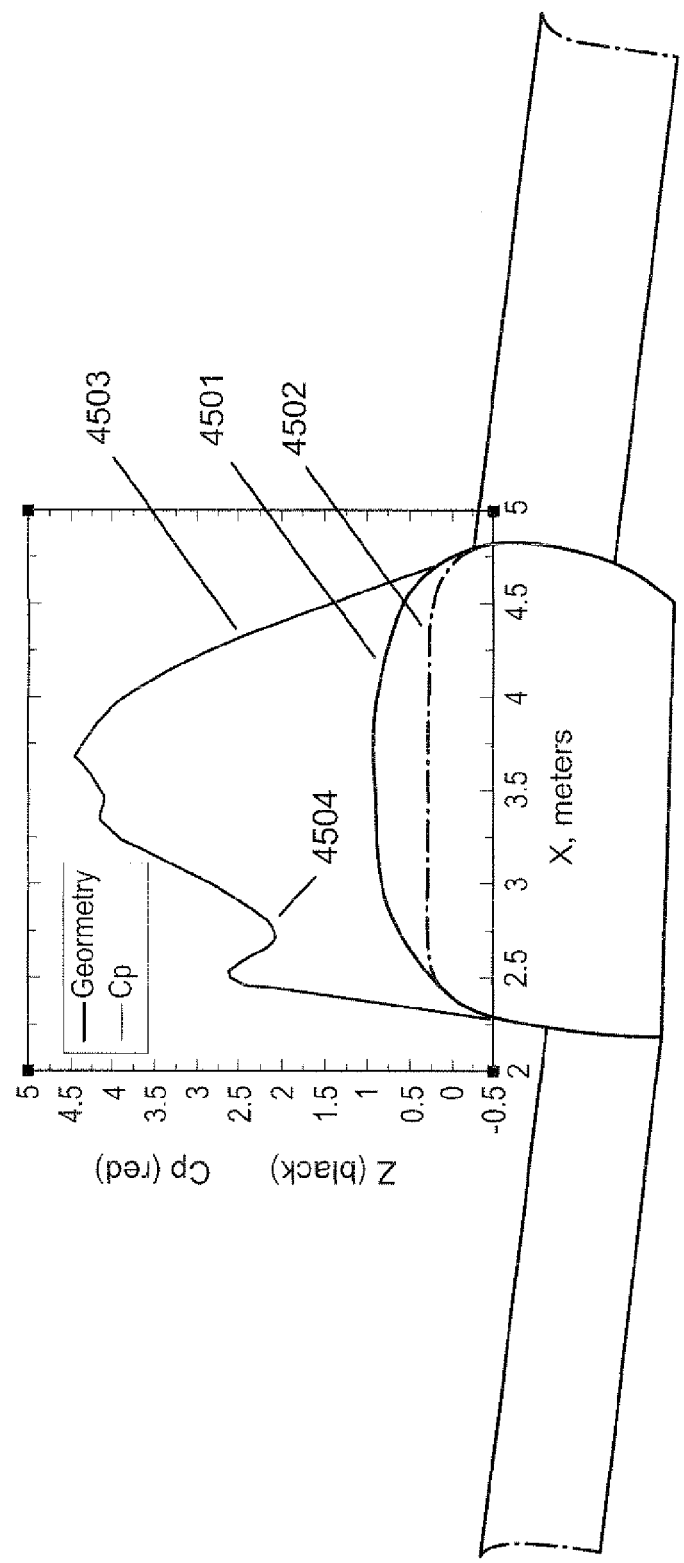
FIG. 45 illustrates the typical pressure coefficient distribution on a blister added to the upper surface of the center portion of the vehicle of FIG. 36.

FIG. 45 illustrates the results of Navier-Stokes analysis of the pressure coefficient distribution on a curved upper surface shown at 4501 similar to the top of the blister 4301 of FIG. 43. The original flat cabin roof is shown for reference at 4502. As can be seen, a low negative pressure shown in absolute values at 4503 begins to form on the front end of the upper surface, but unlike the pressure distribution of FIG. 42, the pressure keeps increasing to high suction Cp, reaching a maximum value approximately over the highest portion of the blister. As in FIG. 42, also here a slight disturbance in the smoothness of the Cp curve is noticeable at 4504, however more prominent than that of FIG. 42, also caused by local flow separation, which is however quick to re-attach also here to the surface of the vehicle before entering the rear lift fan.

Figure 46:
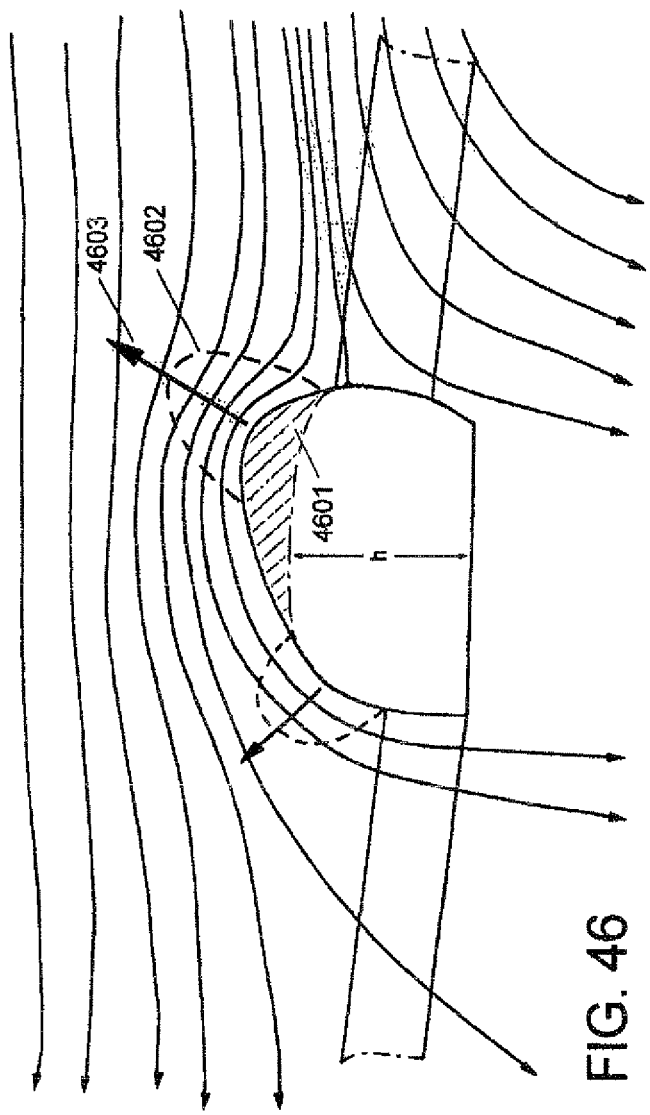
FIG. 46 illustrates how, by forming the blister to have a more pronounced forward end, the direction and magnitude of the resultant suction on the blister can be adjusted to obtain high lift with reduced drag.

FIG. 46 shows a modification on the shape of the blister, shown here at 4601, not being substantially symmetrical as blister 4301 of FIG. 43, but having an intentional forward inclination, where the radius of curvature of the blister outer surface that is closer to the incoming air is smaller, and thereby the front facing curvature of the blister 4601 is steeper and less gradual than the curvature of its rear portion. As a result, the acceleration of air over the forward part of blister 4601 is faster, and the low pressure area created shown at 4602 has lower pressures than on the standard flat roof while acting on a similarly sized portion of the vehicle's body, thereby creating a stronger lift force shown schematically at 4603, while, unlike for the symmetrical blister of FIG. 43, also having this resultant angled forward to create a positive propulsive force component in the direction of flight, in addition to the lift force component. It should again be emphasized that the shapes of the low pressure regions and size and direction of resulting forces are shown schematically merely to illustrate the mechanism by which additional lift is obtained through the low pressure field created by the presence of the blister on top of the substantially flat standard cabin roof.

Figure 47:
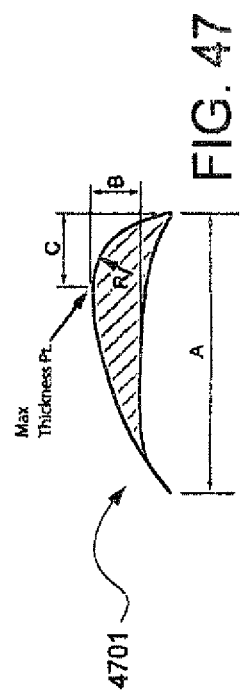
FIG. 47 illustrates exemplary dimensional relationships for the blister shown in FIG. 43.

Shown at 4701 in FIG. 47 are some characteristics relating to the geometry of the blister 4601. Shown is non-constant upper circular arc with smaller radius of curvature R at the forward area of the section, with typical values so as to obtain maximum thickness occurring substantially in the range of distances from the forward edge $C \sim = 0.2A \text{-} 0.3A$, while at the same time obtaining a desired ratio between maximum thickness B and longitudinal measure A, substantially in the range of $B/A \sim = 0.20 \text{-} 0.40$.

Figure 48:
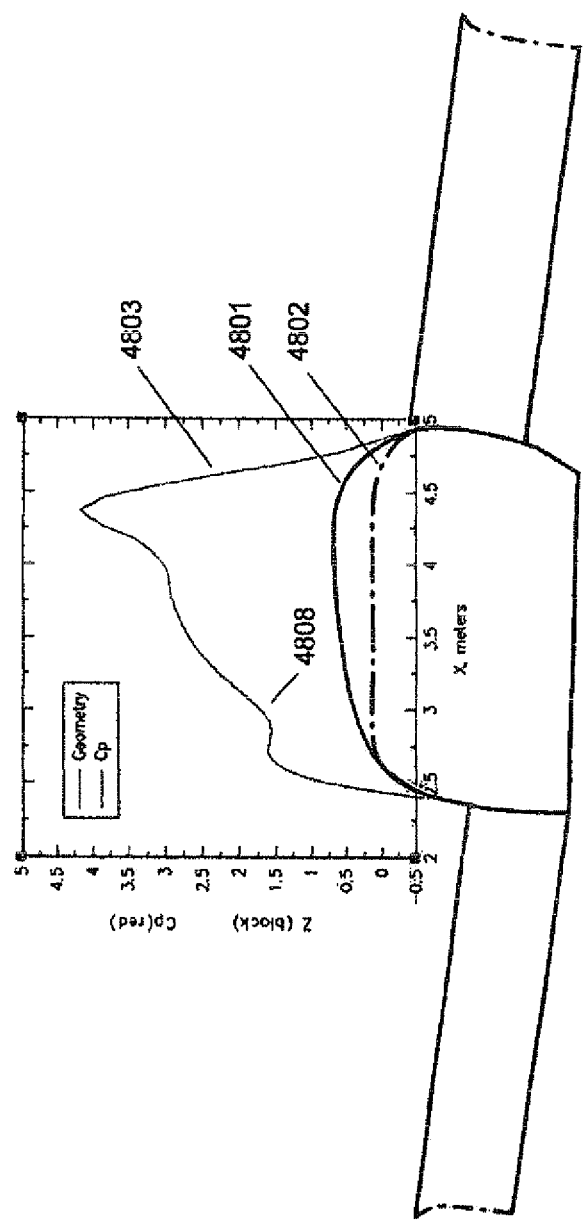
FIG. 48 illustrates the typical pressure coefficient distribution on a blister similar to that of FIG. 48, when added to the upper surface of the center portion of the vehicle of FIG. 36.

FIG. 48 illustrates the results of Navier-Stokes analysis of the pressure coefficient distribution on a curved upper surface shown at 4801 similar to the top of the blister 4601 of FIG. 46. The original flat cabin roof is shown for reference at 4802. As can be seen, a low negative pressure shown in absolute values at 4803 begins to form on the front end of the upper surface, rises steeply, and reaches a maximum value approximately over the highest portion of the blister. As in FIGS. 42 and 45, also here a slight disturbance in the smoothness of the Cp curve is noticeable at 4808, also caused by slight local flow separation, which is however quick to re-attach also here to the surface of the vehicle before entering the rear lift fan.

Figure 49:
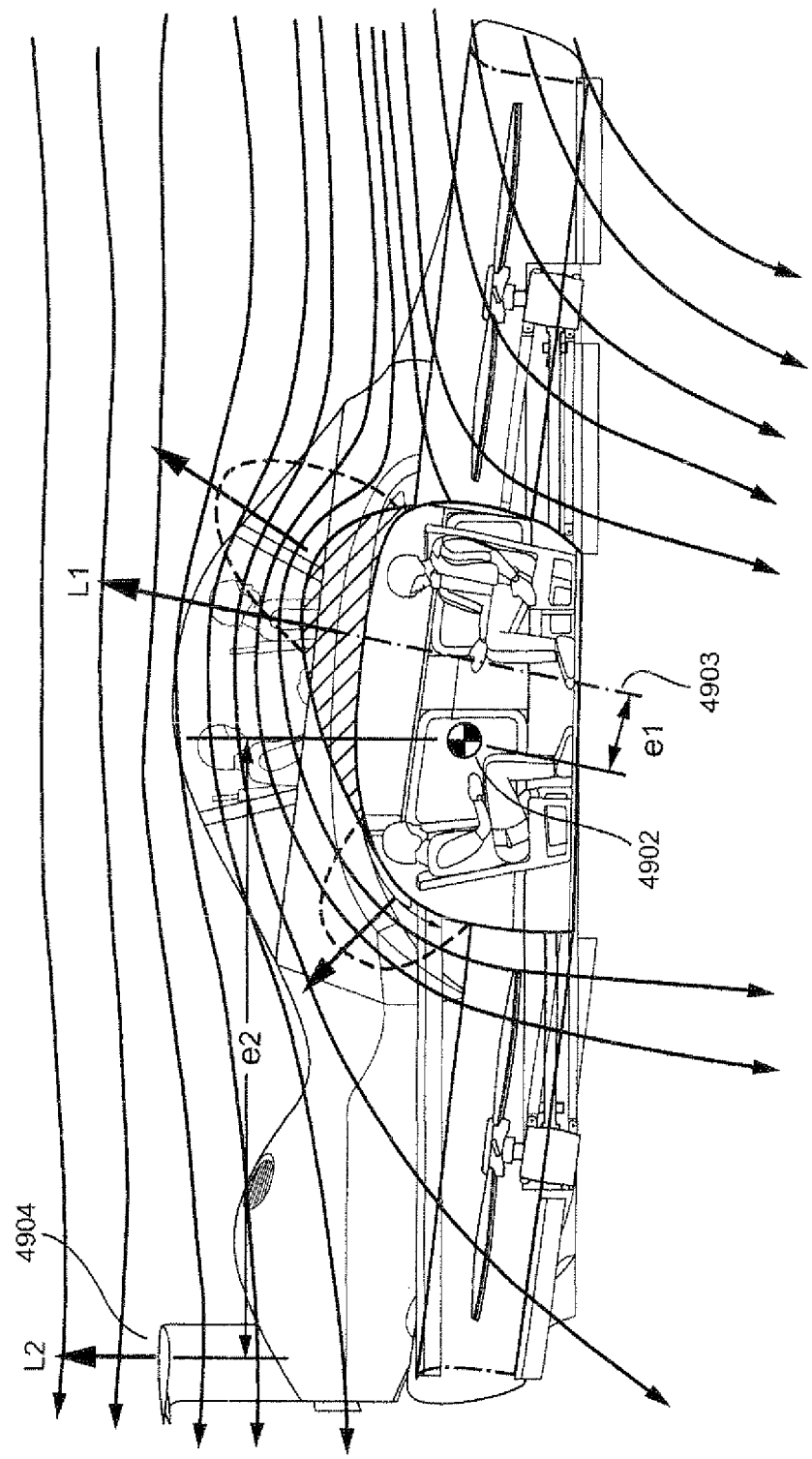
FIG. 49 illustrates how, by moving the resultant lift vector of the blister forward, it is possible to also combine additional useful lift from the vehicle's horizontal stabilizer.

FIG. 49 illustrates how a forward inclined blister similar to the one shown at 4601 in FIG. 46 also has the effect of moving forward the net lift force shown as L1 acting on the roof through the blister, relative to the substantially symmetric blister shape shown at 4301 on FIG. 43. Because the Center of Gravity of the vehicle, shown at 4902 around which the vehicle rotates as a free body, is located substantially at the center of the vehicle, an eccentricity shown as e1 develops between the lien of action of force L1, shown at 4903 and the Center of Gravity 4902. As a result, a positive, nose-lifting pitching moment develops as a result of the forward lift line location of the blister, which needs to be counteracted to maintain the balance of the vehicle in pitch. This is where additional lift shown as L2 can easily be generated by the horizontal stabilizer shown at 4904, that, together with eccentricity e2 of L2 relative to the Center of Gravity 4902, can counter-balance the pitching moment caused by L1. The beneficial result of this is that an additional lift force L2 is now acting on the vehicle, further increasing the lift at cruise, keeping in mind that the horizontal stabilizer 4904 could not have been used to create lift, had there been no counter such as the forward inclined blister 4601 maintaining the required balance of moment around the vehicle's Center of Gravity.

Figure 50:
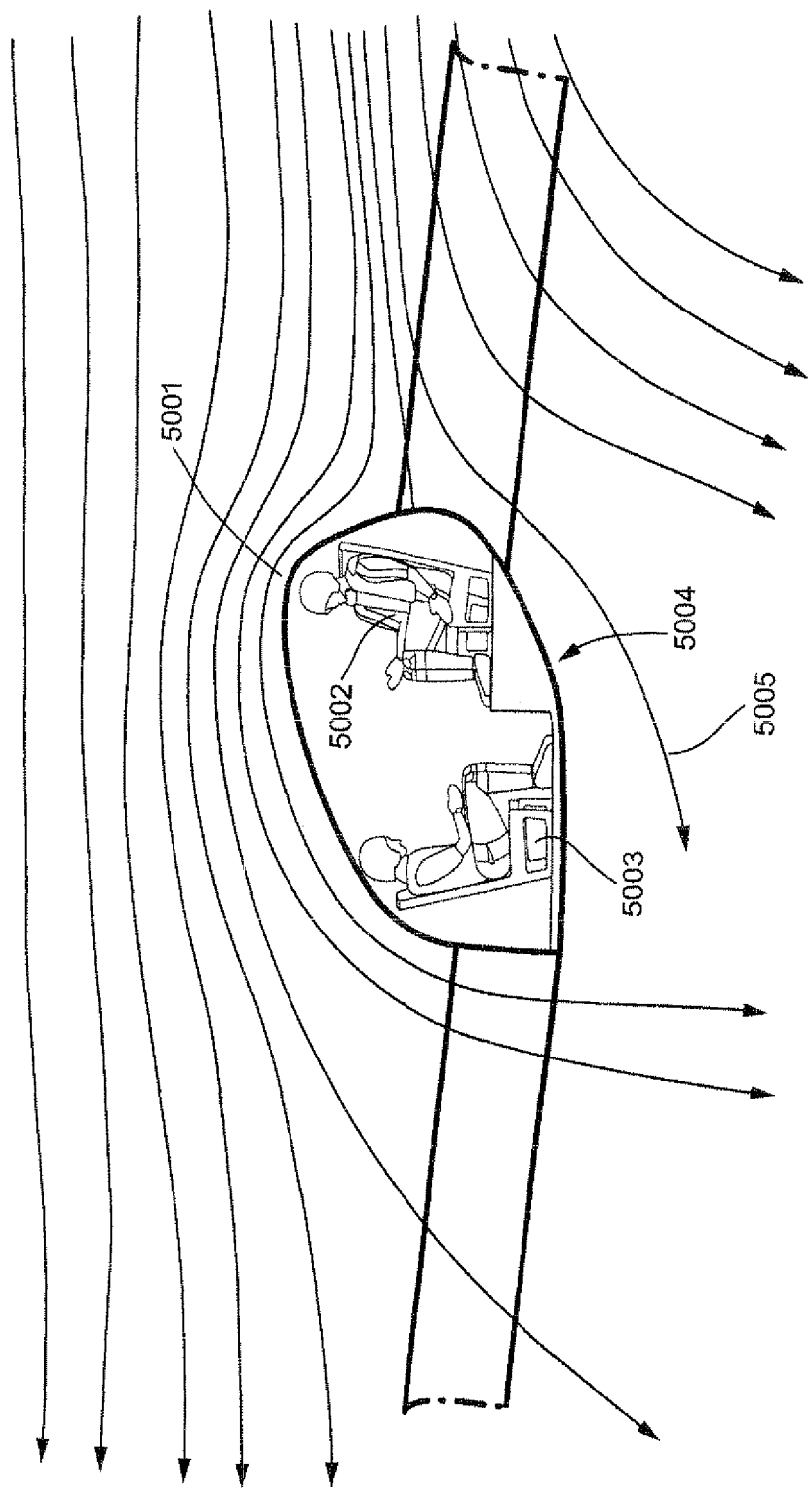
FIG. 50 illustrates an application where the internal cabin roof is raised to conform with the outer limit of the blister of FIG. 46, while also enabling re-shaping of the cabin floor to improve flow on lower side of vehicle.
Figure 51:
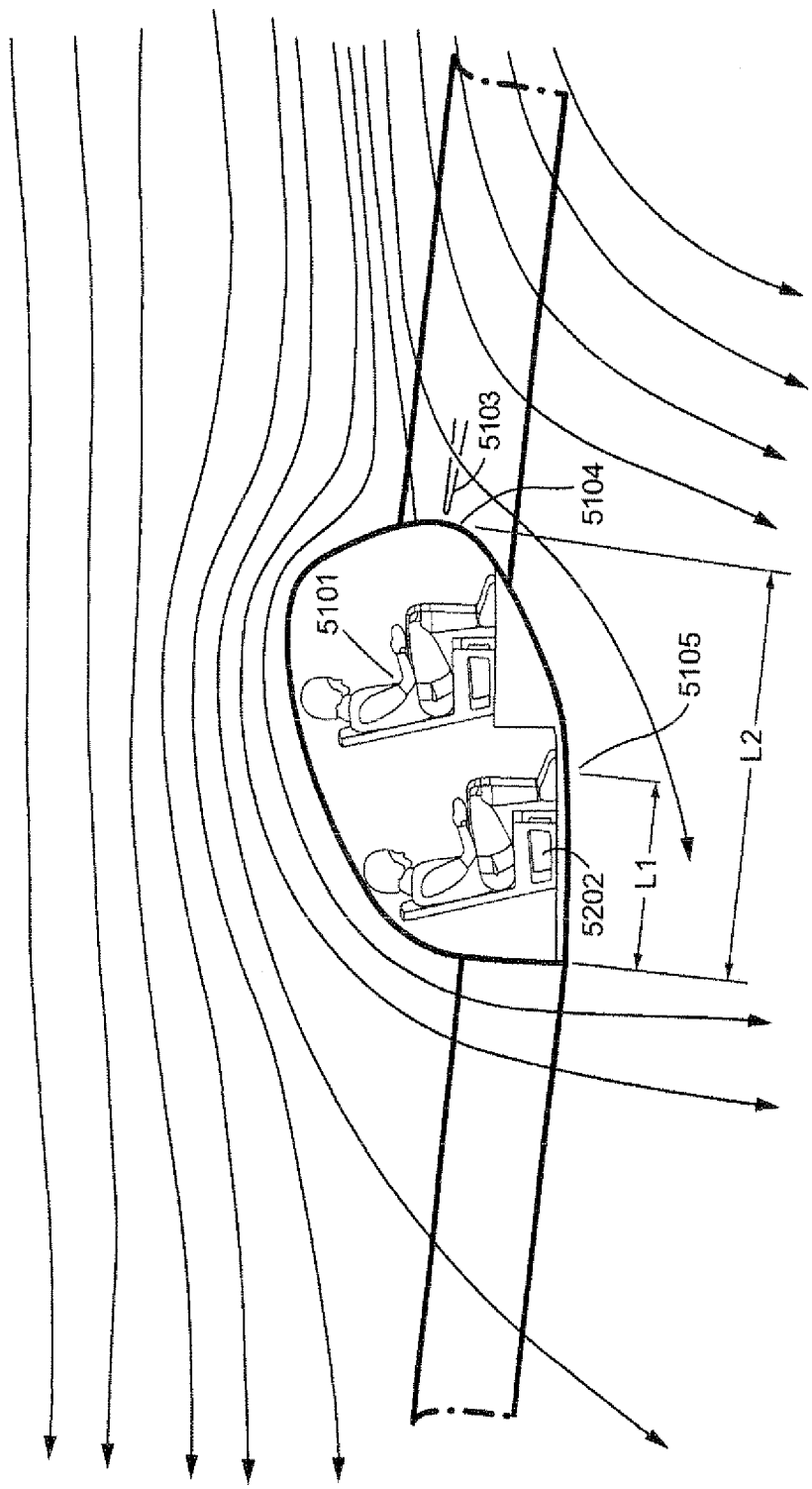
FIG. 51 illustrates a cabin arrangement alternative to that of FIG. 50, where both occupants are facing forward, with additional clarifications concerning the geometry of the re-shaped cabin floor.

FIG. 50 illustrates how, if the forward inclined blister shown at 4601 in FIG. 46 is made hollow to effectively create a modified cabin roof substantially in the shape of the blister shown at 5001, the rear facing occupant shown at 5002 can now be raised relative to the forward facing occupant 5003, yielding an added benefit of being able to reconfigure the floor of the cabin in a manner shown at 5004 and further explain in FIG. 51, thus providing smooth outflow of the air, shown schematically at 5005 from the exit of the forward duct, resulting in reduction of the drag and especially momentum drag of the vehicle in cruise.

FIG. 51 illustrates that the invention is not limited to rear facing occupants, and that both occupants shown at 5101 and 5102 can also be forward facing, or in fact be seated in any intermediate position in the cabin. It should be emphasized that the occupants herein described, by way of example only, can be replaced by cargo or by any other cabin or payload bay function or contents. Also further explained in FIG. 51 is the geometry of the reconfigured floor common to FIGS. 50 and 51. It can be seen that as soon as the forward duct inner surface clears the tip of the propeller blades shown schematically at 5103, the outer boundary of the cabin begins to curve backwards at point marked by 5104, and continues aft at a shallow angle, merging with the original flat cabin bottom at a point marked by 5105, which is substantially aft of the forward end of the cabin. It can be noticed that the radius of curvature at the start close to point 5104 is small (i.e., relatively sharp corner), followed by a relatively flat (large radius of curvature) slope down to point 5105. This relatively flat angled bottom, rather than a constant arc chosen for the cabin floor achieves two purposes: a. The relatively sharp curve in the contour close to point 5104 facilitates early separation of the flow from the forward bottom surface of the cabin when the vehicle is in hover, thereby not creating any flow distortion or unwanted interaction with the fuselage below the propeller 2. b. When in forward flight, with the flow attached, the relatively flat diagonal surface between points 5104 and 5105 avoids the build up of low pressure and suction on that surface which would have resulted in negative lift, had that contour been of substantially constant radius.

It should also be noted that the ratio L1/L2 is substantially in the range of 0.30-0.60, and that the reconfigured diagonal cabin floor line between points 5104 and 5105 is substantially longer than would be the case if only a local bend to avoid a sharp corner were introduced to the forward end of an otherwise flat cabin floor (i.e., L1/L2=1).

Figure 52:
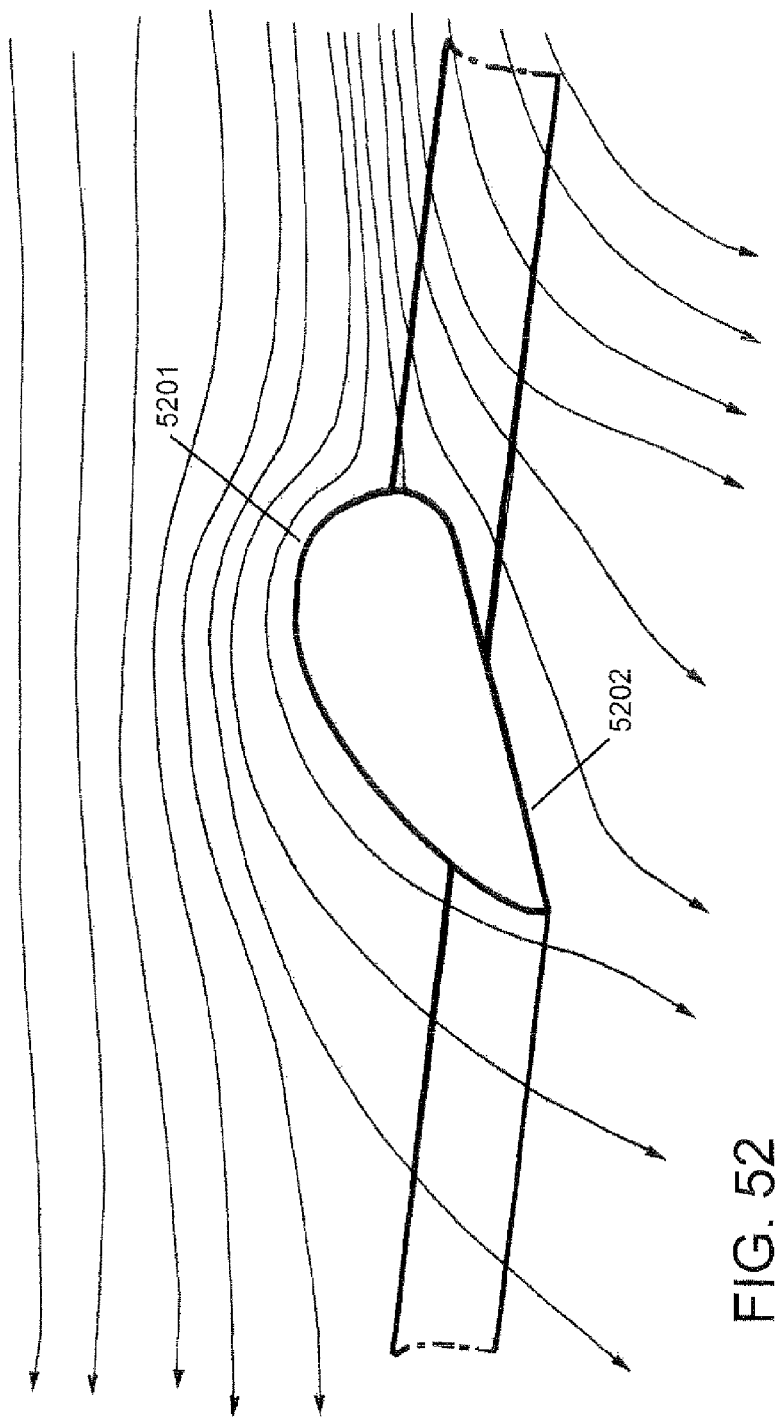
FIG. 52 illustrates an application where the entire center section of the vehicle of FIG. 36 is shaped in the form of an airfoil with a substantially flat lower surface.
Figure 53:
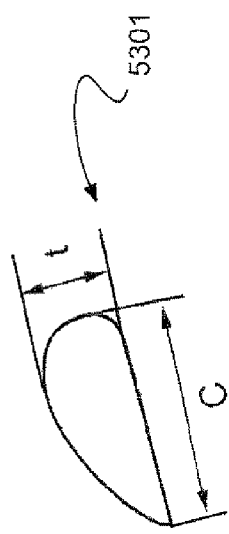
FIG. 53 illustrates exemplary dimensional relationships for the blister shown in FIG. 52.

FIG. 52 illustrates an alternative cabin shape, where the upper cabin roof at 5201 is still curved substantially in the form of FIG. 46, but where the bottom of the cabin area shown at 5202 is substantially flat. While not directly suitable to accommodate the occupants shown in FIGS. 50, 51, the flat bottom cabin shape could still be used for other applications such as cargo or unmanned applications of the vehicle, or alternatively—for larger size vehicles, where the cabin shape would still be high enough to provide headroom for human occupants. The geometry of the flat bottomed cabin is shown schematically at 5301 in FIG. 53, with the ratio of t/c substantially in the range t/c~=0.30-0.50. The main aerodynamic advantage of the flat bottom 5202 over the curved bottom shown at 5004 on FIG. 50 is the avoidance of downward suction forces, with better ratios of lift to drag obtained in forward cruise.

Figure 54:
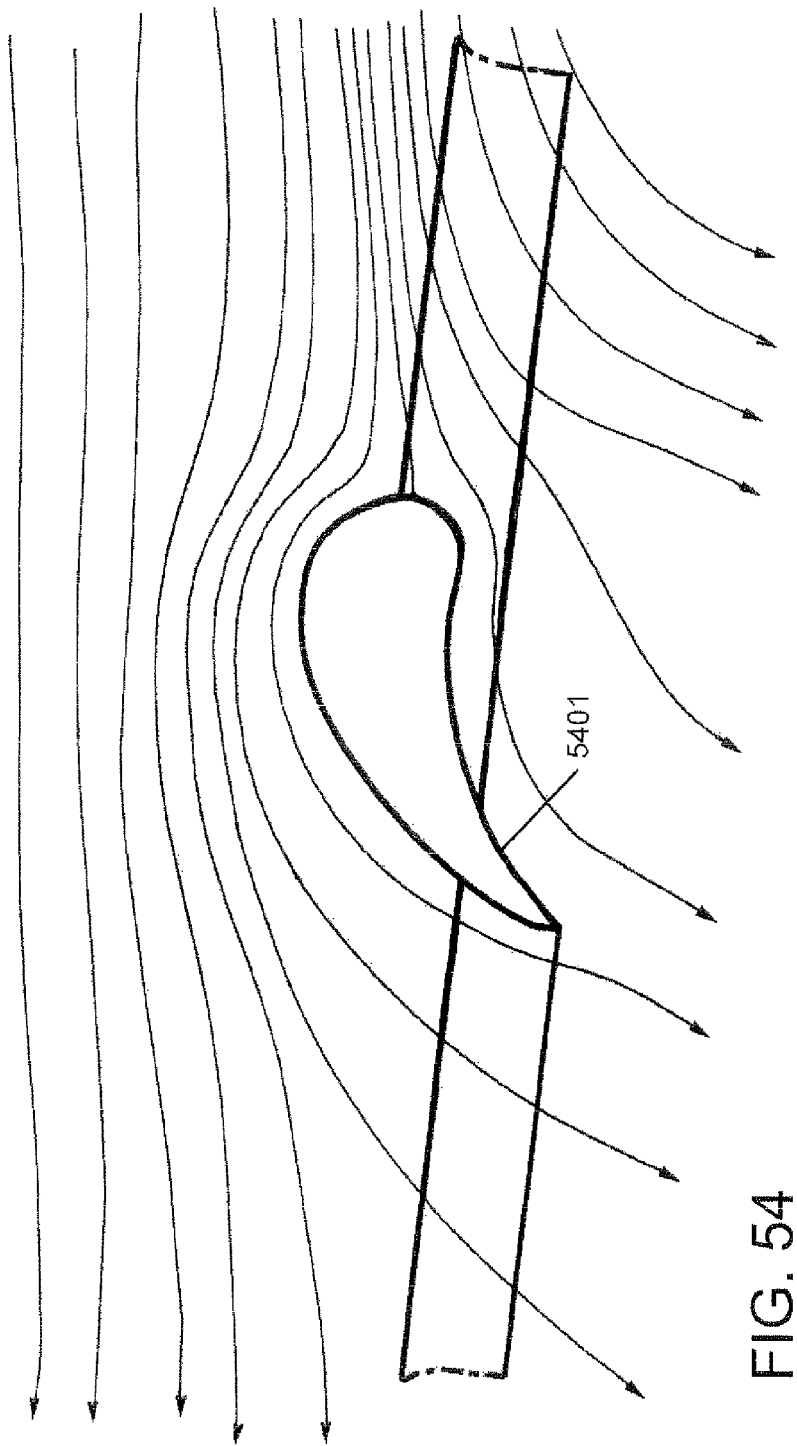
FIG. 54 illustrates an application where the entire center section of the vehicle of FIG. 36 is shaped in the form of an airfoil with a substantially concave lower surface.
Figure 55:
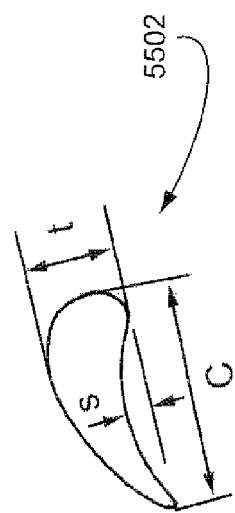
FIG. 55 illustrates exemplary dimensional relationships for the blister shown in FIG. 54.

FIG. 54 illustrates a further variation on the cabin floor shape, where the bottom is concave, shown at 5401. While the concavity of the floor has the disadvantage of further reducing the available cabin inner height and useful space, it has the aerodynamic advantage of increasing the positive pressure on the bottom of the cabin, and potentially further improving the lift to drag ratio over the flat bottom of FIG. 52. The geometry of the concave bottomed cabin is shown schematically at 5502 in FIG. 55, with the ratio of t/c as before, i.e., substantially in the range t/c~=0.30-0.50, and with the section's concavity ratio s/c substantially in the range s/c~=0.05-0.15.

Figure 56:
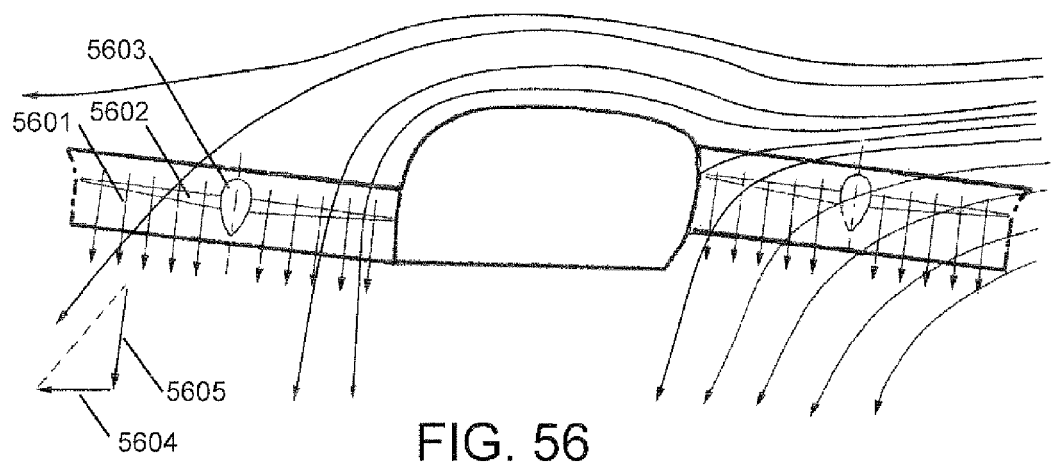
FIGS. 56 and 57 illustrate the influence of the magnitude of the induced velocity through the lift fans, relative to the free-stream velocity, on the shape of the steamlines flowing around the center section, as well as through and out of the lift fans of the vehicles of FIG. 40 and FIG. 52.
Figure 57:
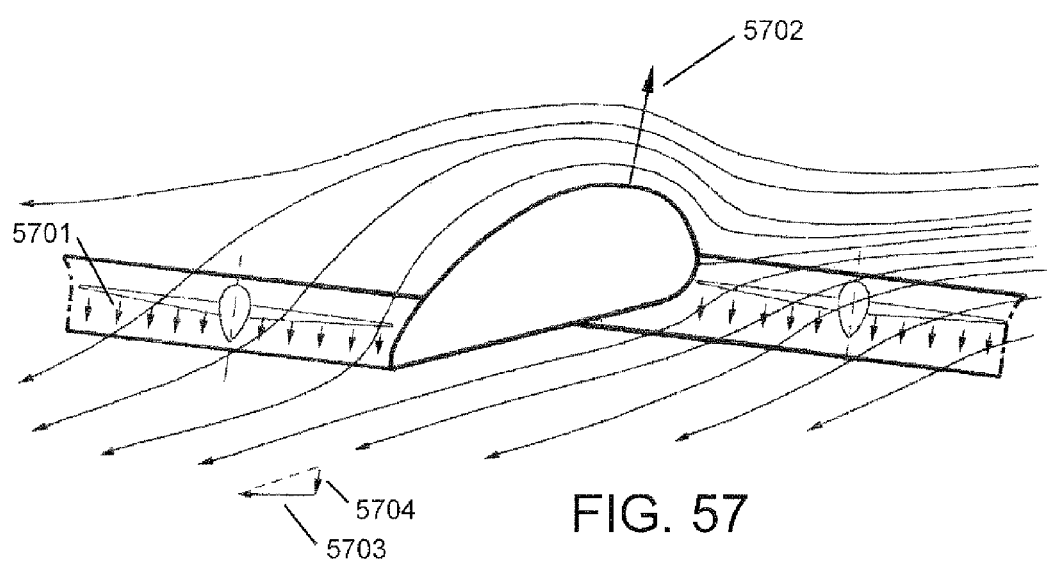

FIG. 56 and FIG. 57 illustrate the influence of the magnitude of the induced velocity, relative to the free-stream velocity, on the shape of the streamlines flowing around the center section, as well as through and out of the lift fans of the vehicle, FIG. 56 representing the vehicle with cabin shape of FIG. 40 and FIG. 57 representing the vehicle with cabin shape of FIG. 52. Shown in FIG. 56 at 5601 is high induced velocity flowing through the blades shown schematically at 5602 of the rear fan shown schematically at 5603. A similar description is applicable to the forward fan of the vehicle. In FIG. 57, a smaller induced velocity shown at 5701 flows through the fan, as would for example result if additional lift on the cabin roof shown schematically at 5702 would occur at high speed, without a corresponding increase in the vehicle's weight, which would require the total lift to remain the same, necessitating in reduction of the lift contribution of the fans—hence a reduction in induced velocity through the fan blades. Because the change in induced velocity between FIGS. 56 and 57 is essentially at constant flight speed, one can see from the airspeed vector diagrams shown that while free stream velocity shown at 5604 and 5703 remains unchanged in magnitude, the vertical induced component shown respectively at 5605 and 5704 for the high and low induced velocity cases, causes the resultant flow angularity to assume a considerably more shallow angle in FIG. 56 relative to FIG. 57. This behavior of the flow in the vicinity of the vehicle has the beneficial effect of reducing the momentum drag component of the overall resistance that the vehicle experiences as it moves through the air, further illustrating the benefits of creation of cruise lift forces on the cabin roof and stabilizer, while off-loading some of the load carried by the fans, possible through the implementation of the provisions shown in FIGS. 43-55. It should be mentioned that the above-mentioned benefits with respect to streamline geometry and array area applicable also to other center section shapes beside that shown in FIGS. 56 and 57.

While the invention has been described with respect to several preferred embodiments, it will be appreciated that these are set forth merely for purposes of example, and that many other variations, modifications and applications of the invention will be apparent.

What is claimed is:

1. A ducted fan adapted to be mounted in a fuselage of a VTOL vehicle, said ducted fan comprising:
   at least one lift-producing propeller disposed inside a duct having an inlet and an exit at opposite ends thereof said at least one lift-producing propeller mounted for rotation about a duct axis,
   wherein an arcuately-limited peripheral sidewall portion of said duct is formed with at least one controllable aperture therein, thereby allowing, when the vehicle is in use and with said controller aperture open, air to flow into an interior of said duct through both said inlet and said at least one aperture and to flow out of said exit of said duct.

2. A ducted fan as in claim 1 further comprising:
   a plurality of airfoil-shaped elements disposed within said aperture.

3. A ducted fan as in claim 1 and further comprising:
   a controllably slidable flow blocking element disposed to block and to permit air flow through said aperture.

4. The ducted fan of claim 1 wherein said aperture extends at least axially downstream of said lift-producing propeller.

5. The ducted fan of claim 1 wherein said aperture extends axially upstream and downstream of said at least one lift-producing propeller.

6. A ducted fan as in claim 1 further comprising:
   a plurality of spaced-apart partition elements disposed within said aperture.

7. A ducted fan as in 6 further comprising:
   a plurality of externally actuated rotating valves, each valve being disposed between two of said partition elements and selectably rotatable to block and to permit air flow around said elements and into said duct.

8. A ducted fan as in claim 6 wherein:
   respective ones of said partition elements are selectably rotatable to contact a neighboring one of said partition elements to block air flow around said elements and into said duct, and to disengage from said neighboring element to permit air flow around said elements and into said duct.

* * * * *